US012728412B2

(12) United States Patent
Pekurovsky et al.

(10) Patent No.: US 12,728,412 B2
(45) Date of Patent: Sep. 8, 2026

(54) DIAGNOSTIC DEVICE

(71) Applicant: Solventum Intellectual Properties Company, Maplewood, MN (US)

(72) Inventors: Mikhail L. Pekurovsky, Bloomington, MN (US); Matthew S. Stay, Bloomington, MN (US); Henrik B. van Lengerich, St. Paul, MN (US); Ann M. Gilman, Bayport, MN (US); Sonnie L. Hubbard, Maplewood, MN (US); Hannah J. Loughlin, Mahtomedi, MN (US); Satinder K. Nayar, Woodbury, MN (US); Kevin T. Reddy, Minneapolis, MN (US); Timothy J. Rowell, St. Paul, MN (US); Matthew R. D. Smith, Woodbury, MN (US); Ronald P. Swanson, Woodbury, MN (US); Daniel J. Theis, Mahtomedi, MN (US); Deniz Yuksel Yurt, Woodbury, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 987 days.

(21) Appl. No.: 17/906,868

(22) PCT Filed: Mar. 26, 2021

(86) PCT No.: PCT/US2021/024280

§ 371 (c)(1),
(2) Date: Sep. 21, 2022

(87) PCT Pub. No.: WO2021/202260

PCT Pub. Date: Oct. 7, 2021

(65) Prior Publication Data

US 2023/0138304 A1 May 4, 2023

Related U.S. Application Data

(60) Provisional application No. 63/164,144, filed on Mar. 22, 2021, provisional application No. 63/003,169, filed on Mar. 31, 2020.

(51) Int. Cl.
*B01L 3/00* (2006.01)

(52) U.S. Cl.
CPC ..... *B01L 3/5023* (2013.01); *B01L 2400/0406* (2013.01)

(58) Field of Classification Search
None
See application file for complete search history.

(56) References Cited

U.S. PATENT DOCUMENTS

| | | | |
|---|---|---|---|
| 5,877,028 | A | 3/1999 | Chandler et al. |
| 6,221,678 | B1 | 4/2001 | Chandler |

(Continued)

FOREIGN PATENT DOCUMENTS

| | | | |
|---|---|---|---|
| CN | 110031617 | B | 11/2020 |
| EP | 1344059 | B1 | 10/2007 |

(Continued)

OTHER PUBLICATIONS

Aguirre-Soto, "Excitation of Metastable Intermediates in Organic Photoredox Catalysis: Z-Scheme Approach Decreases Catalyst Inactivation", ACS Catalysis, 2018, vol. 08, pp. 6394-6400.

(Continued)

*Primary Examiner* — Lore R Jarrett

(57) ABSTRACT

A diagnostic device includes a sensor stack with multiple panels of a porous material disposed in planes parallel to one another and in face-to-face contact with each other. At least a portion of the panels of the porous material include hydrophobic regions and hydrophilic regions configured to provide a sample flow path for migration of a fluid sample (Continued)

through the sensor stack from one panel to another in the hydrophilic regions. A wicking layer is on a major surface of the sensor stack.

16 Claims, 24 Drawing Sheets

(56) References Cited

U.S. PATENT DOCUMENTS

| | | | | |
|---|---|---|---|---|
| 7,153,651 | B1* | 12/2006 | Drewes | G01N 33/54373 422/68.1 |
| 8,628,729 | B2 | 1/2014 | Carrilho et al. | |
| 9,597,684 | B2 | 3/2017 | Vella et al. | |
| 9,669,638 | B2 | 6/2017 | Ferrara, Jr. et al. | |
| 2005/0084982 | A1* | 4/2005 | Brauner | G01N 33/92 436/514 |
| 2007/0275193 | A1 | 11/2007 | Desimone et al. | |
| 2009/0035179 | A1* | 2/2009 | Rakow | G01N 21/78 422/400 |
| 2009/0298191 | A1* | 12/2009 | Whitesides | C12Q 1/48 436/164 |
| 2012/0149093 | A1* | 6/2012 | Gould | B01L 3/5023 435/286.2 |
| 2012/0270235 | A1 | 10/2012 | Kim et al. | |
| 2013/0034869 | A1* | 2/2013 | Whitesides | B01L 3/502738 435/7.92 |
| 2013/0316393 | A1* | 11/2013 | Swanson | C12Q 1/04 210/236 |
| 2015/0355132 | A1* | 12/2015 | Crooks | B01L 3/502707 422/69 |
| 2017/0043341 | A1 | 2/2017 | Benco | |
| 2017/0173578 | A1 | 6/2017 | Crooks et al. | |
| 2018/0298322 | A1* | 10/2018 | Bjork | C12M 23/20 |
| 2019/0113512 | A1 | 4/2019 | Sikes et al. | |
| 2020/0057058 | A1 | 2/2020 | Olsen et al. | |

FOREIGN PATENT DOCUMENTS

| | | | |
|---|---|---|---|
| JP | 2020020601 | A | 2/2020 |
| WO | 2009076389 | A1 | 6/2009 |
| WO | 2009121037 | W | 10/2009 |
| WO | 2011094342 | A1 | 8/2011 |
| WO | 2022200866 | A1 | 9/2022 |
| WO | 2022200867 | A1 | 9/2022 |
| WO | 2022200888 | A1 | 9/2022 |
| WO | 2022208321 | A1 | 10/2022 |

OTHER PUBLICATIONS

Aguirre-Soto, "On the role of N-vinylpyrrolidone in the aqueous radical-initiated copolymerization with PEGDA mediated by eosin Y in the presence of O2", Polymer Chemistry, 2019, vol. 10, No. 08, pp. 926-937.

Azzi, "Diagnostic Salivary Tests for SARS-CoV-2", Journal of Dental Research, 2021, vol. 100, No. 02, pp. 115-123.

Azzi, "Rapid Salivary Test Suitable for mass screening program to detect SARS-CoV-2 A diagnostic accuracy study"; Journal of Infection, 2020, vol. 81, pp. e75-e78.

Azzi, "Saliva is a reliable tool to detect SARS-CoV-2", Journal of Infection, 2020; vol. 81; pp. e45-e50.

Badu-Tawiah, "Polymerization-based signal amplification for paper-based immunoassays", Lab on a Chip, 2015, vol. 15, No. 03, pp. 655-659.

Berg, Wettability (Surfactant Science) 1st Edition, CRC Press, Apr. 20, 1993.

De Gennes, Capillarity and Wetting Phenomena: Drops, Bubbles, Pearls, Waves, Springer-Verlag, New York, 2004.

Dellal, "Low-cost Plug and Play Photochemistry Reactor", HardwareX, 2018, vol. 03, pp. 1-9.

Encyclopedia of Polymer Sciences and Engineering, vol. 13, Wiley-Interscience Publishers, New York, 1988, 3 pgs.

Fernandes, "Fabrication of Three-dimensional Paper-Based Microfluidic Devices For Immunoassays", Journal of Visualized Experiments, 2017, vol. e55287, No. 121, pp. 1-10.

Gasperino, "Improving Lateral Flow Assay Performance Using Computational Modeling", Annual review of analytical chemistry, 2018, vol. 11, No. 1, pp. 219-244.

International Search Report for PCT Application No. PCT/US2021/024280 mailed on Aug. 12, 2021, 4 pages.

International Search Report for PCT International Application No. PCT/IB2021/052179, mailed on Jun. 11, 2021, 2 pages.

Kaastrup, "Impact of Dissociation Constant on the Detection Sensitivity of Polymerization-Based Signal Amplification Reactions", Analytical Chemistry, 2013, vol. 85, No. 17, pp. 8055-8060.

Kaastrup, "Investigation of dendrimers functionalized with eosin as macrophotoinitiators for polymerization-based signal amplification reactions", RSC Advances, 2015, vol. 05, No. 20; pp. 15652-15659.

Kaastrup, "Polymerization-based Signal Amplification Under Ambient Conditions with Thirty-Five Second Reaction Times", Lab on a Chip, 2012, vol. 12, No. 20, pp. 4056-4058.

Kaastrup, "Using Photo-Initiated Polymerization Reactions To Detect Molecular Recognition", Chemical Society Reviews, 2016, vol. 45, No. 03, pp. 532-545.

Kaastrup, "UV-Vis/FT-NIR In-situ monitoring of visible-light induced polymerization of PEGDA hydrogels initiated by eosin/triethanolamine/O2", Polymer Chemistry, 2016, vol. 07, No. 03, pp. 592-602.

Kim, "A SARS-CoV-2 Antigen Test Using Engineered Affinity Proteins", 2021, pp. S-1-S-30.

Lathwal, "A method for Designing Instrument-Free, Quantitative Immunoassays," Analytical Chemistry, 2016, vol. 88, No. 06, pp. 3194-3202.

Lathwal, "Assessment Of Colorimetric Amplification Methods In A Paper-Based Immunoassay For Diagnosis Of Malaria", Lab on a Chip, 2016, vol. 16, No. 08, pp. 1374-1382.

Lee, "Balancing the Initiation and Molecular Recognition Capabilities of Eosin Macroinitiators of Polymerization-Based Signal Amplification Reactions", Macromolecular Rapid communications, 2014, vol. 35, No. 10, pp. 981-986.

Lee, "Systematic Study of Fluorescein-Functionalized Macrophotoinitiators for Colorimetric Bioassays" Biomacromolecules, 2012, vol. 13, No. 04, pp. 1136-1143.

Miller, "Activity-Based Assessment Of An Engineered Hyperthermophilic Protein As A Capture Agent In Paper-Based Diagnostic Tests", Molecular Systems Design & Engineering, 2016, vol. 01, pp. 377-381.

Miller, "Addressing barriers to the development and adoption of rapid diagnostic tests in global health", Nanobiomedicine, 2015, vol. 02, pp. 1-21.

Miller, "Paper-Based Diagnostics In The Antigen-Depletion Regime: High Density Immobilization Of rcSso7d-Cellulose Binding Domain Fusion Proteins For Efficient Target Capture", Biosensors and Bioelectronics, 2018, vol. 102, pp. 456-463.

Rebound, "From Paper-based microfluidics for DNA diagnostics of Malaria in Low Resource Underserved Rural Communities", 2019, vol. 116, No. 11, pp. 4834-4842.

Reece, "Staged Inertial Microfluidic Focusing for Complex Fluid Enrichment", RCS Advances, 2015, vol. 15, No. 06, pp. 53857-53864.

Shatova, "Portable, Constriction—Expansion Blood Plasma Separation and Polymerization-Based Malaria Detection"; Analytical Chemistry, 2016, vol. 88, No. 15, pp. 7627-7632.

Sung, "Engineering Hyperthermostable rcSso7d as Reporter Molecule for In Vitro Diagnostic Tests", Molecular Systems Design & Engineering, 2018, vol. 03, pp. 877-882.

Washburn, "The Dynamics of Capillary Flow" Physical Review, 1921, vol. 17, No. 03, pp. 273-283.

Welch, "Analysis of Inactivation of SARS-CoV-2 by Specimen Transport Media, Nucleic Acid Extraction Reagents, Detergents, and Fixatives", Journal of Clinical Microbiology, 2020, vol. 58, No. 11, pp. e01713-e01720.

Wong, "A Quantitative Analysis of peroxy-mediated cyclic regeneration of eosin in oxygen-rich photopolymerization conditions", Polymer, 2015, vol. 69, pp. 169-177.

(56) References Cited

OTHER PUBLICATIONS

Wong, "The impact of continuous oxygen flux in a thin film photopolymerization reaction with peroxy-mediated regeneration of initiator", Macromolecular Theory And Simulations, 2016, vol. 25, No. 03, pp. 229-237.
Xu, "Paper-Origami-Based Multiplexed Malaria Diagnostics from Whole Blood", Angewandte Chemie (International Edition), 2016, vol. 55, No. 49, pp. 15250-15253.
Yee, "Detection of Biomarkers of Periodontal Disease in Human Saliva Using Stabilized, Vertical Flow Immunoassays", ACS Sensors, 2017, vol. 02, No. 11, pp. 1589-1593.
Yetisen, "Paper-based Microfluidic Point-of-Care Diagnostic Devices", Lab Chip, 2013, vol. 13, No. 12, pp. 2210-2251.

* cited by examiner

DIAGNOSTIC DEVICE

CROSS REFERENCE TO RELATED APPLICATIONS

This application is a national stage filing under 35 U.S.C. 371 of PCT/US2021/024280, filed 26 Mar. 2021, which claims the benefit of U.S. Application No. 63/003,169, filed 31 Mar. 2020, and U.S. Application No. 63/164,144, filed 22 Mar. 2021, the disclosure of which is incorporated by reference in its/their entirety herein.

BACKGROUND

Simple, low-cost diagnostic technologies are an important component of strategies for improving healthcare and access to healthcare in developing nations and resource-limited settings. According to the World Health Organization, diagnostic devices for use in developing countries should be ASSURED (affordable, sensitive, specific, user-friendly, rapid and robust, equipment-free, and deliverable to end users).

Inexpensive, portable, and easy-to-use diagnostic devices have used a porous substrate including a reagent selected to rapidly perform quantitative or qualitative analysis of a fluid sample such as, for example, a bodily fluid, an industrial fluid, or water, in the field when laboratory facilities are not available or easily accessed for sample analysis. In one example, a paper-based diagnostic device includes a colorimetric immunoassay reagent with a color change as a readout, and the color change readout can be detected visually or with a machine to provide a rapid, low-cost diagnosis of the presence of an infectious disease. In various examples, analytes in a sample can be rapidly detected using the diagnostic devices include viral antigens, bacterial antigens, fungal antigens, parasitic antigens, cancer antigens, metabolic markers, and combinations thereof.

In one example, in an immunochromatographic diagnostic assay, antibodies acting as binding proteins can be used to capture disease-relevant biomarkers from the patient sample, and then produce a visible diagnostic signal resulting from the binding event.

In some examples, the diagnostic devices include multiple layers of a porous material disposed in planes parallel to one another and in face-to-face contact. The various layers of the diagnostic device include fluid impermeable hydrophobic regions and hydrophilic water absorbent regions arranged to provide a sample flow path configured such that a fluid sample can wick or flow from one layer to another. At least some of the layers include reagents, buffer salts, analytes (for example antigens) and binders (for example, antibodies) selected to perform a multiplexed assay.

To manufacture a diagnostic device including multiple planar regions having different reagents or different patterns of hydrophobic and hydrophilic regions, multiple layers must be individually produced, accurately stacked and aligned to provide the sample flow path, and adhered to maintain the continuity of the sample flow path and form an operable stack. In practice it can be difficult to produce a low-cost diagnostic device using such a complex series of steps, and to date manufacturing costs have limited deployment of these types of diagnostic devices to resource-limited settings such as developing nations. To provide enhanced diagnostic resources and improve health care these areas, there remains a need for multiplexed assay devices that are inexpensive, portable, and easy to construct and use.

SUMMARY

In general, the present disclosure is directed to inexpensive, easy to use diagnostic devices for quantitative or qualitative analysis of a sample fluid including an analyte. Suitable sample fluids include, but are not limited to, body fluids (e.g., blood, sputum, saliva, or urine), industrial fluids, water samples, and the like. The diagnostic device includes at least two substantially planar portions, each planar portion made from a hydrophilic material such as paper. The planar portions are stacked on each other and each occupy a different and substantially parallel plane to form a three-dimensional structure. At least one of the planar portions includes a hydrophobic region and a hydrophilic region. The hydrophobic region in each planar portion is formed by applying a low surface energy material, such as a hydrophobic ink having low surface energy when cured, which extends through a thickness of the portion from a first major surface to a second major surface thereof. The hydrophilic regions in the overlying substantially parallel planar portions can be aligned with each other such that a fluid is passively transported between adjacent hydrophilic regions to provide a sample flow path between adjacent substrate portions that is substantially normal to the overlying planes of the planar portions.

In various embodiments, a reagent is within the sample flow path, in fluid communication with the sample flow path, or may be applied to the sample flow path, to provide an indication of at least one of a presence, absence, or concentration of an analyte in the sample. For example, in some embodiments, the indication includes an easily readable color change.

The disclosed diagnostic devices are particularly well adapted to conduct immunoassays, such as sandwich or competitive immunoassays, although they may be readily adapted to execute assay formats including steps such as, for example, filtration, multiple incubations with different reagents or combinations of reagents, serial or timed addition of reagents, various incubation times, washing, and the like. The diagnostic devices are particularly effective for executing colorimetric assays, e.g., immunoassays with a color change as a readout, and are easily adapted to execute multiple assays simultaneously. They are extremely sensitive, simple to manufacture, inexpensive, and versatile.

In one aspect, the present disclosure is directed to a diagnostic device, including: a sensor stack having multiple panels of a porous material disposed in planes parallel to one another and in face-to-face contact with each other, wherein the sensor stack includes a first major surface and a second major surface, wherein at least a portion of the panels of the porous material have hydrophobic regions and hydrophilic regions configured to provide a sample flow path for migration of a fluid sample through the sensor stack from one panel to another in the hydrophilic regions; and a wicking layer on the second major surface of the sensor stack, wherein the wicking layer includes a first major surface proximal the sensor stack and a second major surface.

In another aspect, the present disclosure is directed to an assay method, the method including: mixing a sample comprising an analyte with a reagent solution to form a sample solution; applying the sample solution to an assay device, the assay device comprising: a sensor stack, the sensor stack comprising: multiple panels of a porous material disposed in planes parallel to one another and in face-to-face contact with each other, wherein the sensor stack comprises a first major surface and a second major surface, wherein at least a portion of the panels of the porous material comprise hydrophobic regions and hydrophilic regions configured to provide a sample flow path for migration of a fluid sample through the sensor stack from one panel to another in the hydrophilic regions; and a wicking layer on the second major surface of the sensor stack, wherein the wicking layer comprises a first major surface proximal the sensor stack and a second major surface, wherein the sample solution is applied to a hydrophilic region, wherein the sample solution is applied to a sample port in the hydrophilic region of the sample flow path; applying a wash solution to the sample port; separating the wicking layer from the sensor stack to expose the second major surface of the sensor stack; applying a color solution to a color zone on the second major surface of the sensor stack; and observing the color zone to determine a color change and confirm the presence or absence of an analyte in the sample.

In another aspect, the present disclosure is directed to a method of making a diagnostic device, the method including: in an elongate web of a fibrous material having a first major surface and a second major surface, wherein the web has a thickness t extending from the first major surface to the second major surface, and a first edge and a second edge, the web having a plurality of adjacent web regions extending from the first edge to the second edge, wherein at least a portion of the web regions are separated from adjacent web regions by border regions; applying a first portion of a hydrophobic polymeric ink composition to the first major surface of the web in at least one web region, wherein the first portion of the ink composition wicks a distance less than t from the first major surface of the web toward the second major surface of the web; and applying a second portion of the hydrophobic polymeric ink composition to the at least one web region on the second major surface of the web, wherein the second portion of the ink composition wicks from the second major surface of the web toward the first major surface of the web, wherein the first portion of the hydrophobic polymeric ink composition meets the second portion of the hydrophobic polymeric ink composition to form a hydrophobic area comprising the hydrophobic polymeric ink composition and a hydrophilic area substantially free of the hydrophobic polymeric ink composition; and at least partially hardening the hardenable polymeric ink composition in the hydrophobic areas of the at least one web region to provide a hydrophobic ink on fibers of the fibrous material and open areas between the fibers, the open areas between the fibers providing at least one uninterrupted open ink-free path between the first major surface of the web and the second major surface of the web.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1A:
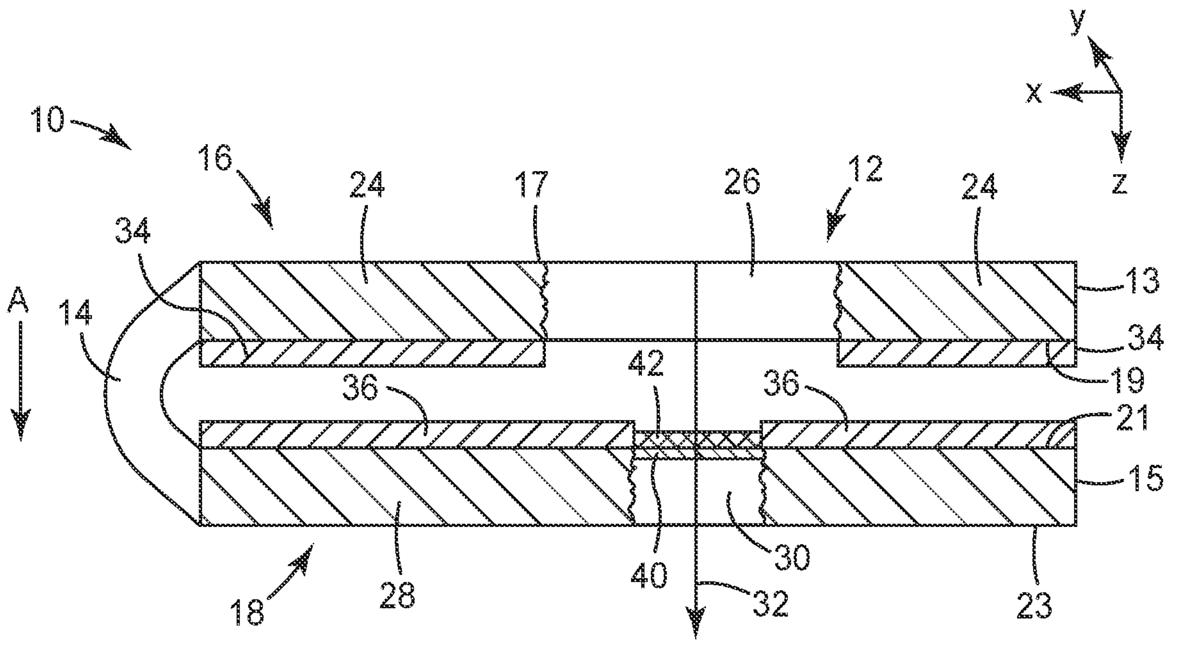
FIG. 1A is schematic cross-sectional view of an embodiment of a diagnostic device according to the present disclosure.
Figure 1B:
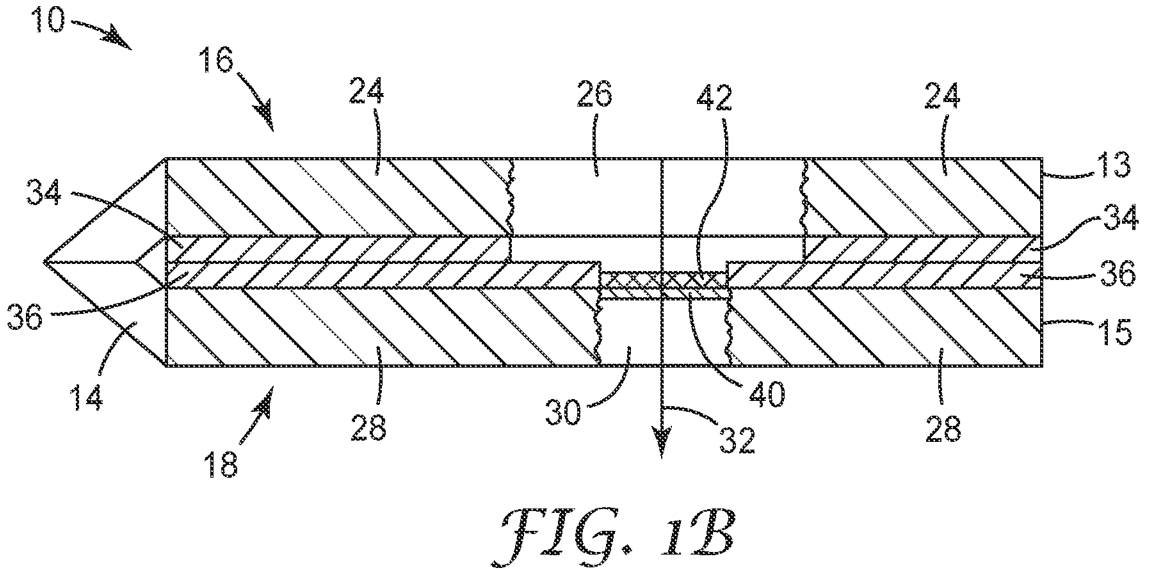
FIG. 1B is schematic cross-sectional view of an embodiment of a diagnostic device according to the present disclosure.

Referring now to FIGS. 1A-1B, an embodiment of a diagnostic device 10 includes an elongate substantially planar hydrophilic substrate 12 with a first end 13, a second end 15, and at least one folded region 14 between the first and the second ends 13, 15. The folded region 14 separates the hydrophilic substrate 12 into a first sheet-like portion 16 and a second sheet-like portion 18, each occupying a substantially parallel plane with respect to the folded region 14. The first substrate portion 16 includes a first major surface 17 and a second major surface 19, while the second substrate portion 18 includes a first major surface 21 and a second major surface 23. In the embodiment of FIG. 1A, the first portion of the substrate 16 and the second portion of the substrate 18 overlie one another such that the respective major surfaces 19 and 21 are adjacent to each other.

The first substrate portion 16 includes a first hydrophobic region 24 and a first hydrophilic region 26, while the second substrate portion 18 includes a second hydrophobic region 28 and a second hydrophilic region 30. The fibers of the substrate 12 in the hydrophobic regions 24, 28 have applied thereto a low surface energy polymeric material, and as such resist unassisted capillary fluid flow or wicking of a selected fluid, such as, for example, a sample fluid including, for example, an analyte, or a buffer or a wash solution, therethrough. As a result of this resistance, the selected fluid is passively transported (requiring no external pressure gradients, gravitational or electrostatic forces) between the hydrophilic regions 26, 30.

The hydrophobic regions 24, 28 substantially confine the flow of the fluid along the direction of the arrow A, which is aligned along thickness of the substrate portions 16, 18, or along the z-axis of the three-dimensional diagnostic device 10. The hydrophilic regions 26, 30 are sufficiently aligned with each other such that a fluid sample placed on the first hydrophilic region 26 (not shown in FIGS. 1A-1B, see FIGS. 1C-1D) can be passively transported using, for example, wicking or capillary action, along a sample flow path 32 to provide fluid communication between the first substrate portion 16 and the second substrate portion 18 such that the fluid sample wicks into the second hydrophilic region 30.

The shapes and sizes of the hydrophobic regions 24, 28 and the hydrophilic regions 26, 30 may vary widely depending on the intended use of the device. Any number of hydrophobic regions 24, 28 and hydrophilic regions 26, 30 may be used. However, since mass transfer of a fluid is proportional to the area of the wicking, varying the size of the hydrophilic regions 26, 30, or a coating pattern of the hydrophobic regions 24, 28, can be used to control mass transfer by wicking or capillary action across layers. For example, smaller hydrophilic regions 26, 30 will reduce mass transfer in direct relation to the reduced area of the substrate 12 occupied by the hydrophilic regions 26, 30. In some embodiments, which are provided by way of example and are not intended to be limiting, to provide good wicking between overlying layers the hydrophilic regions 26, 30 should occupy about 10% to about 90%, or about 25% to about 50%, of the total cross-sectional area of the substrate 12.

Figure 1C:
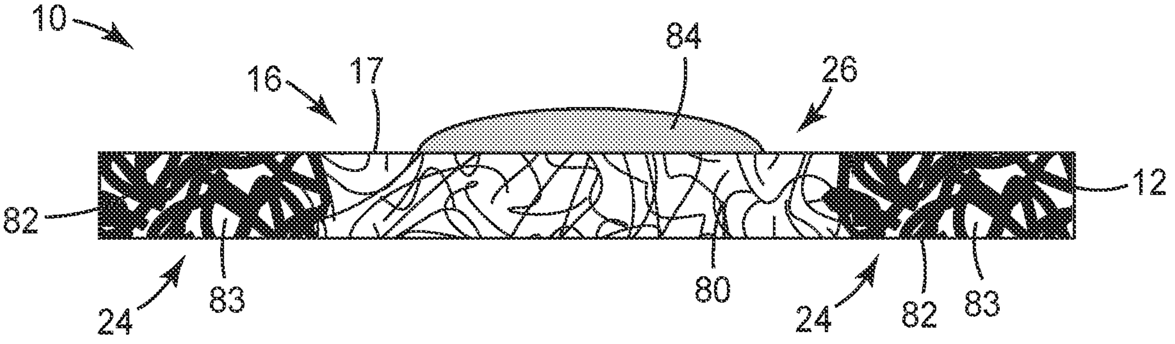
FIG. 1C is magnified schematic cross-sectional view of a portion of the embodiment of the diagnostic device of FIGS. 1A-1B when a fluid is initially applied.
Figure 1D:
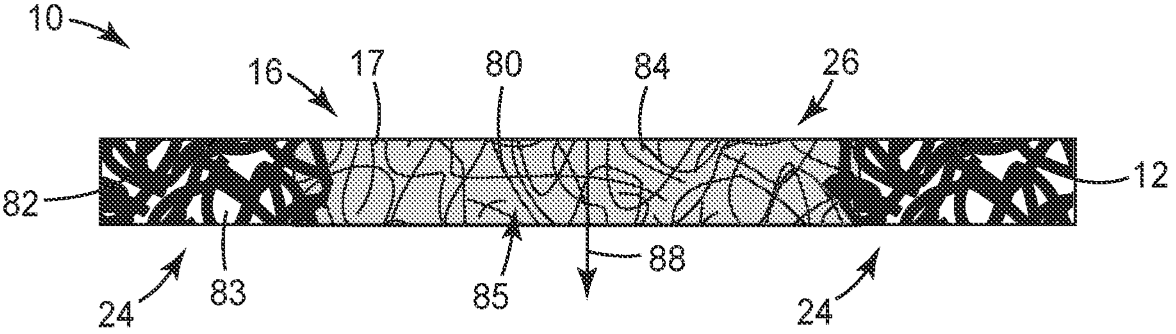
FIG. 1D is magnified schematic cross-sectional view of the embodiment of the diagnostic device of FIG. 1C after the fluid was passively transported into and wet a portion of the substrate thereof.

Referring now to the magnified schematic cross-sectional diagrams in FIGS. 1C-1D, the diagnostic device 10 of FIGS. 1A-1B includes a hydrophilic substrate 12 with a first substrate portion 16. The substrate portion 16 of the hydrophilic substrate 12 includes a hydrophobic portion 24 and a hydrophilic portion 26. The hydrophilic portion 26 includes an arrangement of entangled fibers 80. In some example embodiments, which are not intended to be limiting and are provided only as an illustrative example, the fibers 80 in the hydrophilic region 26 have a surface energy a at a selected temperature for a selected liquid 84 of about 40 to about 65 dynes/cm. In the hydrophobic portion 24, at least a portion of the fibers 80 are coated with a low-surface energy polymeric material 82, which limits capillary flow (or wicking) of a fluid into the hydrophobic portion 24. In some embodiments, if the low surface energy polymeric material 82 is deposited on the fibers 80 such that it only coats the surface of the fibers, at least some interconnected interstitial passages 83 remain between the fibers. The passages 83 remain open such that a gas (which is a fluid) may freely move through the porous substrate 12 in the hydrophobic regions 24. After coating with the low surface energy polymeric material 82, the fibers in the hydrophobic regions 24 have a surface energy at least 10 dyne/cm less than the surface tension of the liquid 84.

If the liquid 84 is placed on the surface 17 of the hydrophilic region 26 at a time t=0, after a saturation time $t_{sat}$ greater than t=0 has elapsed, the fluid 84 will wick and be passively transported along the fibers 80 and occupy interstitial regions 85 in the hydrophilic region 26. The low surface energy polymeric material in the hydrophobic regions 24 tends to repel or resist intrusion of the fluid 84 into the interstitial regions 83 therein, thereby forming a flow path 88 through the hydrophilic region 26 for the fluid 84.

Referring again to FIGS. 1A-1B, all or a portion of one or both of the hydrophilic regions 26, 30 can include a test area 42 where an analytical result or output of the device 10 can be displayed for a user, as well as one or more reagents 40 in the test area 42 or in fluid communication with the test area 42. The reagents 40 are selected to provide an indication of at least one of a presence, absence or concentration of an analyte in the fluid sample are disposed in the sample flow path 32. In various embodiments, the reagent 40 is applied to all or a portion of one or both of the hydrophilic regions 26, 30, can be in another portion of the device 10 and in fluid communication with the flow path 32, or can be applied to the sample flow path 32 before or after the application of the fluid sample to the sample flow path 32.

In some embodiments, the diagnostic device 10 includes an optional first connection region 34 on the second major surface 19 of the first substrate portion 16. In some embodiments, the diagnostic device 10 further includes an optional second connection region 36 on the first major surface 21 of the second substrate portion 18. Either or both of the adjacent major surfaces 19, 21 of the overlying substrate portions 16, 18 can include connection regions, which adhere the first substrate portion 16 to the second substrate portion 18 and maintain the registration of the hydrophilic regions 26, 30 to preserve the sample flow path 32 (FIG. 1B).

In various embodiments, the elongate hydrophilic substrate 12 may be made from any porous, hydrophilic, adsorbent material capable of wicking a sample fluid by capillary action. In one or more embodiments, the substrate 12 is a paper product such as, for example, chromatographic paper, filter paper, and the like, but may also be chosen from woven or nonwoven fabrics, or from polymer films such as, for example, nitrocellulose, cellulose acetate, polyesters, and polyurethane, and the like.

The first and second hydrophobic regions 24, 28 may be formed by applying a desired pattern of a low surface energy polymeric material such as, for example, a polymeric ink composition that forms a low surface energy polymeric ink when cured, to the substrate 12. As shown schematically in FIGS. 1C-1D, the hydrophobic ink composition wicks along the fibers of the hydrophilic substrate 12 and coats the fibers thereof, leaving open at least some interstitial regions between the fibers. When subsequently cured or hardened, the polymeric ink composition provides open interstitial regions that form at least one uninterrupted open path between the respective major surfaces 17, 19 of the first substrate portion 16 and major surfaces 21, 23 of the second substrate portion 18.

Wicking of liquid polymeric inks into porous media follows (approximately) the Washburn equation for capillary flow into and through porous media, as initially described in Washburn, E. W, (1921), *The Dynamics of Capillary Flow.* Physical Review, Vol. 17, Iss. 3, pg. 273-283. According to the Washburn equation, the distance traveled by the printed ink into and through the paper is proportional to the square root of time. For thick papers and ink viscosities of commercial relevance, in some cases the time needed for the hydrophobic ink to reach the opposing filter paper surface can be substantial when compare to the time scale of a roll-to-roll manufacturing process. Due to this sub-linear distance-versus-time relationship of ink penetration into the paper, with some ink and paper combinations used in roll-to-roll processes, the ink can be selected to penetrate the paper more quickly by printing about half the ink on one side of the paper, solidifying, printing the other half of the ink in registration on the opposing side of the paper, and then solidifying.

Figure 1E:
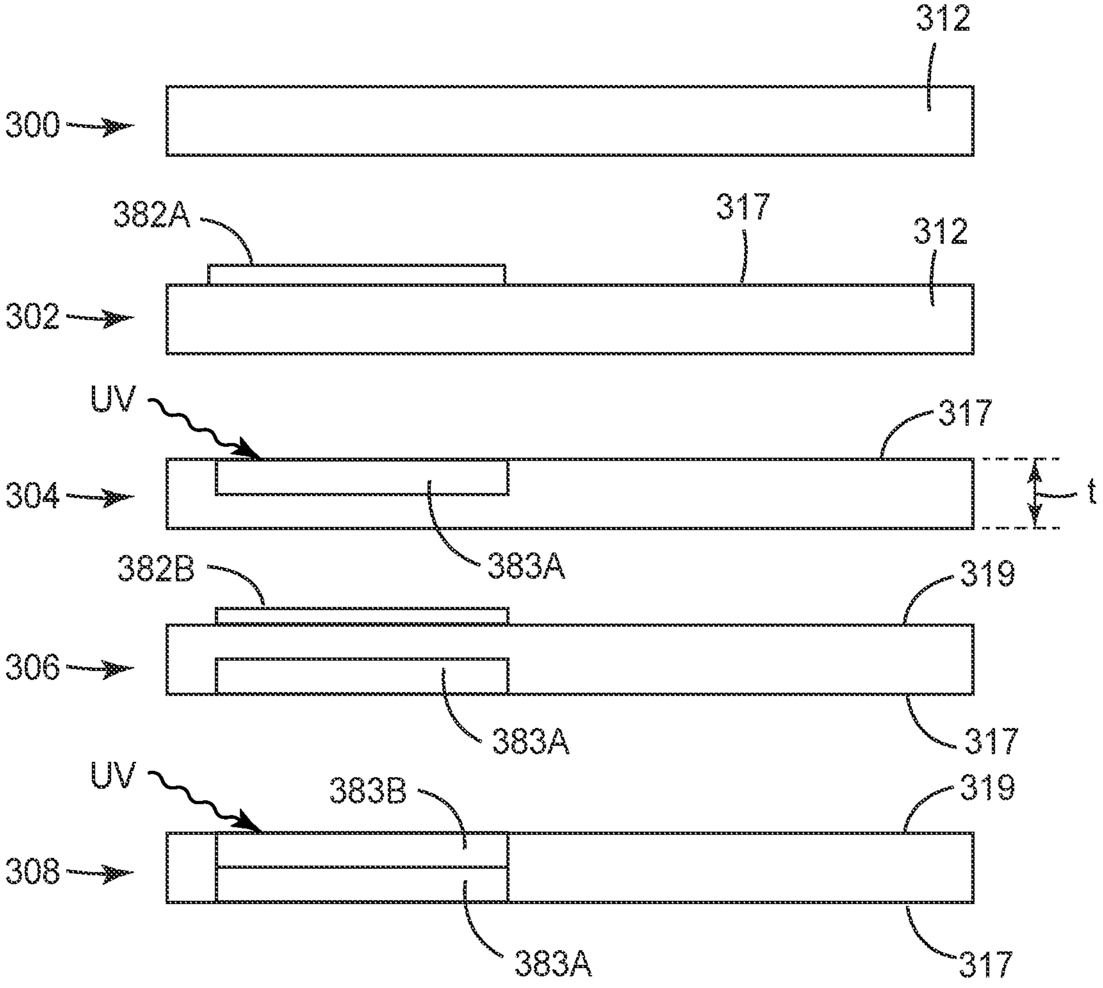
FIG. 1E is a schematic diagram of a dual-sided printing process for applying the hydrophobic ink composition to a porous substrate.

Referring now to an alternative embodiment shown schematically in FIG. 1E, in step 302 of a process 300, a first portion of a polymeric ink composition 382A is applied to a first major surface 317 of a porous substrate 312.

As shown in step 304, the first portion of the ink composition 382A wicks into about half of the thickness t of the porous substrate 312 and is hardened by, for example, ultraviolet (UV) radiation to form a first hardened ink region 383A.

In step 306, the substrate 312 is re-oriented to expose a second major surface 319, and a second portion of the polymeric ink composition 382B is applied to the surface 319 in registration with the first portion of the polymeric ink composition 382B. The second portion of the ink composition 382B wicks into the remaining part of the thickness t of the substrate 312, and meets the first hardened ink region 383A.

In step 308, the second portion of the ink composition 382B is then hardened by, for example, UV radiation to form a second hardened ink region 383B. The hardened ink regions 383A, 383B form at least one uninterrupted open ink-free path between the first major surface 317 to the second major surface 319 of the substrate 312.

Figure 1F:
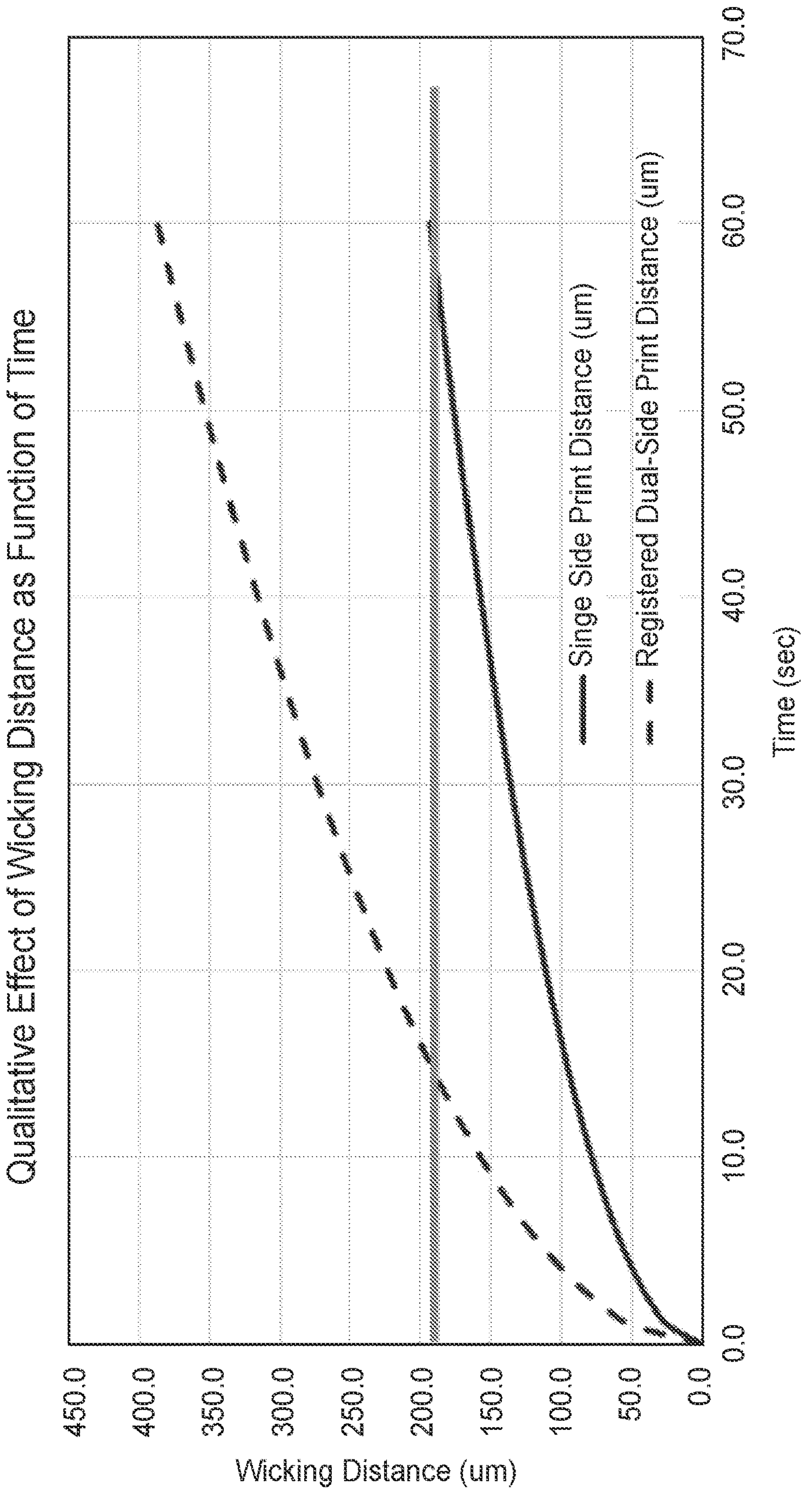
FIG. 1F is a plot that shows the sublinear effect of wicking distance as a function of time for liquids deposited onto a substrate surface, when the liquid follows the Washburn theory for capillary flow into porous media.

Pattern resolution when printing on a porous surface is also dictated approximately by the Washburn wicking relationship of ink into the paper. For example, if printed ink needs to penetrate through a 180 μm thick paper layer (e.g. Whatman #1 paper), then a substantially similar lateral wicking of the printed pattern occurs, which can lower the fidelity between the printed ink pattern at the surface of the substrate and the final dimensions of the patterned hydrophobic barrier layer. In some cases, the printed pattern can be distorted at each edge by roughly the thickness of the paper. However, by dividing the printing between two separate printing layers, the pattern resolution can effectively be increased by a factor of two, since each half layer spreads less than a single full layer of hydrophobic ink. FIG. 1F compares dual-side printing versus single side printing, and a clear resolution improvement with dual-side printing of the hydrophobic ink can be observed. The solid line in the plot of FIG. 1F shows qualitatively the time it would take for a liquid to wick through a 180 um thick paper (e.g. Whatman #1 filter paper), compared to dual-side printing which half fills the paper from each opposing surface.

In a roll-to-roll process, printing on the porous substrate is performed on a web line where the hydrophobic ink composition is printed on the substrate and then transported over an array of web idlers surfaces until it reaches a UV lamp, which quickly solidifies the ink with UV radiation. To create a barrier print in the paper, it is a requirement that the hydrophobic ink reach the opposing surface of the paper before it is solidified. Between the time when the liquid ink reaches the opposing surface and when it is solidified, there is opportunity for traces of the liquid hydrophobic ink to contact and transfer to web line idlers. This residual unsolidified liquid ink can then transfer to unpatterned hydrophilic regions of the substrate that passes over the idler at a subsequent time, which can potentially damage later-manufactured devices.

In addition, for UV-cured inks and thick substrates, in some cases the total volume of printed ink can be a challenge to cure completely. In this case, it may be necessary to run the porous substrate through multiple UV radiation stations, and it may be difficult to achieve sufficient or complete polymerization of the radiation curable ink. If some of the ink remains unsolidified, the unhardened or partially-solidified ink can contaminate the processing equipment and the hydrophilic regions of the paper—making the diagnostic device ineffective. In some cases, splitting the UV-curing between two layers can more fully polymerize the hydrophobic ink composition.

The hydrophobic regions 24, 28 thus resist absorption of a liquid applied to, for example, the hydrophilic region 26 of the first substrate portion 16, and the liquid is passively transported via capillary action or wicking between the hydrophilic regions 26, 30. While not wishing to be bound by any theory, currently available evidence indicates that the relative difference in absorption between the hydrophobic regions 24, 28 and the hydrophilic regions 26, 30 is a function of difference between the surface energy of the fibers in the hydrophilic regions for a selected liquid such as, for example, a sample fluid, a buffer, and the like, which are intended to flow between the substrate portions 16, 18, and the surface energy of the fibers coated with an ink composition deposited or patterned onto the substrate and subsequently cured to form the low surface energy ink in the hydrophobic regions 24, 28. The larger this difference, the larger the resistivity to absorption of the selected fluid in the hydrophobic regions 24, 28. The difference may also depend on, for example, the uniformity of ink coverage, the structure of the fibers, and the like.

In one example, if the sample fluid selected to flow by wicking or capillary action between the substrate portions 16, 18 is a bodily fluid, the surface energy of the fibers with the low surface energy hydrophobic ink applied thereto in the hydrophobic regions 24, 28 should be lower than the lowest value of the surface tension of the bodily fluid. Because bodily fluids have a range of surface tensions, the surface energy of the fibers in the hydrophobic regions 24, 28 should be at least 10 dyne/cm lower than the lowest surface tension of the bodily fluid, or at least 15 dyne/cm lower, or at least 20 dyne/cm lower, or even at least 30 dyne/cm lower. For example, it is reported that human urine has a minimum surface tension of about 55 dyne/cm, and human saliva has a surface tension of about 40 dyne/cm, so to resist absorption of these bodily fluids by wicking or capillary action the hydrophobic regions 24, 28 surface energy of ink should have a surface tension of less than about 45 dyne/cm, or less than about 40 dyne/cm, or less than about 35 dyne/cm, or less than about 30 dyne/cm, or less than about 25 dyne/cm, or less than about 20 dyne/cm.

In another example, to resist capillary flow or wicking of a selected fluid, presently available evidence indicates that the hydrophobic ink compositions in the regions 24, 28, when hardened, provide a contact angle for the selected fluid of greater than about 90°, or greater than about 95°, or greater than about 100°, or greater than about 105°, or greater than about 110°, or greater than about 115°, or greater than about 120°, or greater than about 125°, or greater than about 130°, or greater than about 135°, or even greater than about 140°.

Contact angles and wettability may be measured using the techniques described in, for example, CAPILLARITY AND WETTING PHENOMENA DROPS, BUBBLES, PEARLS, WAVES by Francoise Brochard-Wyart; David Quere, Hardcover; New York: Springer, Sep. 12, 2003; WETTABILITY (SURFACTANT SCIENCE) by John Berg, ed., CRC Press; 1 edition, Apr. 20, 1993, each of which are incorporated herein by reference in their entirety.

In various embodiments, the hydrophobic ink composition includes at least one polymerizable low surface energy monomer, oligomer, or polymer that can provide a desired resistance to absorption of a selected liquid or sample fluid. This low surface energy monomer, oligomer, or polymer can be a fluorocarbon, silicone, or hydrocarbon. The low surface energy monomer, oligomer, or polymer is added to the formulation to reduce the surface energy of the cured hydrophobic coating to a wetting tension of from about 30 to less than about 38 mJ/m2 as measured by ASTM D 2578-08. Examples of suitable polymerizable low surface energy monomers, oligomers and polymers are described in WO2011/094342, which is incorporated by reference herein in its entirety.

In some embodiments, the hydrophobic region 24, 28 includes a non-tacky crosslinked polymeric layer. This polymeric layer is made from a radiation curable coating formulation containing at least one low surface energy monomer, oligomer, or polymer chosen from the group of polymerizable fluorocarbon, silicone, or hydrocarbon monomers.

The non-tacky crosslinked polymeric layer may be formed by polymerizing a precursor composition, although other methods (e.g., crosslinking of a polymer or blend thereof using chemical means or ionizing radiation) may also be used. Useful precursor compositions typically include one or more polymerizable materials (e.g., monomers and/or oligomers, which may be monofunctional and/or polyfunctional), a curative, and optionally inorganic particles. Polymerizable materials may be, for example, free-radically polymerizable, cationically polymerizable, and/or condensation polymerizable.

Useful polymerizable materials include, for example, acrylates and methacrylates, epoxies, polyisocyanates, and trialkoxysilane terminated oligomers and polymers. Preferably, the polymerizable material includes a free-radically polymerizable material.

Useful free-radically polymerizable materials include, for example, free-radically polymerizable monomers and/or oligomers, either or both of which may be monofunctional or multifunctional. Exemplary free-radically polymerizable monomers include styrene and substituted styrenes (e.g., a-methylstyrene); vinyl esters (e.g., vinyl acetate); vinyl ethers (e.g., butyl vinyl ether); N-vinyl compounds (e.g., N-vinyl-2-pyrrolidone, N-vinylcaprolactam); acrylamide and substituted acrylamides (e.g., N,N-dialkylacrylamides); and acrylates and/or methacrylates (i.e., collectively referred to herein as (meth)acrylates) (e.g., isooctyl (meth)acrylate, nonylphenol ethoxylate (meth)acrylate, isononyl (meth) acrylate, diethylene glycol (meth)acrylate, isobornyl (meth) acrylate, 2-(2-ethoxyethoxy)ethyl (meth)acrylate, 2-ethylhexyl (meth)acrylate, lauryl (meth)acrylate, butanediol mono(meth)acrylate, β-carboxyethyl (meth)acrylate, isobutyl (meth)acrylate, 2-hydroxyethyl (meth)acrylate, (meth)acrylonitrile, isodecyl (meth)acrylate, dodecyl (meth) acrylate, n-butyl(meth)acrylate, methyl (meth)acrylate, hexyl (meth)acrylate, (meth)acrylic acid, stearyl (meth)acrylate, hydroxy functional polycaprolactone ester (meth)acrylate, hydroxyethyl (meth)acrylate, hydroxymethyl (meth) acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, ethylene glycol di(meth)acrylate, hexanediol di(meth)acrylate, triethylene glycol di(meth)acrylate, 1,3-propylene glycol di(meth)acrylate, tetraethylene glycol di(meth)acrylate, trimethylolpropane tri(meth)acrylate, 1,4-cyclohexanediol di(meth)acrylate, 1,5-pentanediol di(meth)acrylate, ethoxylated trimethylolpropane tri(meth)acrylate, glycerol tri (meth)acrylate, pentaerythritol tri(meth)acrylate, pentaerythritol tetra(meth)acrylate, dipentaerythritol penta (meth)acrylate, and neopentyl glycol di(meth)acrylate).

Exemplary free-radically polymerizable oligomers include those marketed by UCB Chemicals, Smyrna, Ga. (e.g., under the trade designation "EBECRYL"), and those marketed by Sartomer Company, Exton, PA (e.g., under the trade designations "KAYARAD" or "CN").

Depending on the choice of polymerizable material, the precursor composition may, optionally, contain one or more curatives that assist in polymerizing the polymerizable material. The choice of curative for specific polymerizable materials depends on the chemical nature of the copolymerizable material. For example, in the case of epoxy resins, one would typically select a curative known for use with epoxy resins (e.g., dicyandiamide, onium salt, or polymercaptan). In the case of free-radically polymerizable resins, free radical thermal initiators and/or photoinitiators are useful curatives.

Typically, the optional curative(s) is used in an amount effective to facilitate polymerization of the monomers and the amount will vary depending upon, for example, the type of curative, the molecular weight of the curative, and the polymerization process. The optional curative(s) is typically included in the precursor composition in an amount in a range of from about 0.01 percent by weight to about 10 percent by weight, based on the total weight of the precursor composition, although higher and lower amounts may also be used. The precursor composition may be cured, for example, by exposure to a thermal source (e.g., heat, infrared radiation), electromagnetic radiation (e.g., ultraviolet and/or visible radiation), and/or particulate radiation (e.g., electron beam of gamma radiation).

A variety of curing strategies can be readily selected, determined in part upon the characteristics of the curable coating composition, other components of the article, as well as manufacturing facilities. Illustrative techniques for maximizing the cure of a UV cured coating composition include curing under nitrogen, using new UV bulbs, cleaning the UV bulbs before use, matching the output spectrum of the UV bulb to the absorption of the initiator, and treatment at a slow speed and/or for a longer time. In some embodiments, a certain amount of post-exposure cure may take place over time as the dry erase article ages at room temperature.

A second cure treatment may be required in addition to the first cure described above. The second cure may use the same radiation source as the first cure, or it may use a different radiation source. Preferred second cure methods include heat, electron beam, and gamma ray treatment.

If the optional curative is a free-radical initiator, the amount of curative is preferably in a range of from about 1 percent by weight to about 5 percent by weight, based on the total weight of the precursor composition, although higher and lower amounts may also be used. Useful free-radical photoinitiators include, for example, benzoin ethers such as benzoin methyl ether and benzoin isopropyl ether, substituted benzoin ethers (e.g., anisoin methyl ether), substituted acetophenones (e.g., 2,2-dimethoxy-2-phenylacetophenone), substituted alpha-ketols (e.g., 2-methyl-2-hydroxypropiophenone), benzophenone derivatives (e.g., benzophenone), and acylphosphine oxides. Exemplary commercially available photoinitiators include photoinitiators under the trade designation "IRGACURE" (e.g., IRGACURE 651, IRGACURE 184, and IRGACURE 819) or "DAROCUR" (e.g., DAROCUR 1173, DAROCUR 4265) from Ciba Specialty Chemicals, Tarrytown, New York, and under the trade designation "LUCIRIN" (e.g., "LUCIRIN TPO") from BASF, Parsippany, New Jersey.

Exemplary free-radical thermal initiators include peroxides such as benzoyl peroxide, dibenzoyl peroxide, dilauryl peroxide, cyclohexane peroxide, methyl ethyl ketone peroxide, hydroperoxides, for example, tert-butyl hydroperoxide and cumene hydroperoxide, dicylohexyl peroxydicarbonate, t-butyl perbenzoate, and azo compounds, for example, 2, 2,-azo-bis(isobutyronitrile).

The low surface energy monomers, oligomers, or polymers may be chosen from the group of fluorocarbon, silicone, or hydrocarbon monomers. Fluorocarbon monomers suitable for the hydrophobic ink composition include but are not limited to perfluoro acrylates or methacrylates, e.g., C4F9 based sulfonamide acrylates and C3F7 based sulfonamide acrylates.

Fluorochemical oligomers suitable for use in the hydrophobic ink compositions herein include the commercially available chemicals FLUORAD™ FC-4430 and FC-4432 from 3M Company. St. Paul, MN. Suitable fluorochemical polymers include perfluoropolyether polymers with poly (alkylene oxide) repeat units, e.g., as described in PCT Application No. WO2009/076389 (Yang et al). Suitable silicone monomers include, but are not limited to, silicone acrylate monomers. Exemplary silicone acrylate monomers suitable for use herein include BYK-371 Reactive Silicone Surface Additive, BYK-373 Reactive Silicone Surface Additive. BYK-377 Reactive Silicone Surface Additive. BYK-UV 3500 Surface Additives for Radiation Curable Systems, BYK-UV 3530 Surface Additives for Radiation Curable Systems. BYK-UV 3570 Surface Additives for Radiation Curable Systems, and BYK SILCLEAN 3710 Surface Additives to improve Surface Cleanability from BYK-Chemie GmBH, Wesel, Germany. Other suitable silicone monomers include those available under the trade designations TEGORAD 2100. TEGORAD 2200N, TEGORAD 2250, and TEGORAD 2300 silicone acrylate monomers from Evonik Goldschmidt Corporation, Hopewell, VA.

Hydrocarbon monomers can be used to reduce the surface energy of a coating. Those hydrocarbon monomers are characterized by a long side chain that can form a crystalline structure on a surface. Suitable hydrocarbon monomers include but are not limited to octadecyl acrylate.

In one embodiment, the low surface energy monomers, oligomers, or polymers are added to a coating formulation in a concentration sufficient to produce a cured coating with a wetting tension of from about 20 to about 40 $mJ/m^2$. In some embodiments, the wetting tension of the cured coating is from about 30 to about 36 $mJ/m^2$.

In some embodiments, the radiation curable material includes the foregoing oligomer(s), monomer(s) and/or polymer(s) in one or more solvents along with a volume of optional particles or nanoparticles, e.g., to impart increased hardness and durability to the writing member. In some cases, dilution of the hydrophobic ink in solvent can promote faster wicking into the porous or fibrous substrate (by lowering the viscosity of the ink) and can leave more interconnected space between the fibers.

Nanoparticles can be surface modified which refers to the fact that the nanoparticles have a modified surface so that the nanoparticles provide a stable dispersion. "Stable dispersion" refers to a dispersion in which the colloidal nanoparticles do not agglomerate after standing for a period of time, such as about 24 hours, under ambient conditions, e.g., room temperature (i.e., about 20 to about 22° C.), and atmospheric pressure, without extreme electromagnetic forces.

Surface-modified colloidal nanoparticles can optionally be present in a polymer coating used as a coatable composition herein with nanoparticles present in an amount effective to enhance the durability of the finished or optical element. The surface-modified colloidal nanoparticles described herein can have a variety of desirable attributes, including, for example, nanoparticle compatibility with a coatable composition such that the nanoparticles form stable dispersions within the coatable composition, reactivity of the nanoparticle with the coatable composition making the composite more durable, and a low impact or uncured composition viscosity. A combination of surface modifications can be used to manipulate the uncured and cured properties of the composition. Surface-modified nanoparticles can improve optical and physical properties of the coatable composition such as, for example, improved resin mechanical strength, minimized viscosity changes while increasing solids volume loading in the coatable composition and maintain optical clarity while increasing solid volume loading in the coatable composition.

In some embodiments, the nanoparticles are surface-modified nanoparticles. Suitable surface-modified colloidal nanoparticles can comprise oxide particles. Nanoparticles may comprise a range of particle sizes over a known particle size distribution for a given material. In some embodiments, the average particle size may be within a range from about 1 nm to about 100 nm. Particle sizes and particle size distributions may be determined in a known manner including, for example, by transmission electron microscopy ("TEM"). Suitable nanoparticles can comprise any of a variety of materials such as metal oxides selected from alumina, tin oxide, antimony oxide, silica, zirconia, titania and combinations of two or more of the foregoing. Surface-modified colloidal nanoparticles can be substantially fully condensed.

In some embodiments, silica nanoparticles can have a particle size ranging from about 5 to about 100 nm. In some embodiments, silica nanoparticles can have a particle size ranging from about 10 to about 30 nm. Silica nanoparticles can be present in the coatable composition in an amount from about 10 to about 100 phr. In some embodiments, silica nanoparticles can be present in the coatable composition in an amount from about 30 to about 90 phr. Silica nanoparticles suitable for use in the coatable compositions of the present disclosure are commercially available from Nalco Chemical Co. (Naperville, IL) under the product designation NALCO COLLOIDAL SILICAS. Suitable silica products include NALCO products 1040, 1042, 1050, 1060, 2327 and 2329. Suitable fumed silica products include, for example, products sold under the AEROSIL series OX-50, -130, -150, and -200 available from DeGussa AG. (Hanau, Germany), and CAB-O-SPERSE 2095, CAB-O-SPERSE A 105, and CAB-O-SIL MS available from Cabot Corp. (Tuscola, IL). Surface-treating the nanosized particles can provide a stable dispersion in the coatable composition (e.g., a polymeric resin). Preferably, the surface-treatment stabilizes the nanoparticles so that the particles will be well dispersed in the coatable composition and results in a substantially homogeneous composition.

Furthermore, the nanoparticles can be modified over at least a portion of its surface with a surface treatment agent so that the stabilized particle can copolymerize or react with the coatable composition during curing. Silica nanoparticles can be treated with a surface treatment agent. Surface treatment agents suitable for particles to be included in the coatable composition include compounds such as, for example, isooctyl trimethoxy-silane. N-(3-triethoxysilylpropyl) methoxyethoxyethoxy ethyl carbamate (PEG3TES), SILQUEST A1230, N-(3-triethoxysilylpropyl) methoxy ethoxyethoxyethyl carbamate (PEG2TES), 3-(methacryloyloxy)propyl trimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl) methyldimethoxy silane, 3-(methacryloyloxy)propyldimethylethoxysilane, 3-(methacryloyloxy)propyldimethy ethoxysilane, vinyldimethylethoxy silane, phenyltrimethoxysilane, n-octyltrimethoxysilane, dodecyltrimethoxysilane, octadecyltrimethoxysilane, propyltrimethoxysilane, hexyltrimethoxy silane, vinylmethyldiacetoxysilane, vinylmethyldiethoxysilane, vinyltriacetoxysilane, vinylthioethoxy silane, vinyltrisopropoxysilane, vinyltrimethoxy silane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane,3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures of two or more of the foregoing.

In some embodiments, the average particle sizes (e.g., particle diameter) may be within the range from about 1 nm to about 1000 nm. In addition to the foregoing particle sizes, use of smaller and larger average particle sizes are also contemplated. In embodiments of the disclosure, at least a portion of the foregoing particles may be surface modified in the manner described above. In other embodiments, all the particles are surface modified. In still other embodiments, none of the particles are surface modified.

As will be understood, coating compositions used to make the hydrophobic regions of the present disclosure may include optional additives to enhance or control characteristics as desired, e.g., rheology modifiers such as JAYLINK Rheology Modifiers, colorants (e.g., dyes and/or pigments), fire retardants, antioxidants, stabilizers, antiozonants, plasticizers, UV absorbers, hindered amine light stabilizers (HALS), etc.

The hydrophobic ink compositions suitable to form the hydrophobic regions 24, 28 may include any commercially available ink that creates a desired resistance to capillary flow or wicking of a selected liquid such as, for example, a sample fluid. Suitable examples include, but are not limited to, NAZDAR 9400 Series UV Flexo Inks or OP Series Inks (available from NAZDAR Ink Technologies of Shawnee, KS, United States) such as 9418 or OP 1028. In some embodiments, the ink composition is hardenable or curable with radiation, such as, for example ultraviolet (UV) light.

In some embodiments, the hydrophobic ink composition may include a solvent selected to provide, for example, optimal wicking properties along the fibers of the substrate 12. Suitable solvents include, but are not limited to, water, alcohols, ethers, ketones, esters, and mixtures and combinations thereof.

The hydrophobic regions 24, 28 may be patterned with the hardenable hydrophobic ink by any suitable technique including, but not limited to coating, screening, stamping, printing, photolithography, and combinations thereof. In some embodiments, the patterning technique may include heating the ink composition to a suitable temperature such that the ink wicks and flows along the fibers of the substrate, but does not occupy interstitial regions between the fibers. The interstitial regions in the hydrophobic regions 24, 28 are sufficiently open and interconnected to allow some fluid flow between the major surfaces 17, 19 and 21, 23 of the substrate 12, but a fluid flow rate between the major surfaces of the substrate 12 in the hydrophobic regions 24, 28 is significantly lower that that of the hydrophilic regions 26, 30, so that a fluid placed in the hydrophilic regions 26, 30 avoids the hydrophobic regions 24, 28 and remains in the hydrophilic regions 26, 30 to proceed along the sample flow path 32.

In various embodiments, the optional connection regions 34, 36 may vary widely, and can include any type of adhesive such as, for example, pressure sensitive adhesives, hot-melt adhesives, cohesive adhesives, and mixtures and combinations thereof. In the present application, the term cohesive adhesive refers to adhesive materials that adhere to each other, but have low adhesion, or no adhesion, to other non-adhesive surfaces.

Suitable pressure-sensitive adhesives ("PSAs") are defined herein as adhesives which exhibit permanent tack at room temperature. This property allows pressure-sensitive adhesives to adhere tenaciously upon application with only light finger pressure. PSAs have a balance of properties: adhesion, cohesion, stretchiness, and elasticity. Adhesion refers both to immediate adhesion to a surface and to the bond strength which develops upon application of pressure (often measured as "peel strength"). Cohesion refers to the "shear strength" or resistance of the applied PSA to failure when subjected to shearing forces. Stretchiness refers to the ability to elongate under low stresses. Elasticity refers to a property wherein the material exhibits a retractive force when stretched and retracts when the force is released. A general description of pressure-sensitive adhesives may be found in the Encyclopedia of Polymer Sciences and Engineering, Vol. 13, Wiley-Interscience Publishers (New York, 1988).

In one example embodiment, a suitable cohesive adhesive as utilized herein includes quick-drying adhesives that, once dried, will create a surface with essentially no tack and will only adhere to other surfaces coated with the same adhesive when placed under pressure. Cohesive adhesives bond to themselves at ambient temperature with pressure, yet are essentially tack free to the touch, allowing coated substrates to be folded or wound upon themselves and stored without adhering to the opposing face of the substrate backing.

In various embodiments, suitable cohesive adhesives include latex or water-based adhesive compositions that, after drying, are substantially tack free to the touch, yet will adhere to themselves at ambient temperature with a pressure of 100 psi, and preferably at a pressure of about 60 psi or less. The bond strength of the self-seal may vary depending on the coat weight, pressure, and dwell time used. However, at minimum the removal force is at least about 10 g/linear inch, typically at least about 20 g/linear inch, preferably at least 50 g/linear inch, and most preferably at least about 100 g/linear inch. Substantially tack free to the touch means that the dried composition is nonblocking.

The cohesive adhesive is further capable of being applied to a hydrophilic substrate material at a relatively high rate of production and of being dried relatively quickly. As a result, the cohesive adhesive enables the manufacture of relatively low-cost diagnostic devices at production rates much faster than conventional adhesive materials used in the art.

Adhesives of this type have been employed in a variety of packaging applications including food (i.e. flexible packaging for candy wrappers, chips etc.); medical packaging; self-seal and tamper evident envelopes; banding for paper money, napkins, and clothing; and protective packaging such as fold over "blister" packages for hardware and small parts.

In some embodiments, for example, the cohesive adhesive may be applied using a high-speed printing process to reduce film thickness, further enabling the manufacture of a diagnostic device at production rates much faster than conventional adhesive materials used in the art. In some embodiments, which are provided as examples and not intended to be limiting, suitable cohesive adhesives include emulsions of natural and/or synthetic latex rubber in aqueous solution of ammoniated water with a solids content between 15 and 65 percent by weight.

In some example embodiments, which are not intended to be limiting, the viscosity of a suitable cohesive adhesive may be between 10 and 450 centipoise (cP) at 20 revolutions per minute and 23° C. per ASTM D1084 Test Method B. In some embodiments, the density of cohesive adhesive may be between 8.0 and 9.0 pounds per gallon (lb/gal) at 25° C., and the basicity or pH may be between 9.5 and 12.

In various embodiments, the cohesive adhesive may optionally contain dispersants, surfactants, tackifiers, isocyanates, antioxidants, and antifoaming agents, as is well known in the art, without deviating from the scope of the disclosure.

In at least one embodiment of the present disclosure, which is not intended to be limiting, the cohesive adhesive has the following properties: the solids content is 57.5 percent by weight, the viscosity is 75 cP at 25° C., the density is 8.3 lb/gal, and the pH is 10.0. In at least one embodiment of the present disclosure, the adhesive has a solids content between 45 and 58 percent by weight, a viscosity between 75 and 200 cP at 23° C., a density between 8.3 and 8.7 lb/gal at ° C., and a pH of 10 to 11.

In some embodiments, mechanical fasteners may be utilized to maintain the alignment of one or more of the hydrophilic regions in overlying layers or panels of the diagnostic device, either alone or in combination with any of the adhesive layers described above. Suitable mechanical fasteners include, but are not limited to, plastic or metal clips, staples, elastic bands such as plastic or rubber bands, plastic zip ties and combinations thereof. The mechanical fasteners may also be used to compress the stack of porous substrate layers and maintain intimate contact between layers, which in some examples can reduce wicking times between the layers. The hydrophilic regions in the layers should be in intimate contact with each other so a liquid flows inside paper pores and not in gaps between the layers of the stack. In some examples, intimate contact between the layers of the stack can be enhanced by placing the arms of a clamping mechanical fastener along the edges or folds of the porous substrate.

Compression can be applied across the whole device or at the folded edges. Compressing the device can provide intimate contact between the layers of the diagnostic device, which can improve the flow of fluid through the layers by avoiding air gaps. In an embodiment, it may be advantageous to only compress the device at the edges. It was found that over-compression of the device decreases the porosity of the hydrophilic regions and inhibits the flow of fluid through the layers. Compression of the device can be achieved when the edges of the device are dry or wet. Dry compression can be advantageous when wetting the device is undesirable. Wet compression can be advantageous by decreasing the resistance to bending the fibers at the edge of the device. Wetting of the device can be accomplished by applying a small amount of water along the edges of the device. Compression decreases the springy-ness of the folded device by bending or breaking the fibers at the edge of the device through high pressure. Additional methods of compressing the device include an arbor press, nipped-roller, other methods known in the art.

In general, a wide variety of reagents 40 may be disposed in, or in fluid communication with, the test area 42 in hydrophilic regions 26, 30 of the diagnostic device 10 to detect one or more analytes in a sample fluid. These reagents include, but are not limited to, antibodies, nucleic acids, aptamers, molecularly-imprinted polymers, chemical receptors, proteins, peptides, inorganic compounds, and organic small molecules. In a given device, one or more reagents may be adsorbed to one or more hydrophilic regions 26, 30 (non-covalently through non-specific interactions), or covalently (as esters, amides, imines, ethers, or through carbon-carbon, carbon-nitrogen, carbon-oxygen, or oxygen-nitrogen bonds).

Any reagent 40 needed in the assay may be provided within, or in a separate adsorbent layer in fluid communication with the test area 42 within the hydrophilic regions 26, 30 and the sample flow path 32. Exemplary assay reagents include protein assay reagents, immunoassay reagents (e.g., ELISA reagents), glucose assay reagents, sodium acetoacetate assay reagents, sodium nitrite assay reagents, or a combination thereof. In various embodiments, which are not intended to be limiting, the diagnostic device 10 may include, a blocking agent, enzyme substrate, specific binding reagent such as an antibody or sFv reagent, labeled binding agent, e.g., labeled antibody, may be disposed in the device within or in flow communication with one or more of the hydrophilic regions 26, 30, or in a specific area thereof configured as a test area 42.

In some embodiments, a binder, e.g., an antibody, may be labeled with an enzyme or a colored particle to permit colorimetric assessment of analyte presence or concentration in a sample fluid. For example, the binder may be labeled with gold colloidal particles or the like as the color forming labeling substance. Where an enzyme is involved as a label, e.g., alkaline phosphatase, horseradish peroxidase, luciferase, or β-galactosidase, an enzyme substrate may be disposed in the device within or in flow communication with one of the hydrophilic regions 26, 30. Exemplary substrates for these enzymes include BCIP/NBT, 3,3',5,5'-Tetramethylbenzidine (TMB), 3,3'-Diaminobenzidine (DAB), and 2,2'-azino-bis(3-ethylbenzthiazoline-6-sulphonic acid) (ABTS), 4-methylumbelliferphosphoric acid, 3-(4-hydroxyphenyl)-propionic acid, or 4-methylumbellifer-β-D-galactoside, or the like. In various embodiments, the reagent(s) 40 develop color in one or more test areas 42 along the sample path 32 (including gradations from white to black) as an indication of the presence, absence or concentration of an analyte in a sample.

In some embodiments, a device may include many reagents 40 disposed along the sample flow path, each of which can react with a different analyte to produce a detectable effect. Alternatively, the reagents 40 may be sensitive to a predetermined concentration of a single analyte.

In some embodiments, the reagent 40 may include a washing reagent, or plural wash reagents such as buffers or surfactant solutions, within or in fluid communication with a hydrophilic region 26, 30 or the sample flow path 32. Washing reagent(s) function to wash an analyte by removing unbound species within the hydrophilic regions 26, 30. For example, a suitable washing buffer may comprise PBS, detergent, surfactants, water, and salt. The composition of the washing reagent will vary in accordance with the requirements of the specific assay such as, for example, the particular capture reagent and indicator reagent employed to determine the presence of a target analyte in a test sample, as well as the nature of the analyte itself.

Alternatively, steps of a reaction using the devices disclosed herein may be washed as follows. In certain embodiments, defined hydrophilic regions 26, 30 do not contain a reagent 40. In such case, water or buffer is then added to the hydrophilic regions 26, 30 of the device 10 and the fluid passes through the device along the sample flow path 32 to provide a washing step for the analytes in the fluid sample. Such washing steps can be used to remove unbound analyte or other components added for the detection of the presence of an analyte.

The hydrophilic regions 26, 30 can include one or more test areas 42 that can be used to perform one or more assays for the detection of multiple analytes in the sample fluid. One or more of the hydrophilic regions 26, 30 can be treated with reagents 40 that respond to the presence of analytes in a sample fluid and provide an indicator of the presence of an analyte in the sample fluid. In some embodiments, the detection of an analyte in the sample fluid is visible to the naked eye and can provide a color indicator of the presence of the analyte. In various embodiments, indicators may include molecules that become colored in the presence of the analyte, change color in the presence of the analyte, or emit fluorescence, phosphorescence, or luminescence in the presence of the analyte. In other embodiments, radiological, magnetic, optical, and/or electrical measurements can be used to determine the presence of proteins, antibodies, or other analytes in the sample flow path 32.

In certain embodiments, analytes may be detected by direct or indirect detection methods that apply the principles of immunoassays (e.g., a sandwich or competitive immunoassay or ELISA).

In some embodiments, to detect a specific protein, one or more areas of the hydrophilic regions 26, 30 can be derivatized with reagents 40, such as antibodies, ligands, receptors, or small molecules that selectively bind to or interact with a protein in the sample fluid. For example, to detect a specific antigen in a sample, a test area 42 of the hydrophilic regions 26, 30 can be derivatized with reagents such as antibodies that selectively bind to or interact with that antigen. Alternatively, to detect the presence of a specific antibody in the sample fluid, a test area 42 of the hydrophilic regions 26, 30 may be derivatized with antigens that bind or interact with that antibody. For example, reagents 40 such as small molecules and/or proteins can be covalently linked to the hydrophilic regions 26, 30 using similar chemistry to that used to immobilize molecules on beads or glass slides, or using chemistry used for linking molecules to carbohydrates. In alternative embodiments, the reagents 40 may be applied and/or immobilized in the hydrophilic regions 26, 30 by applying a solution containing the reagent and allowing the solvent to evaporate (e.g., depositing reagent into the hydrophilic region). The reagents can be immobilized by physical absorption onto the porous substrate by other non-covalent interactions.

The interaction of certain analytes with some reagents may not result in a visible color change unless the analyte was previously labeled. The devices disclosed herein may be additionally treated to add a stain or a labeled protein, antibody, nucleic acid, or other reagent that binds to the target analyte after it binds to the reagent 40 disposed in the sample flow path 32, which produces a visible color change. For example, the device 10 may include a separate area that already contains the stain, or labeled reagent, and includes a mechanism by which the stain or labeled reagent can be easily introduced into the sample flow path to bond to the target analyte after it binds to the reagent 40. Or, for example, the device 10 can be provided with a separate channel that can be used to flow the stain or labeled reagent from a different area of the hydrophilic regions 26, 30 into test area 42 along the sample flow path 32 to the target analyte after it binds to the reagent in the sample flow path. In one embodiment, this flow is initiated with a drop of water, or some other fluid. In another embodiment, the reagent and labeled reagent are applied at the same location in the device, for example, in a test area 42 of one of the hydrophilic regions 26, 30 along the sample flow path 32.

In one exemplary embodiment, ELISA may be used to detect and analyze a wide range of analytes and disease markers with the high specificity, and the result of ELISA can be quantified colorimetrically with the proper selection of enzyme and substrate.

Detection of an analyte in a sample fluid may include an additional step of creating digital data indicative of an image of a developed test area 42 and the assay result, and transmitting the data remotely for further analysis to obtain diagnostic information, or to store assay results in an appropriate database. Some embodiments further include equipment that can be used to image the device after deposition of the liquid to obtain information about the quantity of analyte(s) based on the intensity of a colorimetric response of the device. In some embodiments, the equipment establishes a communication link with off-site personnel, e.g., via cell phone communication channels, who perform the analysis based on images obtained by the equipment.

In some example embodiments, which are not intended to be limiting, the entire assay can be completed in less than 30 minutes, 20 minutes, 15 minutes, 10 minutes, or 5 minutes. In some example embodiments, the device 10 can have a detection limit of about 500 pM, 250 pm, 100 pM, 1 pM, 500 fM, 250 fM, or 100 fM.

The diagnostic device 10 of the present disclosure can be used for assaying small volumes of fluid samples. In various embodiments, the fluid samples that can be assayed include, but are not limited to, biological samples such as urine, whole blood, blood plasma, blood serum, sputum, cerebrospinal fluid, ascites, tears, sweat, saliva, excrement, gingival crevicular fluid, or tissue extract. In some embodiments, the volume of fluid sample to be assayed may be a drop of blood, e.g., from a finger prick, or a small sample of urine, e.g., from a newborn or a small animal. In some embodiments, the sample fluid is an environmental sample such as a water sample obtained from a river, lake, ocean or the like, or a sample of an industrial fluid. The device 10 may also be adapted for assaying non-aqueous fluid samples for detecting environmental contamination.

In some embodiments, a single drop of liquid, e.g., a drop of blood from a pinpricked finger, is sufficient to perform assays providing a simple yes/no answer to determine the presence of an analyte in a sample fluid, or a semi-quantitative measurement of the amount of analyte that is present in the sample, e.g., by performing a visual or digital comparison of the intensity of the assay to a calibrated color chart. However, to obtain a quantitative measurement of an analyte in the liquid, a defined volume of fluid is typically deposited in the device. Thus, in some embodiments, a defined volume of fluid (or a volume that is sufficiently close to the defined volume to provide a reasonably accurate readout) can be obtained by patterning the hydrophilic substrate 12 to include a sample well that accepts a defined volume of fluid. For example, in the case of a whole blood sample, the subject's finger could be pinpricked, and then pressed against the sample well until the well was full, thus providing a satisfactory approximation of the defined volume.

The assay reagents included in the device 10 are selected to provide a visible indication of the presence of one or more analytes in the sample fluid. The source or nature of the analytes that may be detected using the disclosed devices are not intended to be limiting. Exemplary analytes include, but are not limited to, toxins, organic compounds, proteins, peptides, microorganisms, bacteria, viruses, amino acids, nucleic acids, carbohydrates, hormones, steroids, vitamins, drugs, pollutants, pesticides, and metabolites of or, antibodies to, any of the above substances. Analytes may also include any antigenic substances, haptens, antibodies, macromolecules, and combinations thereof. For example, immunoassays using the disclosed devices could be adopted for antigens having known antibodies that specifically bind the antigen.

In exemplary embodiments, the disclosed devices may be used to detect the presence or absence of one or more viral antigens, bacterial antigens, fungal antigens, or parasite antigens, cancer antigens.

Exemplary viral antigens may include those derived from, for example, the hepatitis A, B, C, or E virus, human immunodeficiency virus (HIV), herpes simplex virus, Ebola virus, varicella zoster virus (virus leading to chicken pox and shingles), avian influenza virus, SARS virus, MERS virus, Epstein Barr virus, rhinoviruses, coronaviruses (such as, for example, the COVID19 coronavirus), and coxsackieviruses.

Exemplary bacterial antigens may include those derived from, for example, *Staphylococcus aureus, Staphylococcus epidermis, Helicobacter pylori, Streptococcus bovis, Streptococcus pyogenes, Streptococcus pneumoniae, Listeria monocytogenes, Mycobacterium tuberculosis, Mycobacterium leprae, Corynebacterium diphtheriae, Borrelia burgdorferi, Bacillus anthracis, Bacillus cereus, Clostridium botulinum, Clostridium difficile, Salmonella typhi, Vibrio chloerae, Haemophilus influenzae, Bordetella pertussis, Yersinia pestis, Neisseria gonorrhoeae, Treponema pallidum, Mycoplasm* sp., *Legionella pneumophila, Rickettsia typhi, Chlamydia trachomatis, Shigella dysenteriae*, and *Vibrio cholera.*

Exemplary fungal antigens may include those derived from, for example, *Tinea pedis, Tinea corporus, Tinea cruris, Tinea unguium, Cladosporium carionii, Coccidioides immitis, Candida* sp., *Aspergillus fumigatus*, and *Pneumocystis carinii.*

Exemplary parasite antigens include those derived from, for example, *Giardia lamblia, Leishmania* sp., *Trypanosoma* sp., *Trichomonas* sp., and *Plasmodium* sp.

Exemplary cancer antigens may include, for example, antigens expressed, for example, in colon cancer, stomach cancer, pancreatic cancer, lung cancer, ovarian cancer, prostate cancer, breast cancer, liver cancer, brain cancer, skin cancer (e.g., melanoma), leukemia, lymphoma, or myeloma.

In other embodiments, the assay reagents may react with one or more metabolic compounds. Exemplary metabolic compounds include, for example, proteins, nucleic acids, polysaccharides, lipids, fatty acids, amino acids, nucleotides, nucleosides, monosaccharides and disaccharides. For example, the assay reagent is selected to react to the presence of at least one of glucose, protein, fat, vascular endothelial growth factor, insulin-like growth factor 1, antibodies, and cytokines.

Figure 2A:
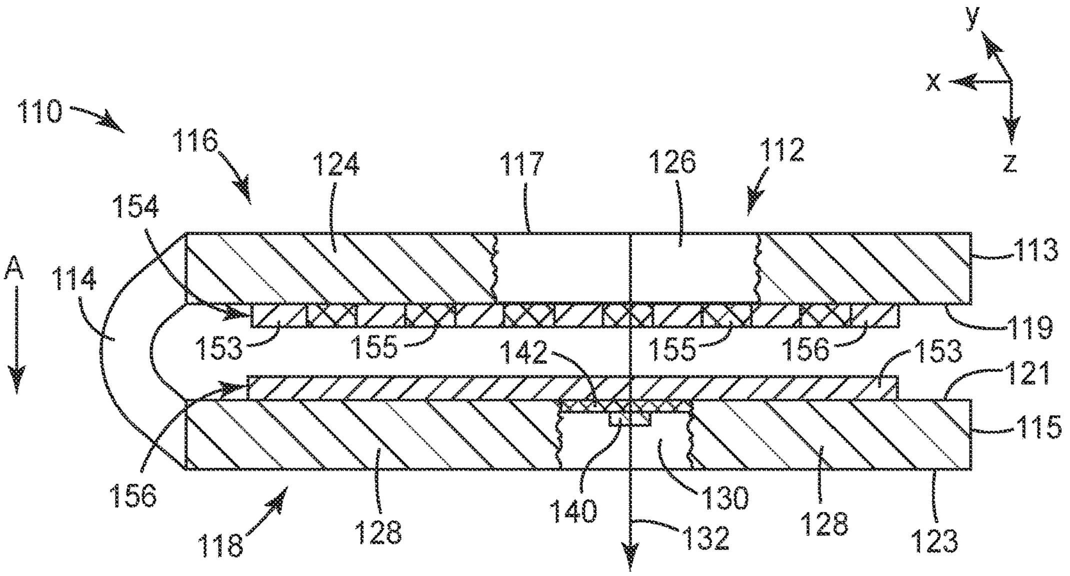
FIG. 2A is a schematic cross-sectional view of an embodiment of a diagnostic device according to the present disclosure.
Figure 2B:
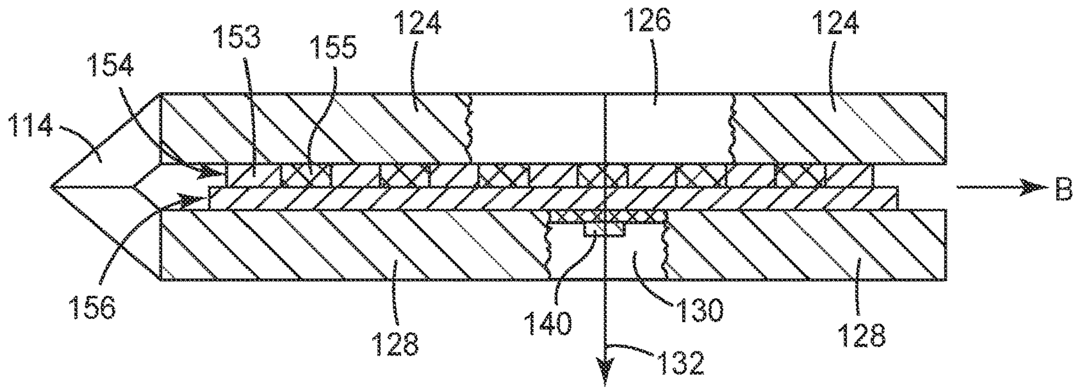
FIG. 2B is a schematic cross-sectional view of an embodiment of a diagnostic device according to the present disclosure.

Referring now to FIGS. 2A-2B, another embodiment of a diagnostic device 110 includes an elongate substantially planar hydrophilic substrate 112 with a first end 113, a second end 115, and at least one folded region 114 between the first and the second ends 113, 115. The folded region 114 separates the hydrophilic substrate 112 into a first sheet-like portion 116 and a second sheet-like portion 118, each occupying a substantially parallel plane with respect to the folded region 114. The first substrate portion 116 includes a first major surface 117 and a second major surface 119, while the second substrate portion 118 includes a first major surface 121 and a second major surface 123. In the embodiment of FIG. 2A, the first portion of the substrate 116 and the second portion of the substrate 118 overlie one another such that the respective major surfaces 119 and 121 are adjacent to each other.

The first substrate portion 116 includes a first hydrophobic region 124 and a first hydrophilic region 126, while the second substrate portion 118 includes a second hydrophobic region 128 and a second hydrophilic region 130. The hydrophobic regions 124, 128 each resist fluid flow along the direction of the arrow A, which is aligned along thickness of the substrate portions 116, 118, or along the z-axis of the three-dimensional diagnostic device 110. The hydrophilic regions 126, 130 are aligned in registration with each other such that a fluid sample placed on the first hydrophilic region 126 (not shown in FIG. 2A) can flow using, for example, wicking or capillary action, along a sample flow path 132 to provide fluid communication between the first substrate portion 116 and the second substrate portion 118 such that the fluid sample wicks into the second hydrophilic region 130.

All or a portion of one or both of the hydrophilic regions 126, 130 can include a test area 142 where an analytical result or output of the diagnostic device 110 can be displayed for a user, as well as one or more reagents 140 in the test area 142 or in fluid communication with the test area 142. The one or more reagents 140 disposed in the sample flow path 132 are selected to provide an indication of at least one of a presence, absence or concentration of an analyte in the sample fluid. In various embodiments, the reagent 140 is applied to all or a portion of one or both of the hydrophilic regions 126, 130, can be in another portion of the device 110 and in fluid communication with the flow path 132, or can be applied to the sample flow path 132 before or after the application of the fluid sample to the sample flow path 132.

Figure 2C:
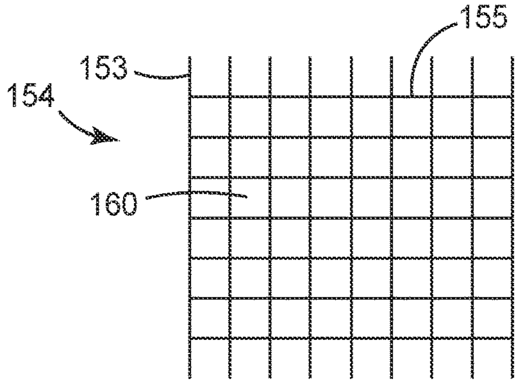
FIG. 2C is a schematic overhead view of an embodiment of a patterned adhesive suitable for use in a diagnostic device of the present disclosure.

The diagnostic device 110 includes regular or irregular grid or mesh-like first connection region 154 on the second major surface 119 of the first substrate portion 116. As shown schematically in the example embodiment of FIG. 2C, the first connection region 154 includes grid lines 153, 155 aligned substantially normal to each other.

In some embodiments, the diagnostic device 110 further includes an optional grid or mesh-like second connection region 156 on the first major surface 121 of the second substrate portion 118.

The grid-like connection regions 154, 156 are configured to include sufficient open areas 160 between the grid lines 153, 155 to allow a sample fluid to wick and flow from the first hydrophilic region 126 to the second hydrophilic region 130 along the sample flow path 132, while adhering the first substrate portion 116 to the second substrate portion 118 and maintaining the registration of the hydrophilic regions 126, 130 to preserve the alignment of the sample flow path 132 (FIG. 2B). The grid lines 153, 155 in the connection regions 154, 156, along with the hydrophobic regions 124, 128, prevent flow of the sample fluid along the direction B normal to the direction A of the sample flow path 132.

In various embodiments, the connection regions 154, 156 can include any type of adhesive described above such as, for example, pressure sensitive adhesives, hot-melt adhesives, cohesive adhesives, and the like. In some embodiments, the adhesive can be applied by spraying, printing, or use of a transfer adhesive, which provide a sufficiently open structure to allow wicking of the sample fluid between layers or panels of the device.

Figure 3A:
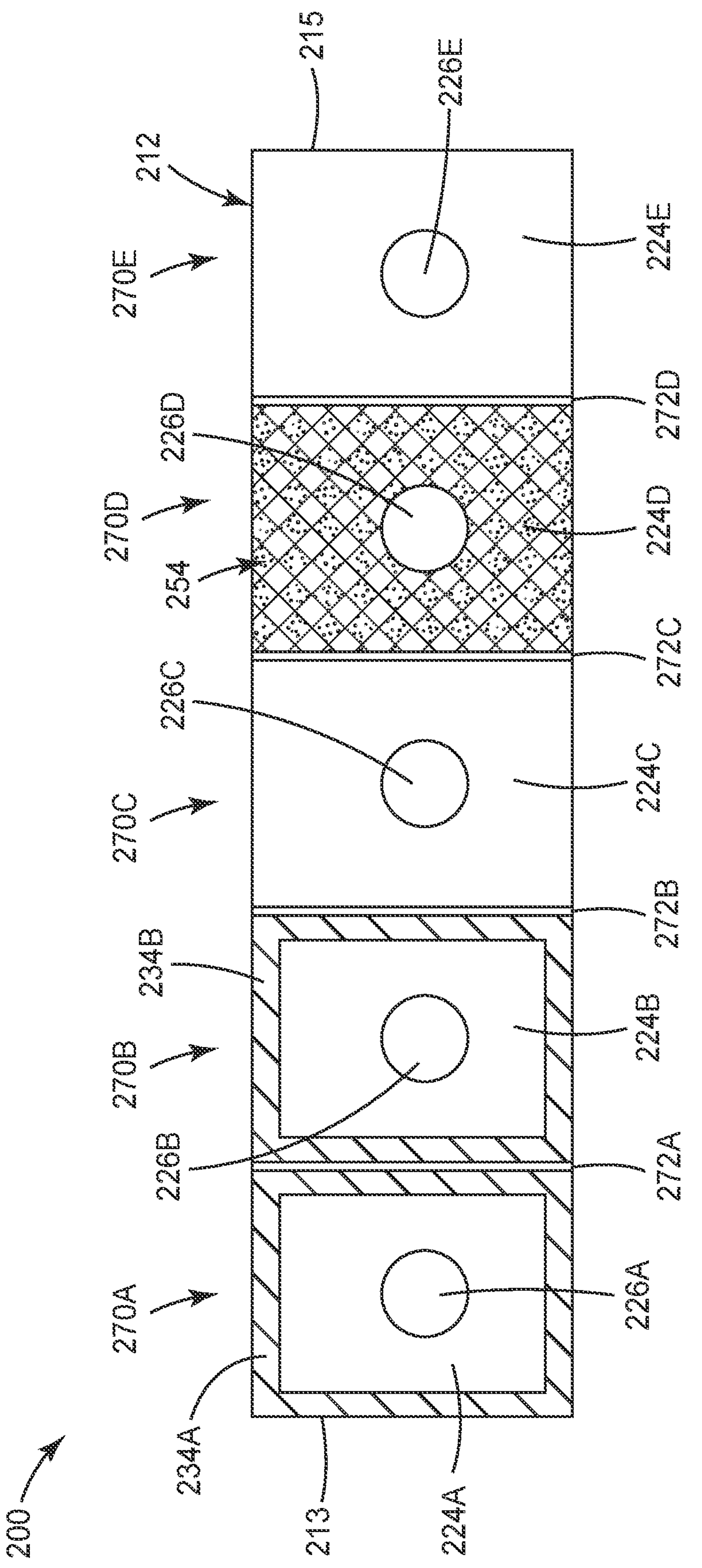
FIG. 3A is a schematic overhead view of a diagnostic device of the present disclosure.

Referring now to FIG. 3A, a portion of an elongate web 200 includes a hydrophilic substrate 212 including a first end 213 and a second end 215. The web 200 includes a plurality of web regions 270A-270E, which are separated by separation regions 272A-272D. In the embodiment of FIG. 3A, each web region 270A-270E includes a hydrophobic region 224A-224E and a hydrophilic region 226A-226E. In some embodiments, the separation regions 272 are free of the hydrophobic regions, but such an arrangement is not required. In the embodiment of FIG. 3A, the hydrophobic regions 224A-224E and the hydrophilic regions 226A-226E have the same shape, but in some embodiments the hydrophobic regions and hydrophilic regions can have different shapes, depending on the requirements of a specific diagnostic assay.

In the embodiment of FIG. 3A, the web regions 270A and 270B further include connective regions 234A, 234B that surround the hydrophilic regions 226A, 226B. In addition, in the embodiment of FIG. 3A, the web region 270D includes a patterned connective region 254 of, for example, a pressure sensitive adhesive (PSA).

Figure 3B:
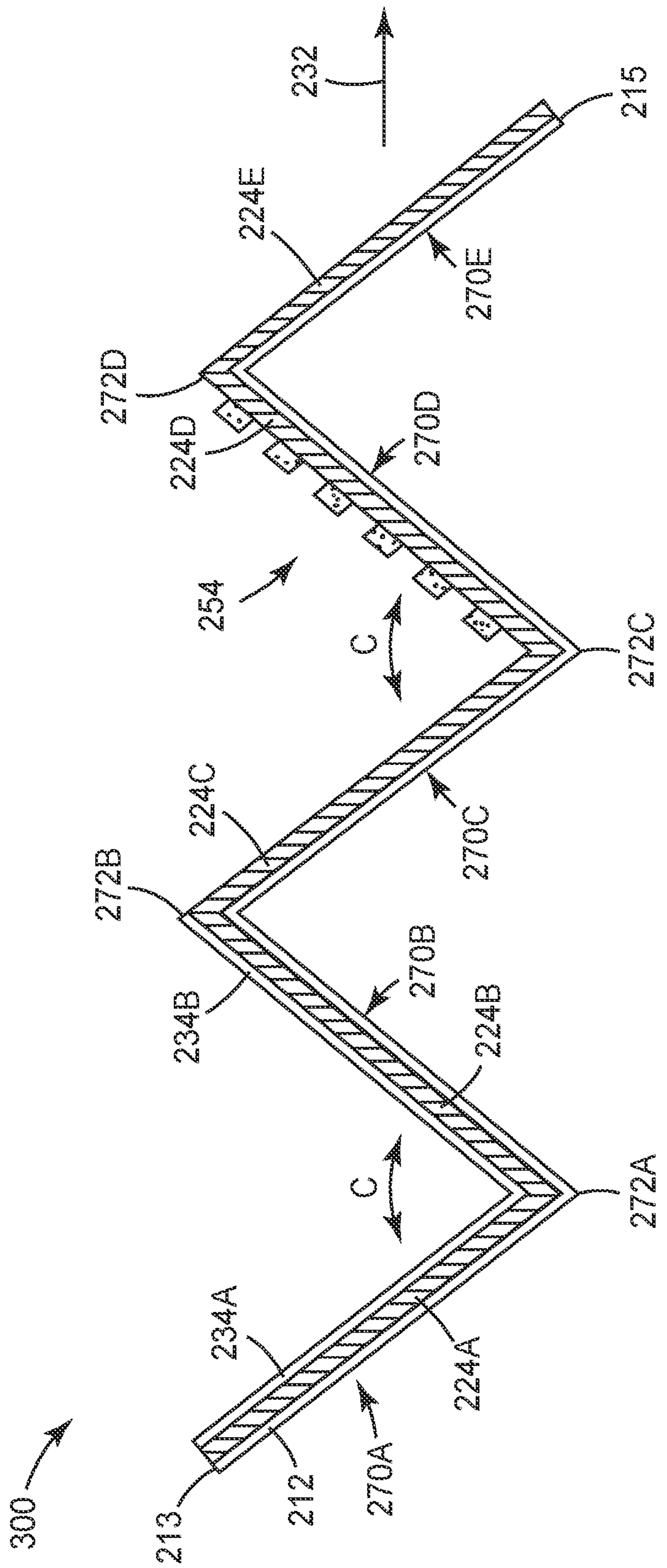
FIG. 3B is a schematic cross-sectional view of the diagnostic device of FIG. 3A.

As shown in FIG. 3B, the web 200 of FIG. 3A may be folded along the separation regions 272A-D in the direction of the arrows C to form a diagnostic device 300 including overlying and substantially parallel panels 270A-270E. When so folded, the connection regions 234A and 234B come together to adhere and maintain registration of the panels 270A-270B, and the patterned connective region 254 maintains the registration of the panels 270C-270D. The registration of the panels 270A-270E maintains alignment of the hydrophilic regions 226A-226E, which allows flow of sample fluid along a sample flow path 232 through the hydrophilic regions 226A-226E. While not shown in FIGS. 3A-3B, additional connective regions of any suitable shape or configuration may be used to maintain alignment of the hydrophilic regions in the panels 270B-C and 270D-E. In some embodiments, mechanical fasteners (not shown in FIGS. 3A-3B) may also be used, alone or in combination with adhesive connective regions, to maintain alignment of any or all of the panels 270A-270E.

As noted above, one or more reagents (not shown in FIG. 3B) may be included in any or all of the hydrophilic regions 226A-226E (FIG. 3A), and one or more of the panels 270A-270E may include a test area to indicate at least one of the presence, the absence, or the concentration of an analyte in a sample fluid.

In some embodiments (not shown in FIGS. 3A-3B), each web region 270A-270E may be printed on a separate web or area of a web. After the web is further processed, the individual web regions 270-270E may then be aligned, placed over each other in a desired order, and stacked to form a suitable diagnostic device. However, in some cases the alignment and stacking steps in such a process may increase the overall manufacturing cost of the diagnostic device compared to the folding process described in FIGS. 3A-3B.

In yet another aspect, the present disclosure is directed to assay methods including any of the embodiments of the diagnostic devices shown above. With reference to the diagnostic device 10 shown in FIGS. 1A-1B, example assay methods include adding a fluid sample including an analyte to the hydrophilic regions 26, 30 such that the sample fluid enters and wicks along the sample flow path 32 by capillary action. In some embodiments, water or a buffer may also be added to the hydrophilic regions 26, 32 to assist in the movement of the sample fluid along the sample flow path 32.

Visual or machine examination of the test area 42 within the hydrophilic regions 26, 30, or over the entire hydrophilic regions 26, 30, permits determination of at least one of a presence, absence, or concentration of the analyte in the fluid sample. For example, in some embodiments, the assay protocol produces a color reaction, which includes the development of a grey scale from black to white, and the examination of the development of or, intensity of, the color in the test area 42 within the hydrophilic regions 26, 30, or within the entire hydrophilic regions 26, 30, to determine the presence, absence, or concentration of the analyte.

In one embodiment, an ELISA test may be conducted using the disclosed device. The method may include the steps of: (1) addition of a sample to the device, wherein the sample is wicked directly through the hydrophilic regions 26, 30 along the sample flow path 32; (2) binding an analyte with a labeled antibody along the flow path 32 and into the test area 42; and binding the analyte binds to an antigen in the test area 42; and optionally washing the hydrophilic regions 26, 30 with a buffer such as, for example, PBS, to observe the results in the test area 42.

Figure 7A:
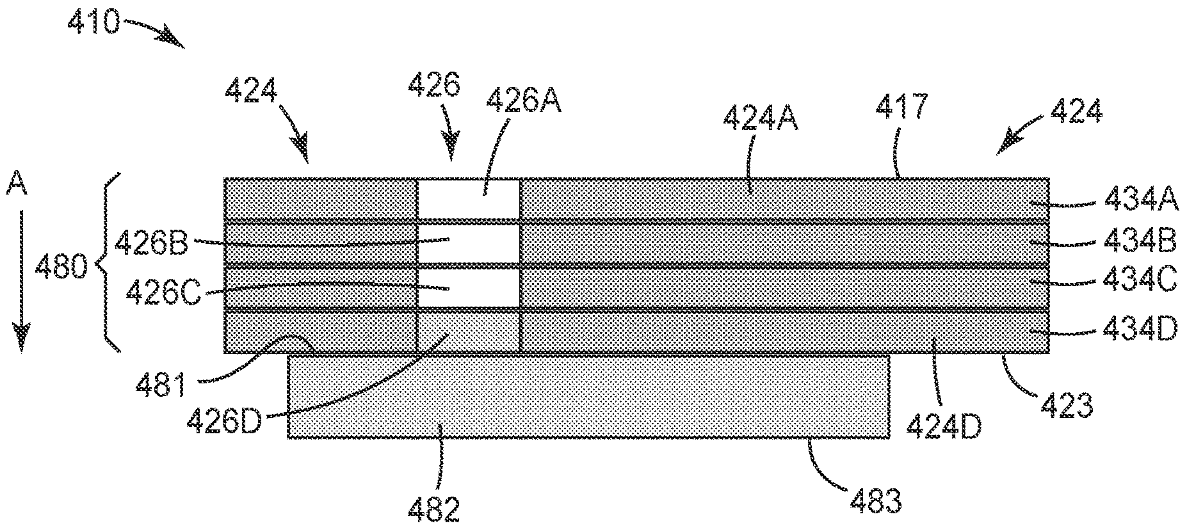
FIG. 7A is a schematic cross-sectional view of an embodiment of an assay device including a sensor stack with a wicking layer on a bottom surface thereof.
Figure 7B:
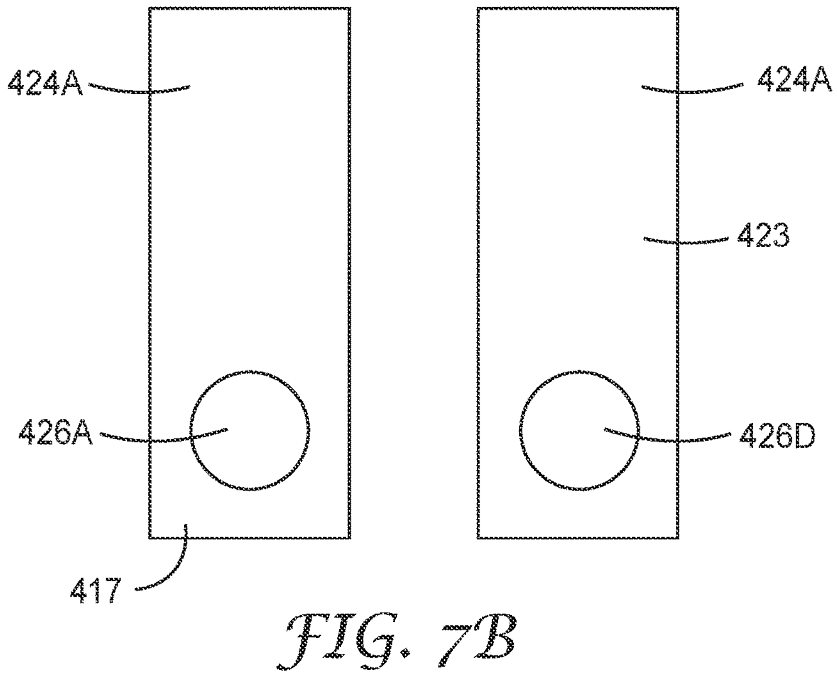
FIG. 7B includes an overhead view and a bottom view of the assay device of FIG. 7A.

In another embodiment shown in FIGS. 7A-7B, a diagnostic device 410 includes a sensor stack 480 formed from a plurality of overlying substantially planar panels 434A-434D of a porous material such as, for example, paper. As discussed above, the panels 434A-D may be discrete pieces of the porous material, or may be a continuous web of porous material that is folded to form the individual panels. Each of the panels 434A-D of the sensor stack include a hydrophobic region 424 and a hydrophilic region 426. The hydrophilic regions 426 are substantially aligned with each other to provide a sample flow path along the direction of the arrow A through the sensor stack 480 from a first major surface 417 to a second major surface 423 thereof.

The hydrophilic region 426A provides an exposed sample port upon which a sample fluid is placed for analysis in the sensor stack 480, and as discussed in detail above the sample fluid moves through the panels 434A-D in the direction of the arrow A by wicking or capillary action.

A wicking layer 482 includes a first major surface 481 on the second major surface 423 of the sensor stack 480, as well as an exposed second major surface 483. The wicking layer 482, which in various embodiments is made of paper, woven materials, non-woven materials, glass fibers, and the like, helps to draw the sample fluid through the hydrophilic regions 426A-D in the respective panels 434A-D to increase the speed and efficiency of the capillary action process. In some embodiments, the sample port formed by the hydrophilic region 426A may optionally be colored to enhance contrast with the surrounding hydrophobic region 424A and provide a guide for sample placement on the sensor stack 480. In some embodiments, the hydrophilic region 426D may also be colored to provide a color zone for reading the results of an assay performed with the sensor stack 480.

In one embodiment, which is not intended to be limiting and provided as an example, a sample solution (not shown in FIGS. 7A-7B) including a sample fluid, solvents, reagents, and the like, is placed on the sample port 426A. A wash solution is then applied to the sample port 426A, and the sample solution moves downward via capillary action through the hydrophilic regions 426A-D of the respective panels 434A-D of the sensor stack 480.

Figure 7C:
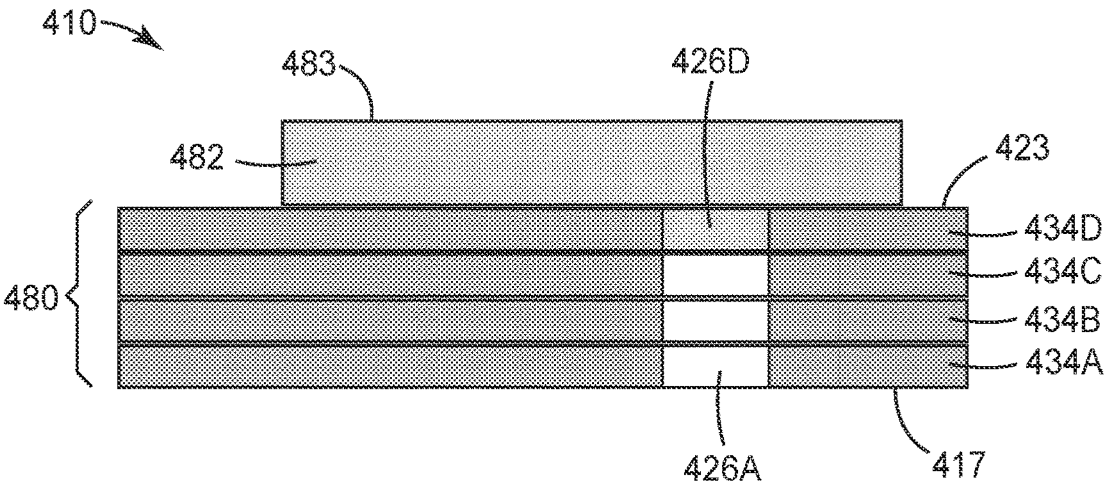
FIG. 7C is a schematic cross-sectional view of the assay device of FIG. 7A re-oriented such that the wicking layer faces upward toward an observer.
Figure 7D:
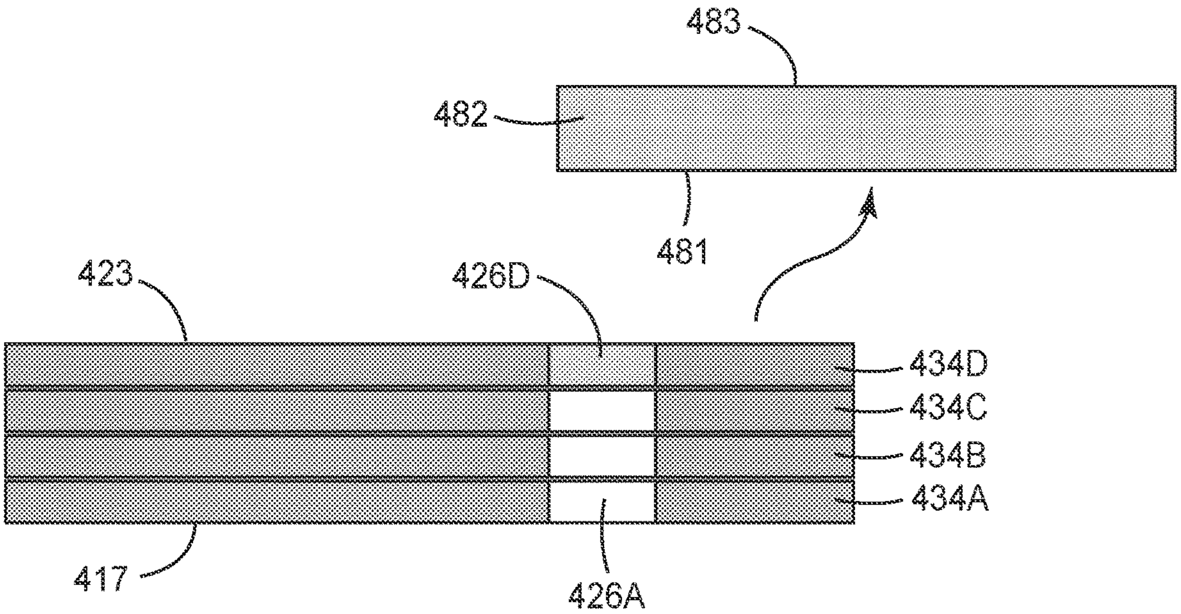
FIG. 7D is a schematic cross-sectional view of the assay device of FIG. 7C with the wicking layer removed.

Referring now to FIGS. 7C-7D, once the sample solution reaches the color zone formed by the hydrophilic region 426D in the panel 434D, the device 410 may be re-oriented such that the second major surface 483 of the wicking layer 482 faces upward toward a user. As shown in FIG. 7D, the first major surface 481 of the wicking layer 482 may be separated from the second major surface 423 of the sensor stack 480 to form a wicking pad, which exposes the color port 426D on the second major surface 423 of the sensor stack 480. A color solution may optionally be applied to the color port 426D, and after a predetermined test time the color port 426D may be observed to determine the presence or absence of an analyte in the sample.

Figure 8A:
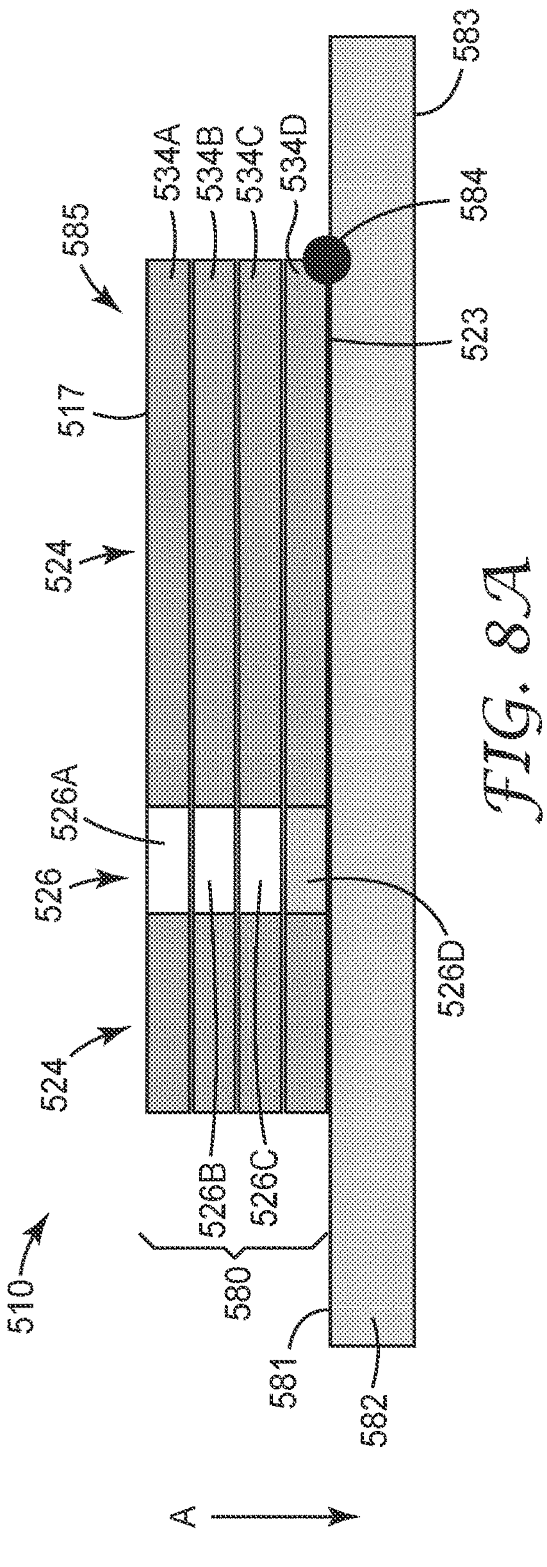
FIG. 8A is a schematic cross-sectional view of an embodiment of an assay device including a sensor stack with a wicking layer on a bottom surface thereof, wherein the wicking layer is hinged to a side of the sensor stack.
Figure 8B:
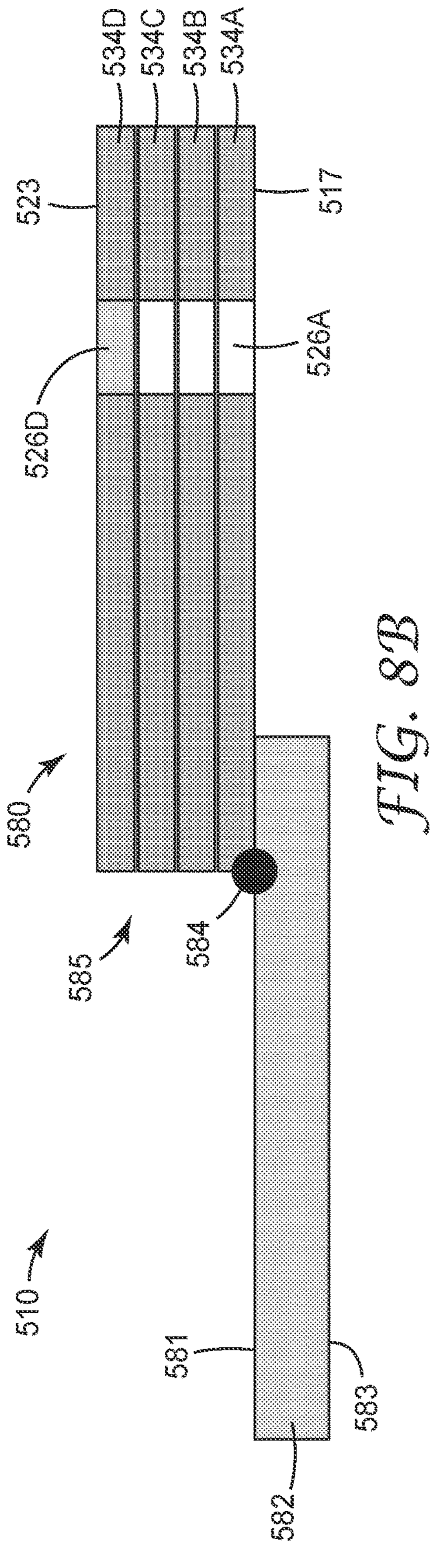
FIG. 8B is a schematic cross-sectional view of the assay device of FIG. 8A, with the sensor stack rotated about the hinge to expose a lower surface of the sensor stack.

Referring now to FIGS. 8A-8B, in another embodiment a diagnostic device 510 includes a sensor stack 580 formed from a plurality of overlying substantially planar panels 534A-534D of a porous material. Each of the panels 534A-D of the sensor stack include a hydrophobic region 524 and a hydrophilic region 526. The hydrophilic regions 526 are substantially aligned with each other to provide a sample flow path along the direction of the arrow A through the sensor stack 580 from a first major surface 517 to a second major surface 523 thereof.

The hydrophilic region 526A provides an exposed sample port upon which a sample fluid is placed for analysis in the sensor stack 580, and as discussed in detail above the sample fluid moves through the panels 534A-D in the direction of the arrow A by wicking or capillary action. A wicking layer 582 includes a first major surface 581 on the second major surface 523 of the sensor stack 580, as well as an exposed second major surface 583.

In some embodiments, the sample port formed by the hydrophilic region 526A may optionally be colored to enhance contrast with the surrounding hydrophobic region 524A and provide a guide for sample placement on the sensor stack 580. In some embodiments, the hydrophilic region 526D may also be colored to provide a color zone for reading for reading the results of an assay performed with the sensor stack 580.

The wicking layer 582 is joined to a side wall 585 of the sensor stack 580 by a hinge 584. In the embodiment of FIG. 8A, the hinge 584 is attached to the panel 534D and the first major surface 581 of the wicking layer 582. The hinge 584 may vary widely, and can include any type of mechanism connecting the sensor stack 580 and the wicking layer 582. In one example embodiment, which is not intended to be limiting, the hinge 584 is an adhesive strip.

In one embodiment, which is not intended to be limiting and provided as an example, a sample solution (not shown in FIGS. 8A-8B) including a sample fluid, solvents, reagents, and the like, is placed on the sample port 526A. A wash solution is then applied to the sample port 526A, and the sample solution moves downward via capillary action through the hydrophilic regions 526A-D of the respective panels 534A-D of the sensor stack 580.

Referring now to FIG. 8B, once the sample solution reaches the color zone formed by the hydrophilic region 526D in the panel 534D, the first major surface 581 of the wicking layer 582 may be separated from the second major surface 523 of the sensor stack 580 by rotating the sensor stack about the hinge 584. The rotation step exposes the color port 526D on the second major surface 523 of the sensor stack 580. A color solution may optionally be applied to the color port 526D, and after a predetermined test time the color port 526D may be observed to determine the presence or absence of an analyte in the sample.

Figure 9A:
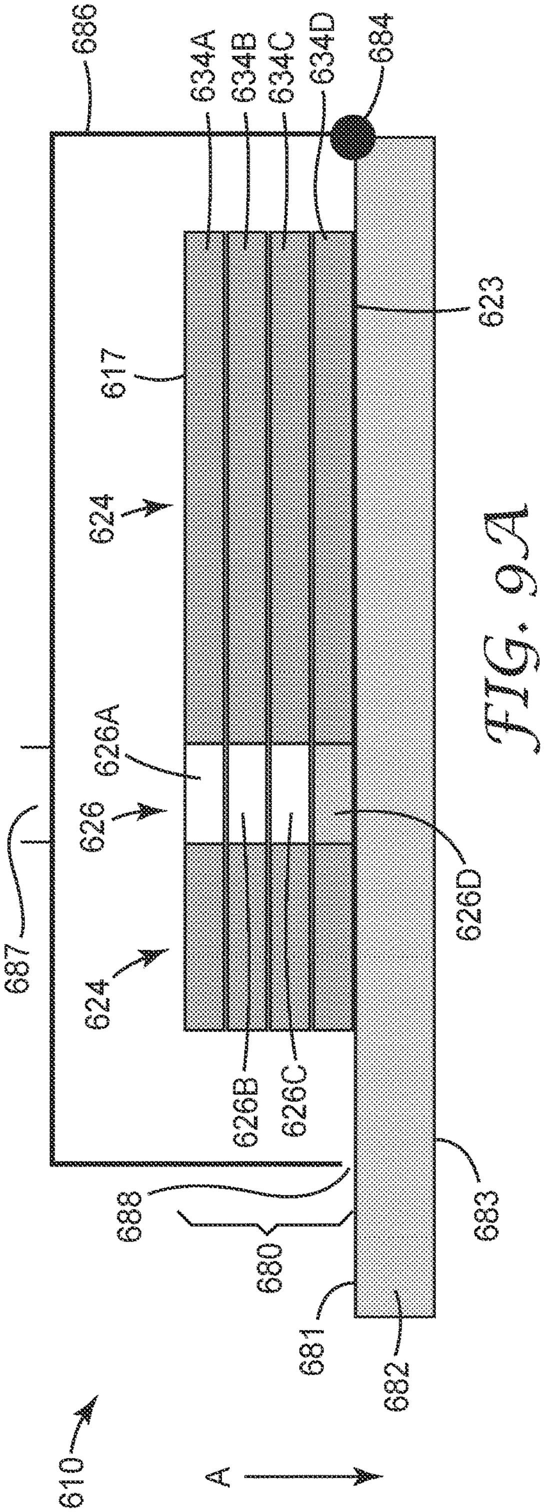
FIG. 9A is a schematic cross-sectional view of an embodiment of an assay device including a sensor stack with a wicking layer on a bottom surface thereof, wherein the wicking layer is hinged to a packaging layer overlying the sensor stack.
Figure 9B:
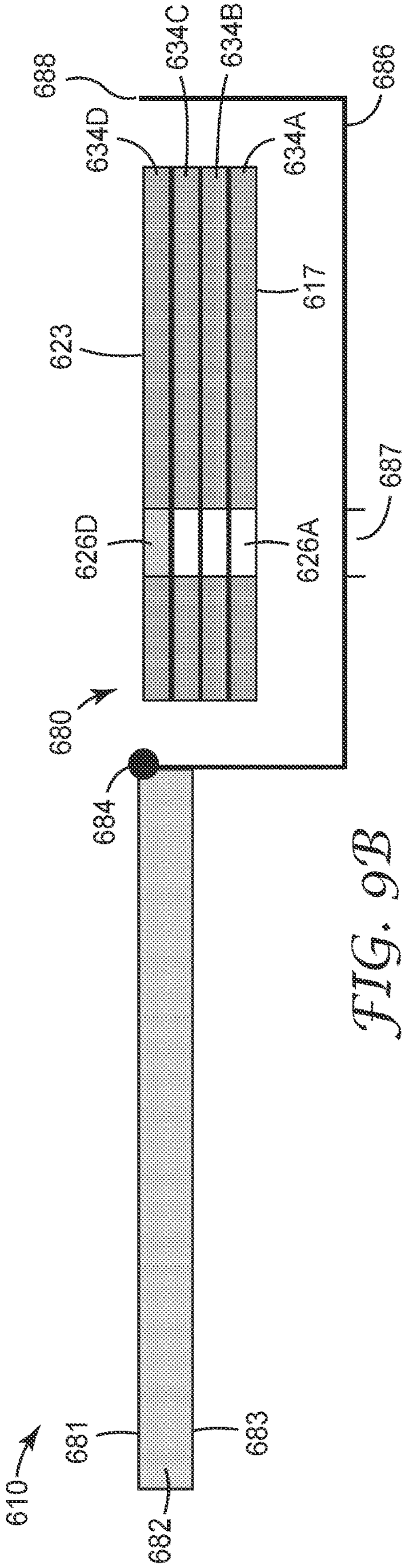
FIG. 9B is a schematic cross-sectional view of the assay device of FIG. 9A, wherein the packaging layer is rotated about the hinge to expose a lower surface of the sensor stack.

In another embodiment shown in FIGS. 9A-9B, a diagnostic device 610 includes a sensor stack 680 formed from a plurality of overlying substantially planar panels 634A-634D of a porous material. Each of the panels 634A-D of the sensor stack include a hydrophobic region 624 and a hydrophilic region 626. The hydrophilic regions 626 are substantially aligned with each other to provide a sample flow path along the direction of the arrow A through the sensor stack 680 from a first major surface 617 to a second major surface 623 thereof.

The hydrophilic region 626A provides an exposed sample port upon which a sample fluid is placed for analysis in the sensor stack 680, and as discussed in detail above the sample fluid moves through the panels 634A-D in the direction of the arrow A by wicking or capillary action. A wicking layer 682 includes a first major surface 681 on the second major surface 623 of the sensor stack 680, as well as a second major surface 683.

In some embodiments, the sample port formed by the hydrophilic region 626A may optionally be colored to enhance contrast with the surrounding hydrophobic region 624A and provide a guide for sample placement on the sensor stack 680. In some embodiments, the hydrophilic region 626D may also be colored to provide a color zone for reading the results of an assay performed with the sensor stack 680.

The sensor stack 680 is overlain by a packaging layer 686. The packaging layer 686 may vary widely, and can include, for example, a polymeric film, a plastic molded cover, and the like. In some embodiments, the packaging layer 686 is an elastic polymeric film that contacts the first major surface 617 of the sensor stack 680 and compresses the sensor stack 680 against the first major surface 681 of the wicking layer 682. In some examples, such compression can improve wicking through the panels 634A-D in the sensor stack 680. In some examples, the packing layer 686 may optionally include an access port 687 aligned with the hydrophilic region 626A of the sensor stack 680. In the embodiment of FIG. 9A, the packaging layer 686 is attached to the first major surface 681 of the wicking layer 682 by a hinge 684.

In one embodiment, which is not intended to be limiting and provided as an example, a sample solution (not shown in FIGS. 9A-9B) including a sample fluid, solvents, reagents, and the like, is placed on the sample port 626A. The sample solution and fluids may optionally be inserted through the access port 687 in the packaging layer 686. A wash solution is then applied to the sample port 626A, and the sample solution moves downward via capillary action through the hydrophilic regions 626A-D of the respective panels 634A-D of the sensor stack 680.

Referring now to FIG. 9B, once the sample solution reaches the color zone formed by the hydrophilic region 626D in the panel 634D, the packaging layer 686 may be separated from the first major surface 681 of the wicking layer 682 by pulling on an edge 688 or tab on the packaging layer 686. The packaging layer 686 rotates about the hinge 684, and this rotation reorients the sensor stack attached thereto to expose the color port 626D on the second major surface 623 of the sensor stack 680. A color solution may optionally be applied to the color port 626D, and after a predetermined test time the color port 626D may be observed to determine the presence or absence of an analyte in the sample.

In various embodiments, the wicking layers of FIGS. 7-9 above may include a single layer, or may include multiple sublayers. Each layer may have a composition, which may be the same or different, selected to provide a desired diffusivity and wicking time for a particular sample or solution to be controlled by the wicking layer. In one example, which his not intended to be limiting, the wicking layer may include a layer or a sublayer with added fibers such as glass fibers to control diffusivity in the layer. For example, layers with a greater amount of glass fibers will tend to have increased wicking times.

In one example embodiment, to further enhance wicking rates from the overlying sensor stack into the wicking layer, at least some of the panels of the sensor stack, or some of the sublayers of the wicking layer, or both, may optionally include at least one feature to restrict lateral flow across the panel or layer.

Figure 10A:
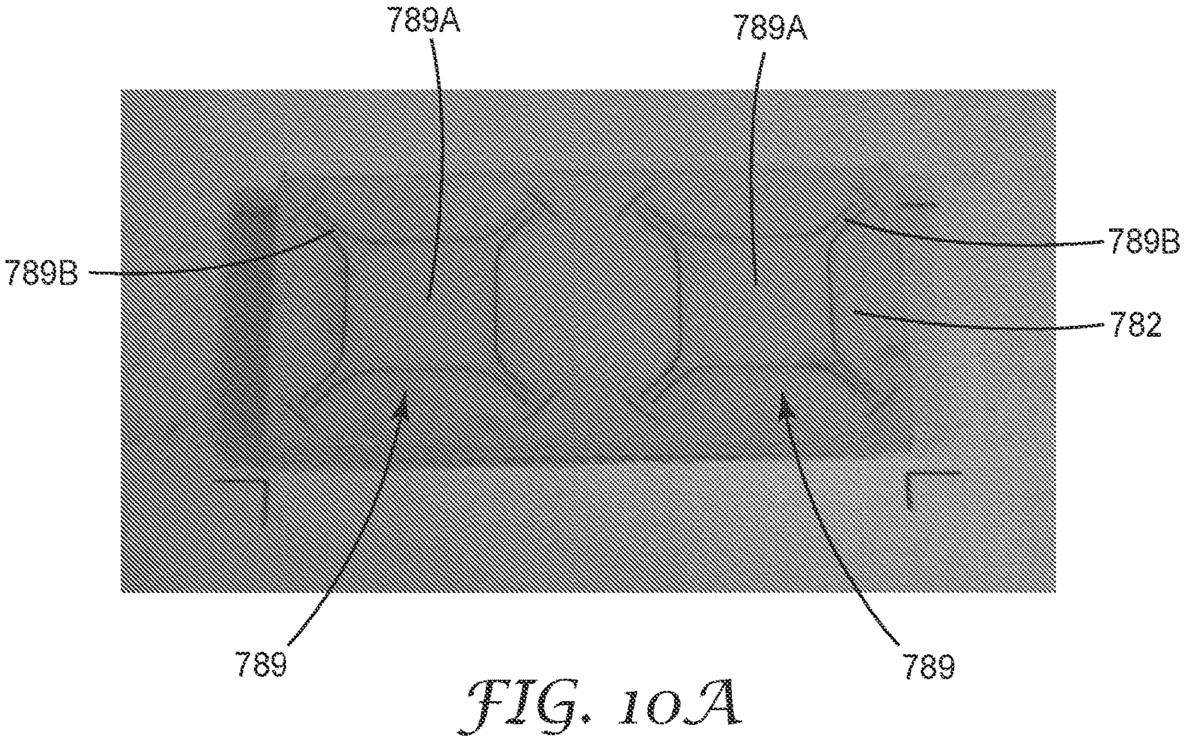
FIG. 10A is a photograph of a wicking layer including a pattern of lateral flow control features.

For example, as shown in FIG. 10A, a wicking layer 782 includes a pattern of cut lines 789, which are configured to be placed under a hydrophilic region of a sensor stack. In some examples, the cut lines 789 may be formed by a laser, cutting with a blade, and the like. In the embodiment of FIG. 10A, which is not intended to be limiting, and provided as an example, each pattern of cut lines 789 includes a substantially square central region 790 and narrow channels 791 at each corner of the central region 790. After the central regions 790 of the wicking layer 782 are saturated with a fluid, the fluid then must wick through the narrow channels 791 toward the corners of the wicking layer. Mass transfer is proportional to the cross-sectional area of the channels and is inversely proportional to the channel length squared, which has the effect of limiting lateral flow away from the central regions 790.

Figure 10B:
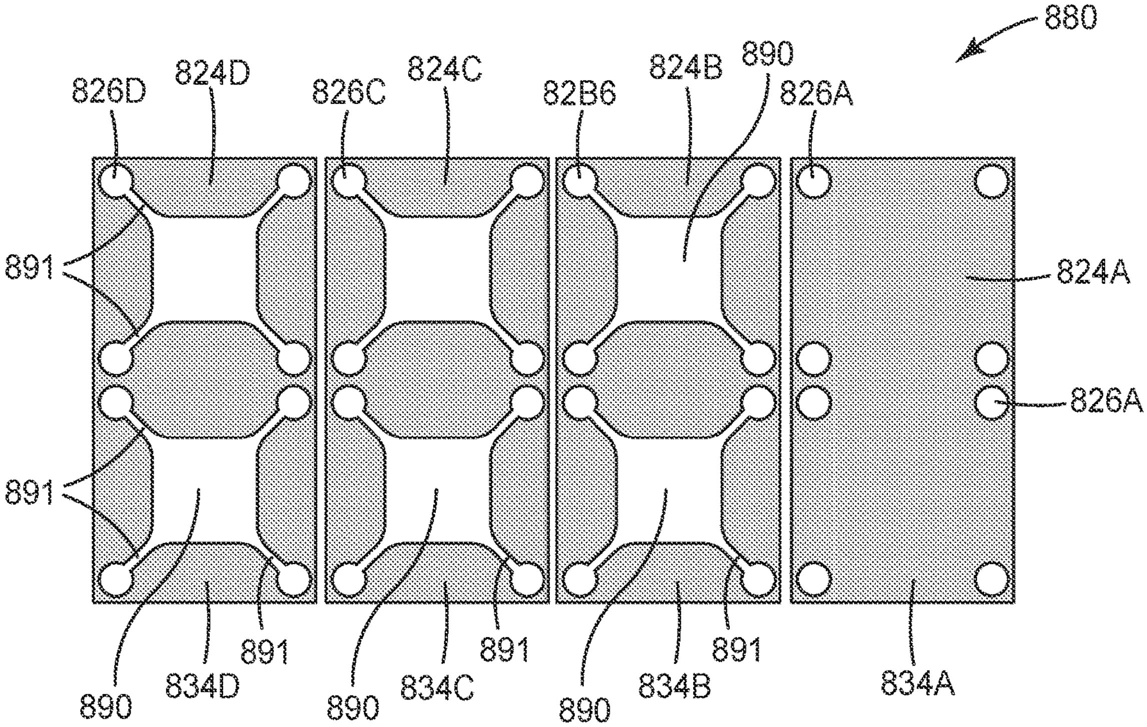
FIG. 10B is a view of separated panels of a sensor stack placed side-by-side, wherein a plurality of the panels include lateral flow control features.

Referring now to FIG. 10B, a sensor stack 880 includes four overlying panels 834A-D, which are shown separated for clarity. Each of the panels 834A-D includes a plurality of relatively small overlying hydrophilic regions 826A-D, separated by hydrophobic regions 824A-D. The panels 834B-D each include a pattern of hydrophilic material 889, which includes narrow channels 891 connected to the hydrophilic regions 826B-D, which in turn lead to central hydrophilic regions 890. When a sample fluid (not shown in FIG. 10B) is applied to the small hydrophilic regions 826A, the sample fluid wicks along the direction of the arrow A to the underlying hydrophilic regions 826B-D, and is drawn through the narrow channels 891 into the larger central regions 890. The narrow channels 891 provide enhanced mass transfer of the sample fluid from the small ports 826A to the larger central regions 890.

Figure 11:
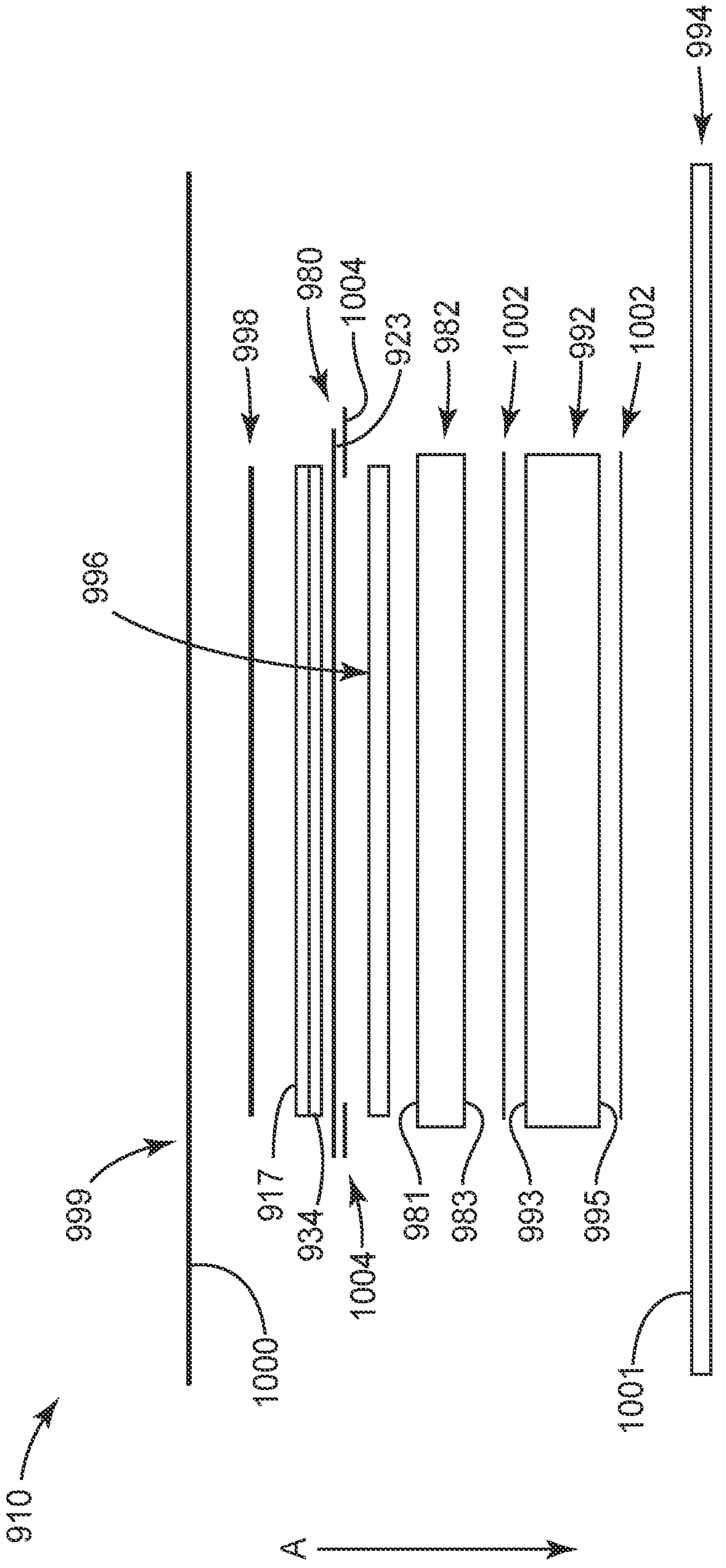
FIG. 11 is a schematic cross-sectional view of an embodiment of a packaged assay device including an elastic element and a wicking control layer.

Referring now to FIG. 11, an embodiment of an assay device 910 includes a sensor stack 980 formed from multiple overlying planar panels 934 of a porous material. In some embodiments, the sensor stack is formed from a single piece of porous material that is folded into multiple overlying planar panels 934. The sensor stack 980 includes a first major surface 917 and a second major surface 923. The panels 934 of the sensor stack 980 include hydrophobic regions and hydrophilic regions (not shown in FIG. 11), wherein the hydrophilic regions in each panel overlie and are aligned with each other to provide a sample flow path for migration of a fluid sample through the sensor stack from one panel to another along a direction of the arrow A.

As discussed in the embodiments described above, the assay device 910 further includes a wicking layer 982 with a first major surface 981 adjacent to the second major surface 923 of the sensor stack 980, as well as a second major surface 983. As noted above, the wicking layer 982 may be a single layer, or may include multiple sublayers. In some embodiments, the sublayers of the wicking layer may optionally be bonded together with adhesives, and in some examples the adhesives may be positioned to further enhance flow between the hydrophilic regions of the sensor stack, or to enhance the performance of lateral flow control features in the sublayers.

An optional elastic element 992 such as, for example, a foamed layer or a folded or stacked layer of a blotter paper, resides adjacent to the second major surface 983 of the wicking layer 982. In some embodiments, the elastic element 992 may optionally include an arrangement of apertures (not shown in FIG. 11) underlying the hydrophilic regions of the sensor stack 980. The presence of the apertures exerts pressure on the edges of the planar panels 943 of the sensor stack 980 to enhance wicking from the sensor stack 980 into the wicking layer 982. In some examples, the elastic element 992 is a foamed polymeric material.

The second major surface 995 of the elastic element 992 is adjacent to a backing layer 994, which may include a single layer or multiple layers of material. In various example embodiments, which are not intended to be limiting, the backing layer 994 may be paper, a polymeric film, a plastic sheet, a molded plastic tray, and combinations thereof. The backing layer 994 should be sufficiently stiff to provide maintain the alignment and support for the sensor stack 980, and in some embodiments may form an external packaging for the assay device 910. For example, in some embodiments the backing layer 994 can be a backer card of stiff cardboard, a polymeric tape, and the like.

In some embodiments, an optional wicking control layer 996 may reside between the second major surface 923 of the sensor stack 980 and the first major surface 981 of the wicking layer 982. The wicking control layer 996 may include a single layer or a plurality of sublayers, and in some embodiments is a non-woven material. The thickness of the wicking control layer 996, or the low diffusivity of the components of the layer, can be used to control mass transfer of a sample fluid from the hydrophilic regions of the sensor stack 980 to the wicking layer 982. The mass transfer across the wicking control layer 996 will be reduced in direct relation to the thickness of the layer and will be inverse to the diffusivity of the materials from which the layer is made.

In some embodiments, the assay device 910 includes an optional cover layer 998 overlying the first major surface 917 of the sensor stack 980. In various embodiments, the cover layer 998 may be a polymeric film, a plastic sheet, or the like. In some examples, the cover layer 998 is a rigid plastic sheet include apertures (not shown in FIG. 11) overlying the hydrophilic regions of the sensor stack 980.

In some embodiments, the assay device further includes an outer packaging layer 999 that overlies the cover layer 998, if present, or the first major surface 917 of the sensor stack 980. In some embodiments, the outer packaging layer 999 is a polymeric tape construction with an adhesive layer 1000 that adheres to a surface 1001 of the backing layer 994.

In some examples, the outer packaging layer 999 is an adhesive-free polymeric film that is ultrasonically welded to the surface 1001 of the backing layer 994. In some example, the outer packaging layer 999 includes an "easy open" feature such as a tab or a strippable portion that can provide access to the hydrophilic regions of the sensor stack 980.

In some embodiments, the polymeric film of the outer packaging layer 999 has elastic properties and exerts a compressive force on the sensor stack 980 along the direction of the arrow A to facilitate the optimal fluid transport rate and avoid lateral capillary flow between the stacked or folded panels 934 thereof. In some embodiments, the outer packaging layer includes apertures (not shown in FIG. 11) that overlie the apertures in the cover layer 998 and the hydrophilic regions of the sensor stack 980. The overlying apertures in the cover layer 998 and the outer packaging layer 999 allow application of a sample fluid through the packaging layer 999 and the cover layer 998 onto the hydrophilic regions of the sensor stack 980.

In some embodiments, adhesive layers 1002, which may be single-sided or double-sided, may optionally be used to bond the wicking layer 982 and the elastic element 992, or to bond the elastic element 992 to the backing layer 994, or both. In some examples, an optional arrangement of adhesive tabs 1004 on the second major surface 923 of the sensor stack 980 may be used to securely bond the sensor stack 980 to the outer packaging layer 999. In some examples, some or all of the adhesive layers 1002 or the adhesive tabs 1004 may be replaced with ultrasonic welds.

In another aspect, the present disclosure is directed to a kit including the diagnostic device 10 and other equipment useful in performing an assay for a selected analyte. For example, the kit may optionally include one or more vials of purified water and/or buffer, e.g., PBS, one or vials of a suitable reagent, a device to obtaining a blood sample (e.g., a device of making a needle stick), a device for collecting a urine sample or saliva sample or other body fluid, or a pipette for transferring water and/or buffer to the device. Further, the kit may include instructions or color charts for quantitating a color reaction.

The devices and methods of the present disclosure will now be further described in the following non-limiting examples.

EXAMPLES

Example 1

A flexographic ink (9418 obtained from NAZDAR Ink Technologies of Shawnee, KANS) was printed on a WHATMAN Grade 1 filter (obtained from GE Healthcare Life Sciences of Piscataway, NJ) paper substrate busing a FLEXIPROOF 100 printing system (obtained from RK Industries, Herts, United Kingdom). Printing was accomplished by using a 38.75 micrometer (25 billions of cubic microns (BCM)), 35.4 lines per centimeter (90 lines per inch) anilox roll to form a 5.08 cm (2 inch) diameter circle. After printing, the printed paper sample was heated for eight minutes at 177° C. (350° F.) and the ink was cured by exposure to UV radiation by a FUSION High Intensity UV curing system (obtained from FUSION UV Systems Inc of Hampshire, United Kingdom) outfitted with an H-bulb and conveyed at 1.5 meters (5 feet) per minute to form a hydrophobic region on the paper sample. After curing, the printed paper sample was tested for performance by depositing dyed deionized water into non-printed areas and visually inspecting the spread of the dyed water. The dye was added to water to help with observations.

Figure 4A:
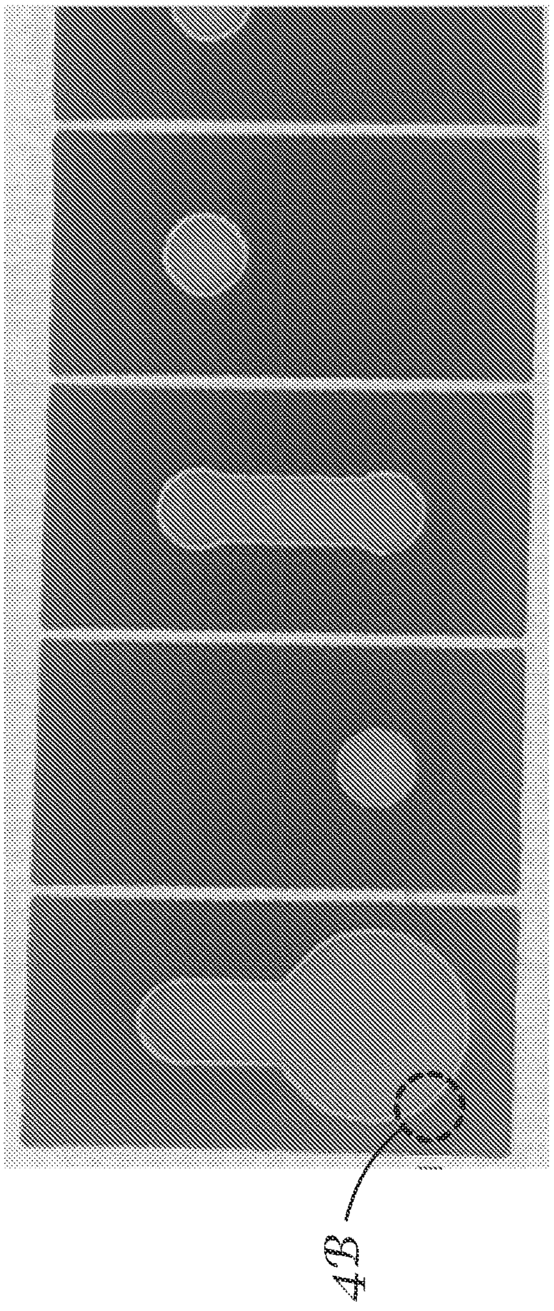
FIG. 4A is an overhead view of a border around a printed hydrophobic region of Example 1 that formed due to wicking of components of printed materials in lateral direction.
Figure 4B:
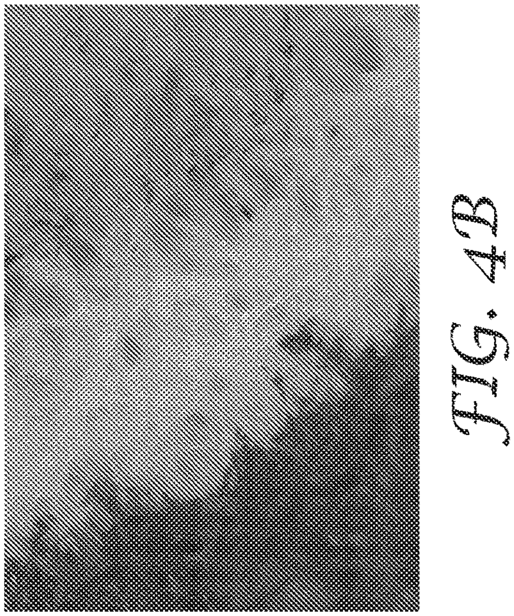
FIG. 4B is a magnified sectional view of the diagnostic device of Example 1 and FIG. 4A.

FIGS. 4A-4B show images of the printed paper after testing with dyed water. The dyed water saturated most of the unprinted area but did not wick into the printed areas as well as into the areas close to the border of the printed areas. This ink has pigment particulates in it (they show as blue), that did not wick along the fibers, while polymer component of the ink did, creating hydrophobic areas around printed pattern. Grey-colored water stopped at the created hydrophobic border.

A test was performed to show that volumetrically hydrophobic areas of the paper retained sufficient fluid permeability. A 5.08 cm (2 inch) dimeter round disc was cut out of the printed paper. The paper samples were inserted into a standard filter housing and a water line with one meter of head pressure was connected to the filter housing and outflow was measured. Refer to Table 1 below and FIG. 5 for test results.

TABLE 1

| Sample | Average Flow Rate (ml/sec) |
|---|---|
| Control | 4.56 |
| 100% Easy Release | 2.36 |
| 80% Easy Release | 2.24 |
| 60% Easy Release | 2.08 |
| NAZDAR 9418 | 1.70 |
| NAZDAR 1028 | 1.90 |
| Wax | 0.23 |

Example 2

A sample was created as described in Example 1 using OP 1028 ink (obtained from NAZDAR Ink Technologies of Shawnee, KANS) instead of the 9418 ink. A test was performed to show that volumetrically hydrophobic areas of the printed paper retained sufficient fluid permeability. A 5.08 cm (2 inch) dimeter round disc was cut out of the printed paper. The paper samples were inserted into a standard filter housing and a water line with one meter of head pressure was connected to the filter housing and outflow was measured. Refer to Table 1 and FIG. 5 for test results.

Examples 3-5

Three samples were created as described in Example 1 using a release ink UVF03408 (UV Easy Release) (obtained from FlintGroup, Rogers, MN) instead of the 9418 ink. The first sample was undiluted. Before applying the ink, the second sample diluted the release ink by adding 20 percent isopropyl alcohol (IPA) solvent Before applying the ink, the third sample diluted the release ink by adding 40 percent IPA solvent. Samples with the solvent-containing ink were dried at room temperature for 15 minutes. A test was performed to show that volumetrically hydrophobic areas of the printed paper retained sufficient fluid permeability. A 5.08 cm (2 inch) dimeter round disc was cut out of the printed paper. The paper samples were inserted into a standard filter housing and a water line with one meter of head pressure was connected to the filter housing and outflow was measured. Refer to Table 1 and FIG. 5 for test results.

Comparative Example 1

A wax-saturated paper was made by melting Batik Wax (available from Jacquard Products, Healdsburg, CA) at 65.6° C. (150° F.) and dripping it on WHATMAN Grade 1 paper pre-heated to the same temperature until saturation of less than about 5 minutes. A test was performed to show that volumetrically hydrophobic areas of the printed paper retained sufficient fluid permeability. A 5.08 cm (2 inch) dimeter round disc was cut out of the printed paper. The paper samples were inserted into a standard filter housing and a water line with one meter of head pressure was connected to the filter housing and outflow was measured. Refer to Table 1 and FIG. 5 for test results.

Example 6

A CH 265 self-adhering adhesive (obtained from Valpac Industries, Federalsburg, MD) was manually applied by a cotton swab onto the printed regions on both sides of the sample created in Example 1. After drying at room temperature for one hour, the sample was folded and lightly pressed together. Dyed water was placed on one side of the sample and wicking to the other side was observed after 25 seconds indicating that fluid transport across layers was successful.

Example 7

An adhesive was printed in an open mesh pattern onto the hydrophobic printed regions of a specific region of the configuration as described in Example 1.

Figure 5:
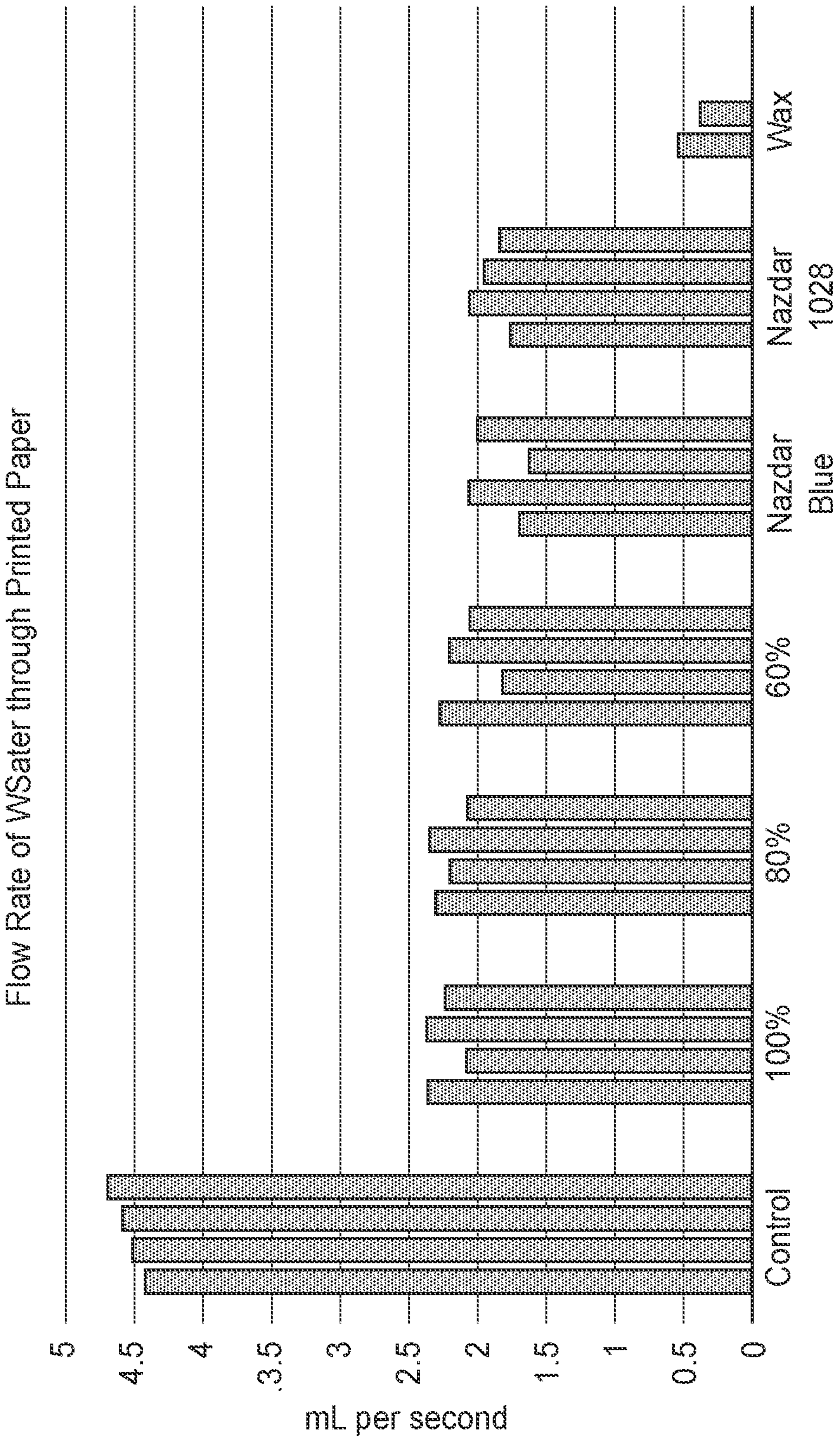
FIG. 5 is a plot of flow rate through the substrate for unpatterned hydrophilic areas and patterned hydrophobic areas of a substrate of the diagnostic device of Example 1.

Table 1 and FIG. 5 show in pertinent part that flow was highest for unprinted paper, followed by the printed paper. This shows that while printed paper remained permeable to water. Flow through wax-saturated disc was very low and was due to delamination of wax under one meter of water pressure.

Example 8

Flint Group Easy Release Coating (available from Flint-Group, Rogers, MN) was flexographically printed on a 12-wide roll of Great Lakes filter paper (equivalent to #1 Whatman, grade 601, available from Great Lakes Filters, Bloomfield Hills, MI) on custom-made flexographic printing line using 24 bcm (billion cubic microns), 100 lines per inch (about 40 lines per cm) anilox roll at 10 feet per minute (fpm) (5 cm/sec) line speed in a pattern representing an array of 5 folds of bio-diagnostics devices.

The ink was in-line UV cured on both sides in two passes. Single 5-fold devices were cut out of the roll of paper and folded along unprinted spaces between the prints. 3M spray adhesive (3M Spray 77, available from 3M Company) was lightly sprayed by hand on both side of the device over both hydrophobic and hydrophilic areas.

After drying for 2 minutes, device was folded. Dyed water was placed on the top hydrophilic circle (covered with sprayed adhesive) and left to wick. Wicking to the other side was observed in about 50 seconds indicating that fluid transport across layers was successful.

Example 9

In this example, we demonstrated dual-side registered patterning of a hydrophobic ink via the following steps.

In step (1), a hydrophobic ink available from Flint Group under the trade designation Easy Release (UVF03408) UV curable ink was flexographically printed using a 12 BCM/in$^2$ anilox roll and a patterned LUX ITP60 flexographic printing plate (MacDermid Graphics Solutions, Atlanta, GA) at 20 ft/min (10 cm/sec) onto filter paper onto Great Lakes Filter Paper (Grade: CP51232-Grade 601) obtained from Ahlstrom-Munksjo Filtration LLC), and the ink was transported to the UV curing station and solidified. The time between printing and curing was such that when the paper was transported at 20 ft/min (10 cm/sec), it provided enough time for the ink to wick approximately half the thickness of the filter paper.

In step (2), the printed paper from step (1) was then re-inserted through the printing line at 20 ft/min (10 cm/sec), and a second matching reverse-image pattern of the Flint Group Easy Release ink was printed in registration to the backside (i.e. opposing paper surface to the first pass of printing) of the filter paper. The printing was performed with a 12 BCM/in$^2$ anilox roll and patterned LUX ITP60 flexographic printing plate. The printed paper was transported to the UV curing station and solidified at 20 ft/min (10 cm/sec), which was sufficient time for the hydrophobic ink to penetrate the paper and reach the other half-printed hydrophobic barrier layer, completing a barrier layer for a diagnostic device.

The sample from step (2) of this example was tested with red-dyed water to ensure a complete seal was created throughout the thickness of the paper. The red-dyed water was deposited into the channels formed by the hydrophobic barriers, dried, and then photographed.

Figure 6A:
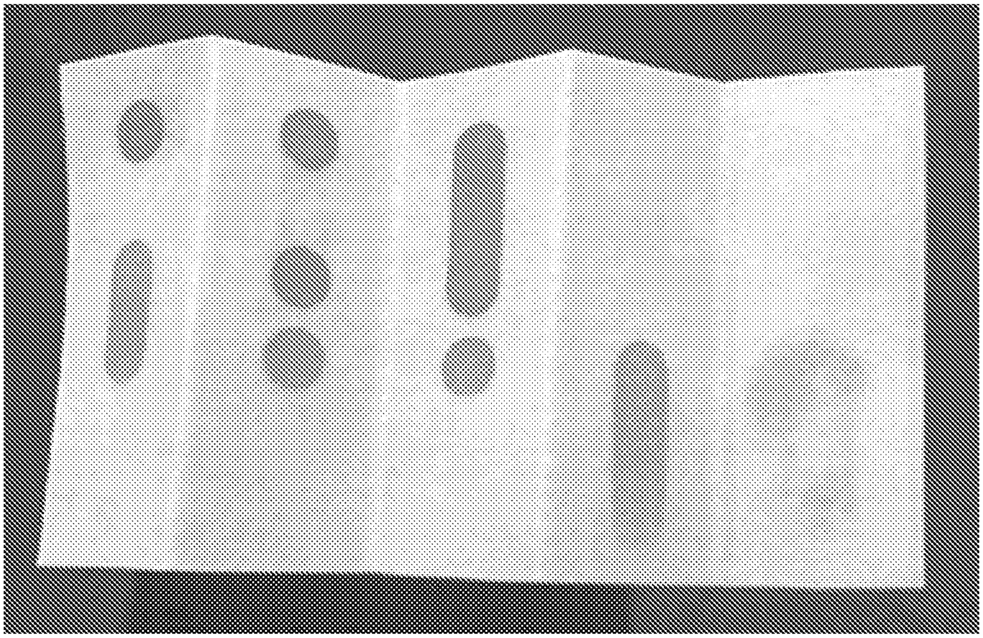
FIG. 6A is a photograph of the pattern resolution of a paper diagnostic device printed with hydrophobic ink according to Example 9 via dual-side registered printing using a 12 BCM/in$^2$ anilox roll, versus single-side printing using the same substrate and hydrophobic ink with a 36 BCM/in$^2$ anilox roll (FIG. 6B).
Figure 6B:
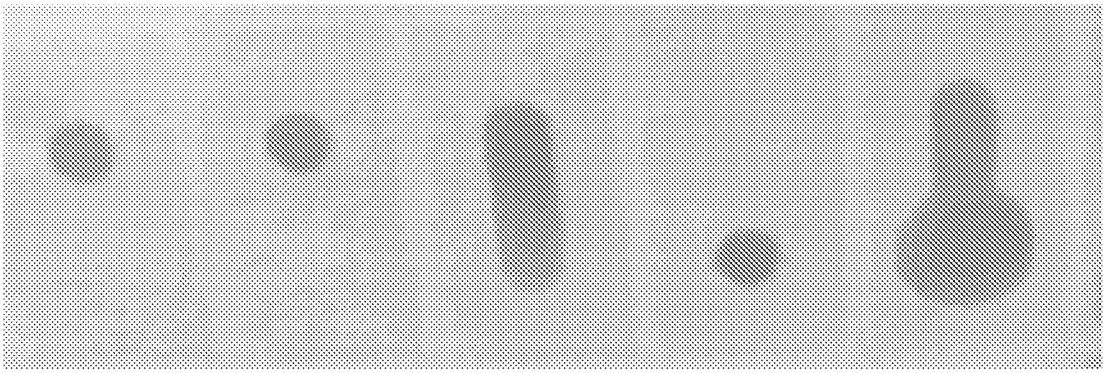

FIG. 6A shows the resultant patterned paper-based diagnostic device after testing with the red-dyed water, and compares this dual-side printed sample, which was made with a 12 BCM/in$^2$ anilox roll at 20 ft/min (10 cm/sec), to a single-side patterning process using the same hydrophobic ink and paper substrate made with a 36 BCM/in$^2$ anilox roll at 20 ft/min (10 cm/sec) (FIG. 6B). The dual-side patterning of FIG. 6A qualitatively appeared to have an increased pattern resolution.

Example 10

Figure 12A:
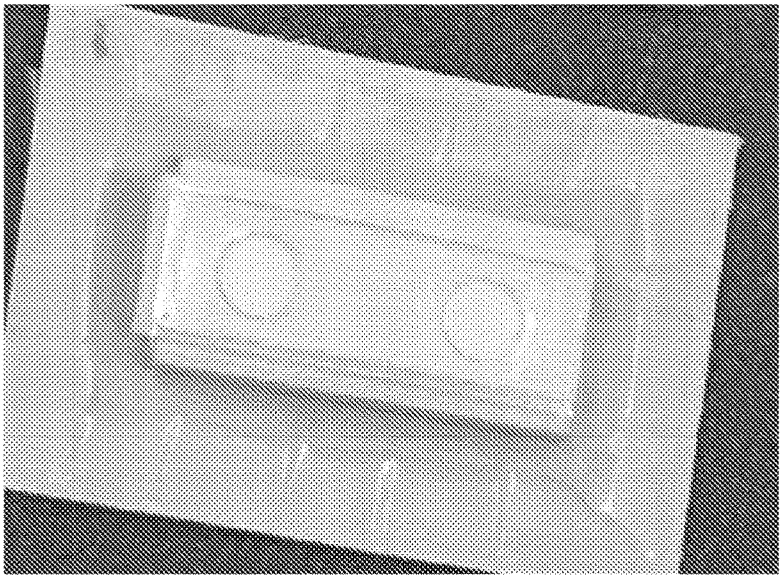
FIGS. 12A-12B are photographs of an assay device of Example 10 and FIG. 11 including a cardboard backing layer.
Figure 12B:
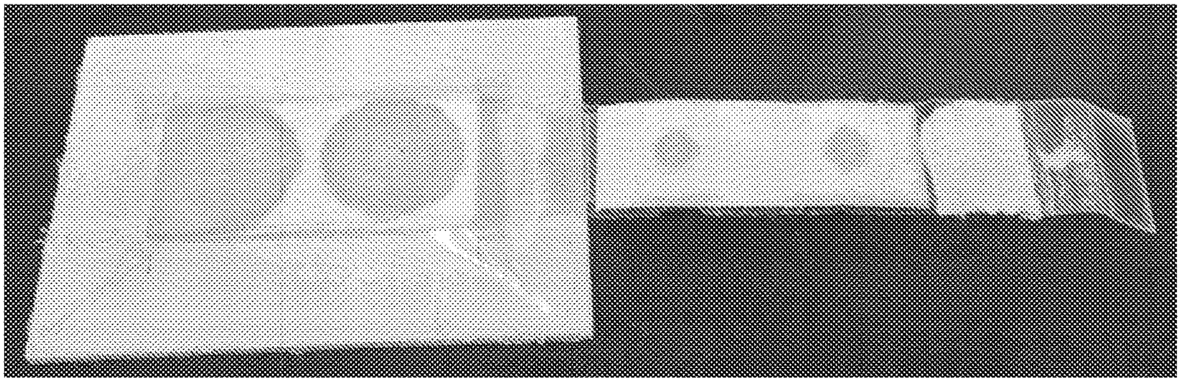

An assay device substantially similar to that described schematically in FIG. 11 was prepared that included a thick (about 60 mils or 1.5 mm) cardboard backer card and a clear pressure sensitive adhesive (PSA) tape outer packaging layer fixing the sensor stack to the baker card. The outer packaging layer included 2 apertures to provide access to the sensor stack, as well as a pull tab configured to strip away a predetermined portion of the outer packaging layer. An elastic element of 90 mil (2.3 mm) closed cell polyethylene (PE) foam attached to the backer card with an adhesive transfer tape. Above the foam layer was a wicking element including 2 sublayers of 0.9 mm wicking pads. The bottom sublayer of the wicking layer was attached to the top of the foam layer with an adhesive transfer tape. The top sublayer wicking pad has laser-cut lateral flow control features such as shown in FIG. 10A. The wicking pads were attached to each other with disks of an adhesive transfer tape which also blocked the wicking flow and facilitated the lateral flow control features. Above the top wicking pad the sensor stack was attached to the cover PSA tape with adhesive tape tabs. A cover layer above the sensor stack was a 14 mil (0.36 mm) polyethylene terephthalate (PET) sheet. The cover layer included 2 apertures underlying the apertures in the outer packaging layer, which provided access to the sensor stack from above. The assay device is shown prior to use in FIG. 12A, and after use in FIG. 12B.

Figure 13A:
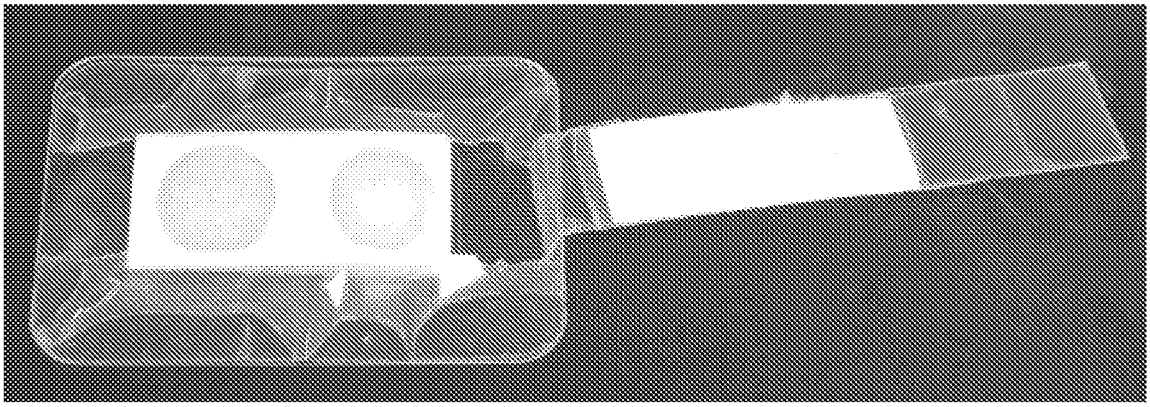
FIG. 13A is a photograph of an assay device of FIG. 11 including a polymeric film backing layer.
Figure 13B:
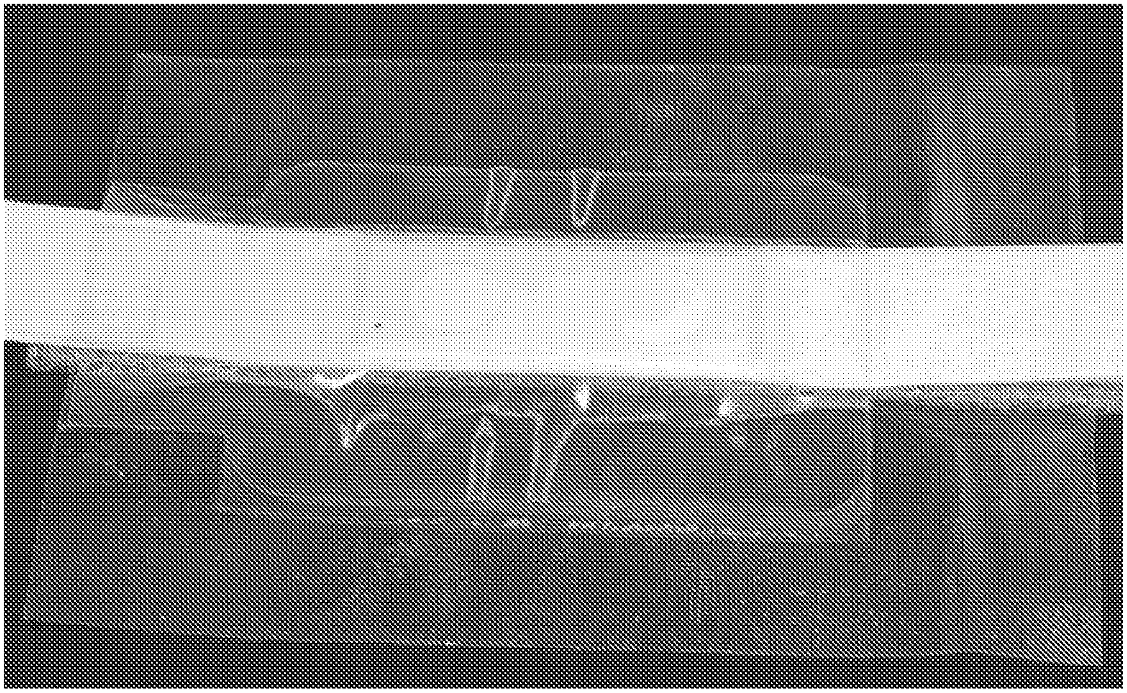
FIG. 13B is a photograph of an assay device of FIG. 11 with a polymeric tape backing layer.

FIGS. 13A-13B show similar assay devices with a backing layer of 14 mil (0.36 mm) PET, and a backing layer of a PSA tape, respectively.

Figure 14:
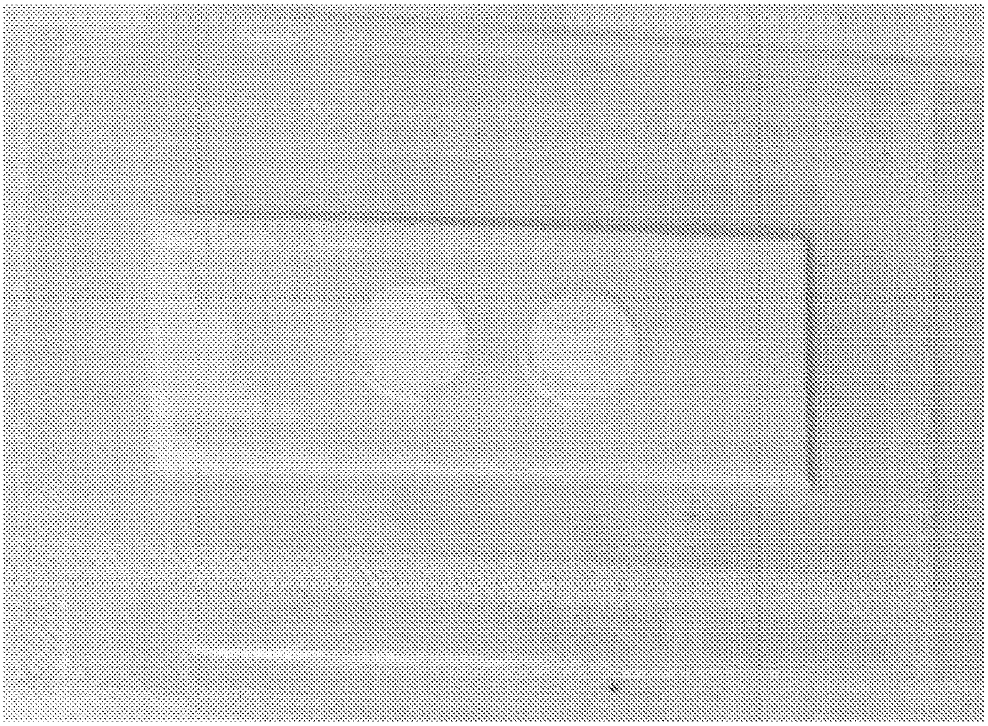
FIG. 14 is a photograph of an embodiment of an assay device including a polymeric film backing layer ultrasonically welded about the periphery of a wicking layer.

In another embodiment shown in FIG. 14, the backing layer was a PET film that was ultrasonically welded about the periphery of the wicking layer.

Figure 15:
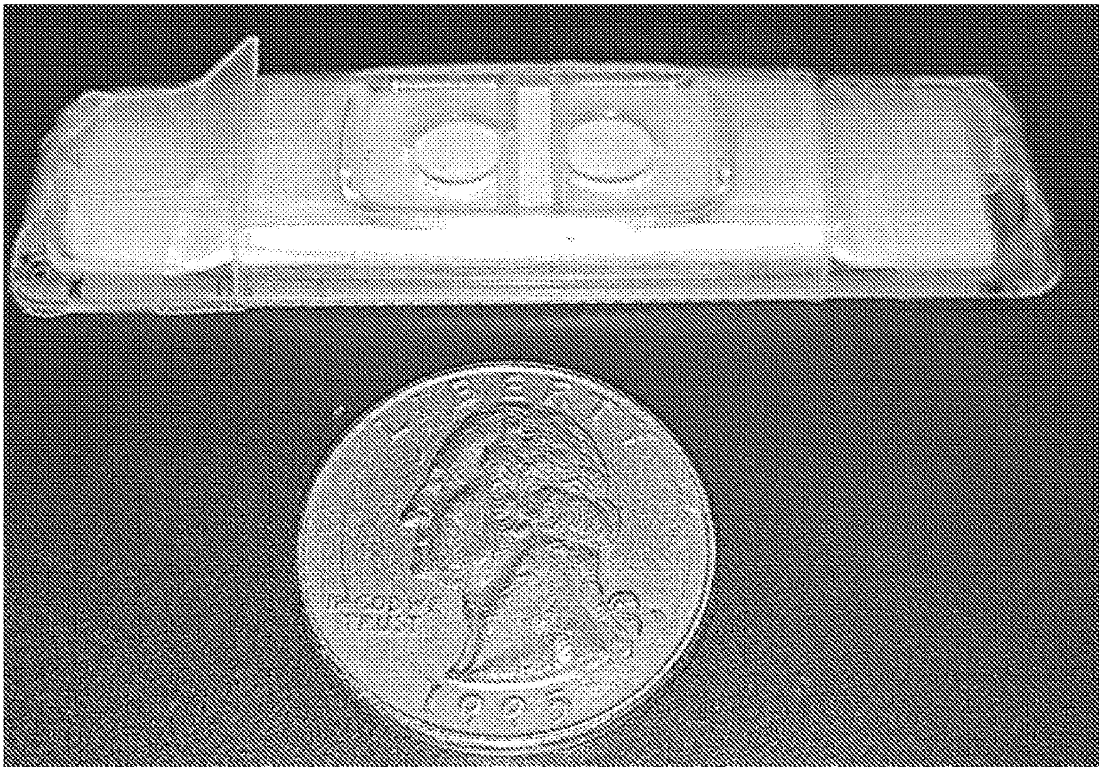
FIG. 15 is a photograph of an embodiment of an assay device including a polymeric film backing layer and a molded plastic packaging layer.

In another embodiment shown in FIG. 15, the backing layer was 14 mil (0.36 mm) PET, and the outer packaging layer was an injection molded plastic shell. The plastic shell included apertures on an upper surface to provide access to the sensor stack.

Example 11

As discussed above, the sensor stack should of an assay device should sufficient optimal layer-to-layer stack pressure to facilitate the optimal fluid transport rate and avoid lateral capillary flow between layers.

To provide a desired stack pressure, in some embodiments described above an elastic element such as, for example, foam or a compressed layer of blotter paper, can be included between the backing layer and the sensor stack. In other embodiments, the backing layer of the packaging itself is sufficiently stiff to serve as the elastic element, and an elastic element is not required. In another embodiment, as shown in the example embodiment of FIG. 11, the assay device can include both an elastic element and a rigid package.

Figure 16A:
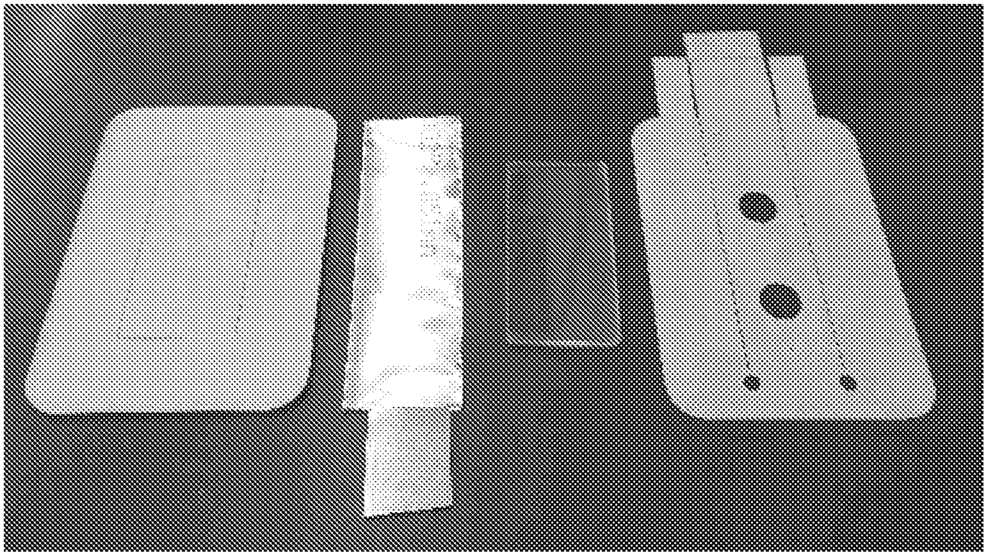
FIGS. 16A-B are photographs of an example of an assay device of Example 11 without an elastic element in which the upper packaging layer was a polymeric tape that is laminated to a rigid acrylic backing layer.
Figure 16B:
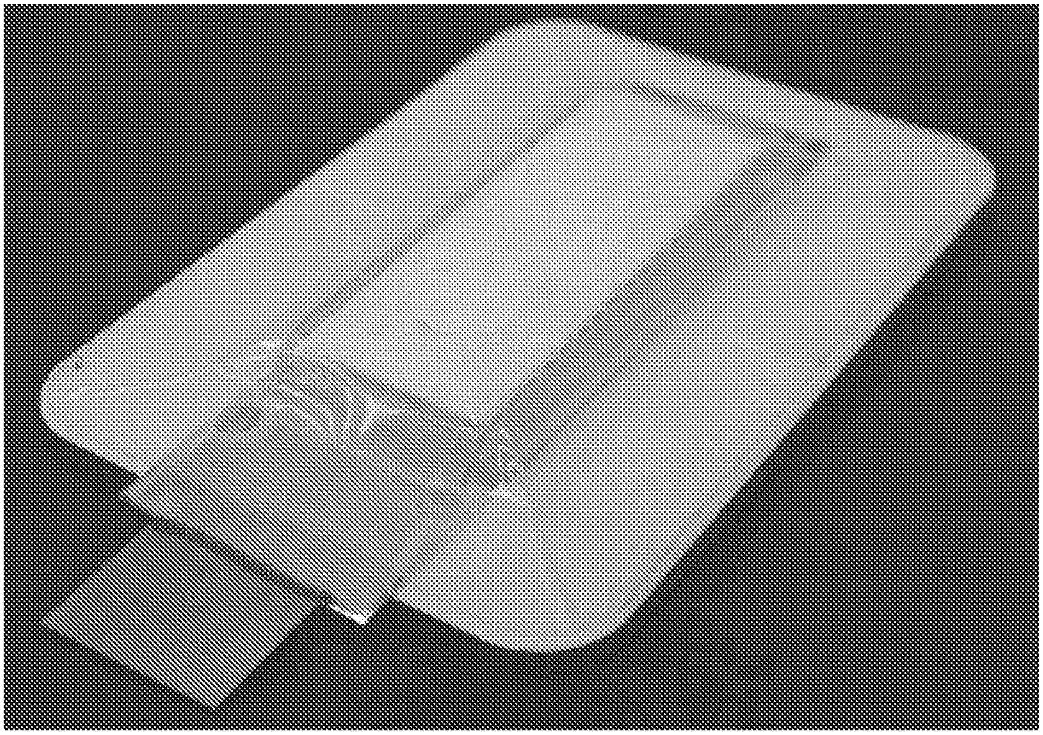

FIGS. 16A-B show an example of an assay device without an elastic element (for example a foam layer or a layer of blotter paper) in which the upper packaging layer was a polymeric tape that is laminated to a rigid acrylic backing layer. The polymeric tape packaging layer included a pull tab. After lamination, the pull tab was used to measure the stack pressure on the sensor stack produced by the packaging alone, which was found to be 0.45 psi under the lamination conditions used. Sensor pressure levels could be adjusted with lamination conditions.

Figure 17A:
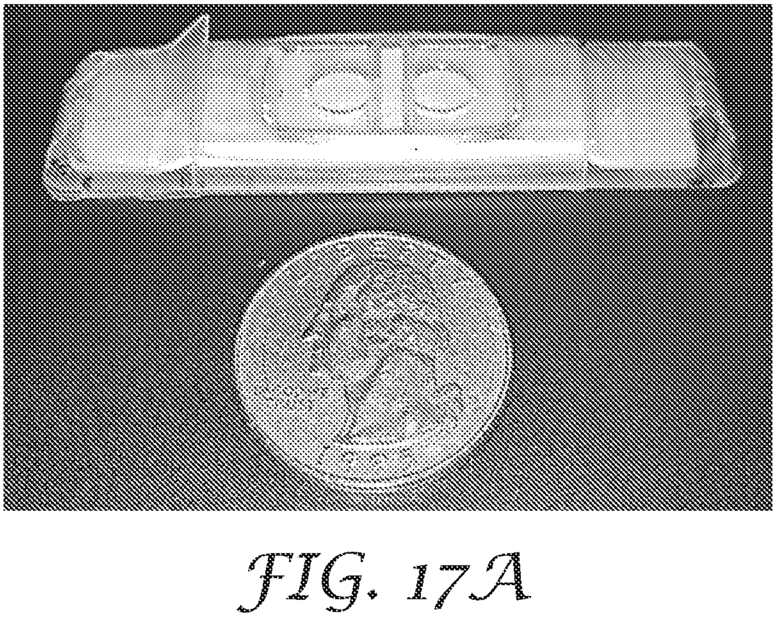
FIGS. 17A-B are photographs of an assay device of Example 11 including a rigid acrylic package and an elastic sensor stack.
Figure 17B:
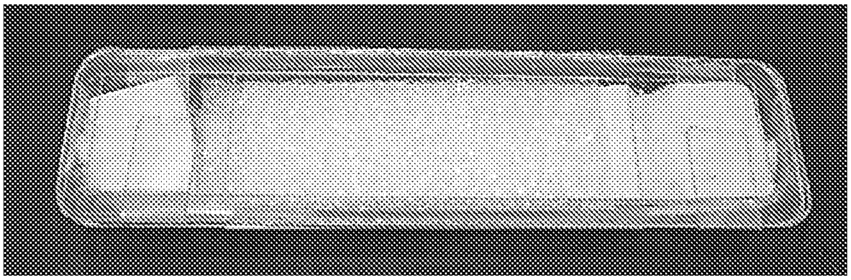
Figure 17C:
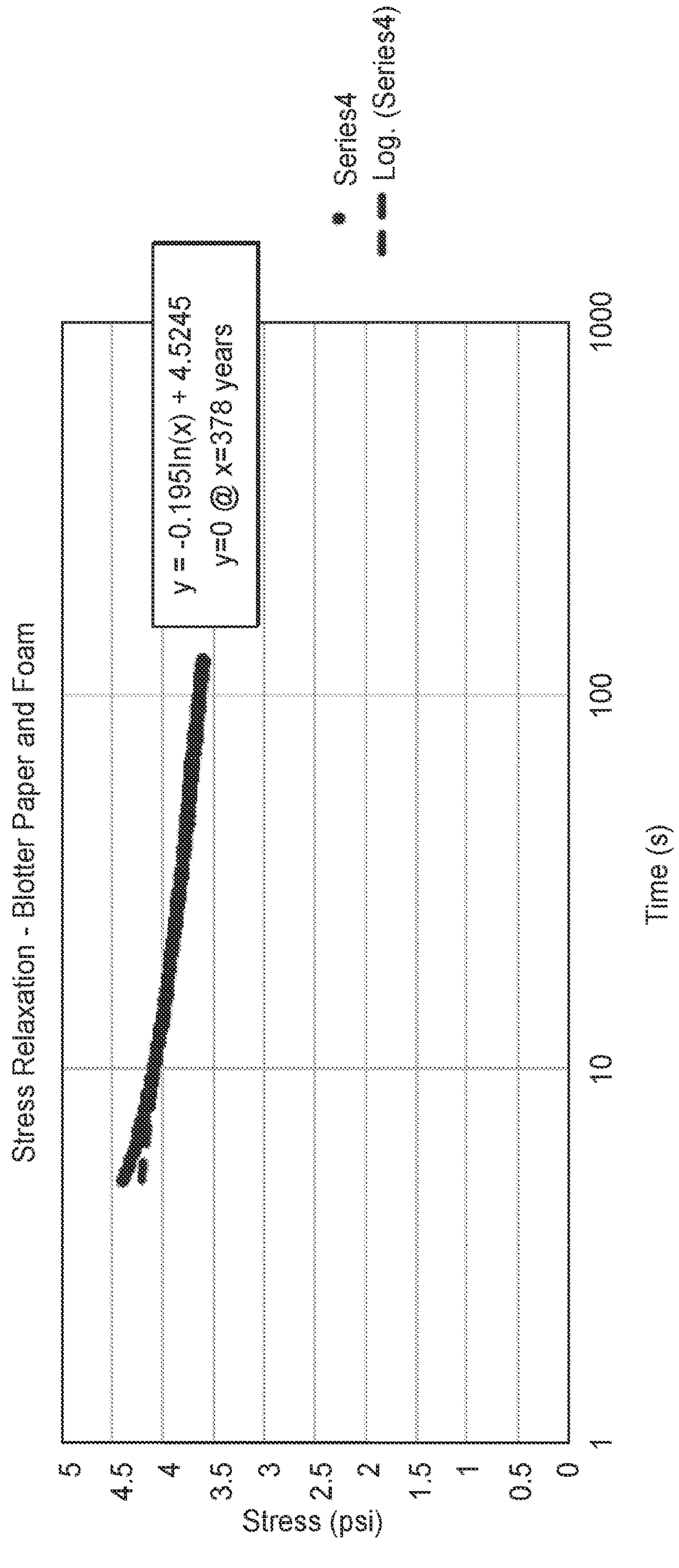
FIG. 17C is a stress relaxation plot of the assay device shown FIG. 17B.
Figure 17D:
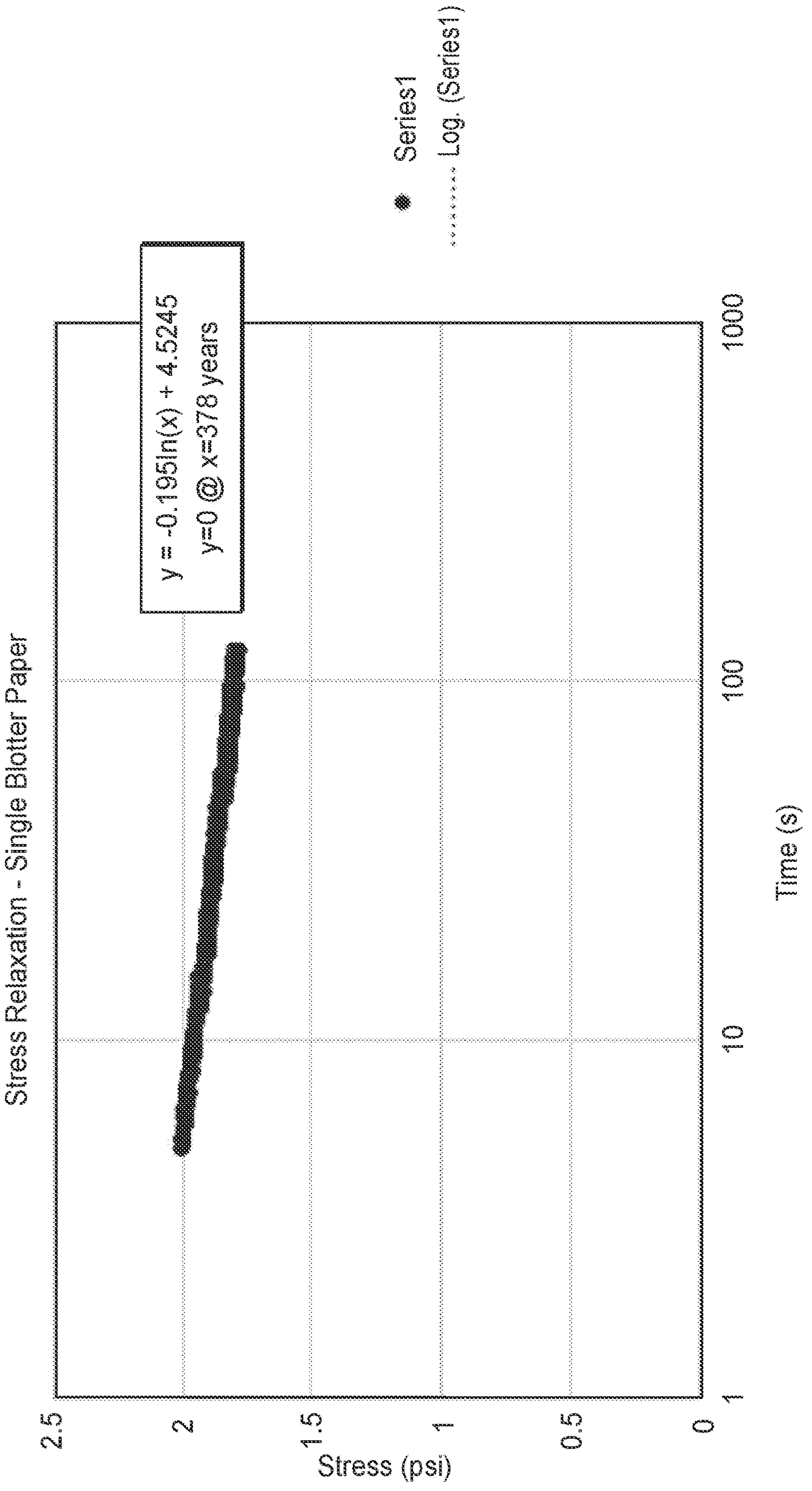
FIG. 17D is a stress relation plot of the assay device of FIG. 17A.

FIGS. 17A-B show an assay device including a rigid acrylic package and an elastic sensor stack, in this example containing a layer of elastic foam. The Stress Relaxation plots show that the blotter paper and foam (FIG. 17C), as well as the blotter paper alone (FIG. 17D), have sufficient elasticity to maintain pressure on the sensor stack for a significant storage time.

Figure 18A:
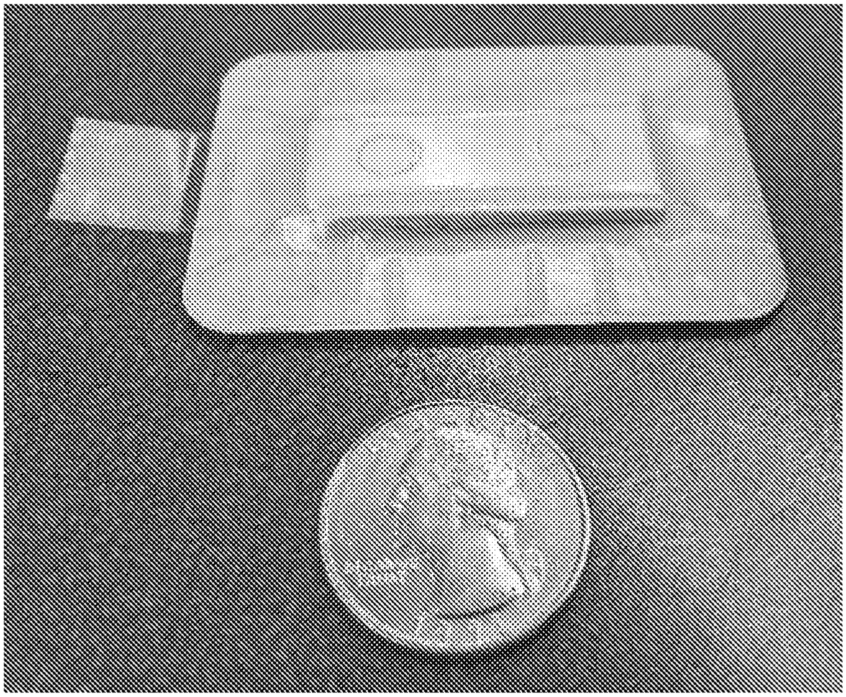
FIGS. 18A-B are photographs of an example of an assay device of Example 11 with an elastic package in combination with a sensor stack underlain by an elastic element.
Figure 18B:
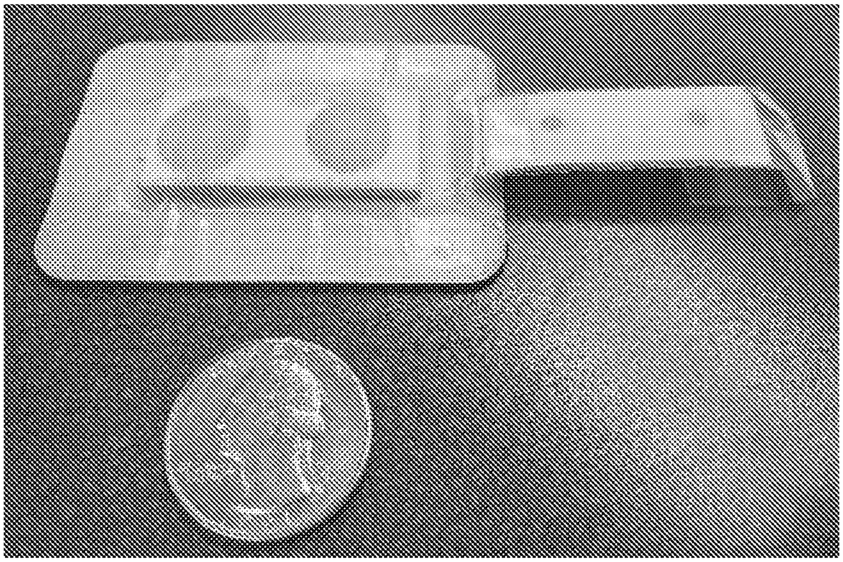

FIGS. 18A-B show an elastic package in combination with a sensor stack underlain by an elastic element. In this example, a layer of elastic foam was under the sensor stack. Tests showed that this configuration performed well, and pull tab measurements were used to adjust lamination process parameters to achieve a wide range of sensor stack pressures. Pull tab measurements were also used to estimate sensor shelf life.

EMBODIMENTS

Embodiment 1. A diagnostic device, comprising:
- a sensor stack comprising multiple panels of a porous material disposed in planes parallel to one another and in face-to-face contact with each other, wherein the sensor stack comprises a first major surface and a second major surface, wherein at least a portion of the panels of the porous material comprise hydrophobic regions and hydrophilic regions configured to provide a sample flow path for migration of a fluid sample through the sensor stack from one panel to another in the hydrophilic regions; and
- a wicking layer on the second major surface of the sensor stack, wherein the wicking layer comprises a first major surface proximal the sensor stack and a second major surface.

Embodiment 2. The diagnostic device of Embodiment 1, wherein the first major surface of the wicking layer is separable from the sensor stack.

Embodiment 3. The diagnostic device of Embodiments 1 or 2, wherein the wicking layer comprises a plurality of sublayers.

Embodiment 4. The diagnostic device of Embodiments 2 or 3, further comprising a hinge between the first major surface of the wicking layer and the sensor stack.

Embodiment 5. The diagnostic device of Embodiment 4, wherein the hinge is between a side of the sensor stack and first major surface of the wicking layer.

Embodiment 6. The diagnostic device of any of Embodiments 2 to 5, further comprising a packaging layer attached to the first major surface of the wicking pad and overlying the sensor stack.

Embodiment 7. The diagnostic device of Embodiment 6, further comprising a hinge between the first major surface of the wicking layer and the packaging layer.

Embodiment 8. The diagnostic device of Embodiment 7, wherein the hinge is between a sidewall of the packaging layer and the first major surface of the wicking layer.

Embodiment 9. The diagnostic device of Embodiment 8, wherein the first major surface of the sensor stack is attached to the packaging layer such that separating the first sidewall of the packaging enclosure from the first major surface of the wicking layer and rotating the packaging enclosure about the hinge exposes the second major surface of the sensor stack.

Embodiment 10. The diagnostic device of any of Embodiments 1 to 9, wherein the sensor stack comprises an elongate substantially planar substrate with a first end and a second end, and wherein the sensor stack is folded into overlying planar panels such that each panel occupies a different substantially parallel plane.

Embodiment 11. The diagnostic device of any of Embodiments 1 to 10, wherein the hydrophobic regions in the panels of the sensor stack comprise a low surface energy polymeric ink.

Embodiment 12. The diagnostic device of Embodiment 11, wherein the hydrophobic regions in the panels of the sensor stack comprise open areas between fibers thereof, the open areas between the fibers providing at least one uninterrupted open path between a first major surface of a panel and a second major surface of the panel.

Embodiment 13. The diagnostic device of any of Embodiments 1 to 12, further comprising a connective region between adjacent panels of the sensor stack, wherein the connective region comprises an adhesive chosen from a pressure sensitive adhesive, a hot melt adhesive, a cohesive adhesive, and mixtures and combinations thereof.

Embodiment 14. The diagnostic device of Embodiment 13, wherein adjacent overlying panels comprise registered areas of a cohesive adhesive configured to allow fluid flow between the hydrophilic areas in adjacent panels of the sensor stack.

Embodiment 15. The diagnostic device of claim 13 or 14, wherein the connective region comprises a patterned adhesive comprising an arrangement of open regions, the open regions configured to allow flow of a fluid between adjacent panels.

Embodiment 16. The diagnostic device of any of Embodiments 13 to 15, wherein the connective region occupies a periphery of the panels and surrounding the hydrophobic layer.

Embodiment 17. The diagnostic device of any of Embodiments 1 to 16, wherein the hydrophobic regions surround the hydrophilic regions.

Embodiment 18. The diagnostic device of any of Embodiments 1 to 17, wherein the panels comprises a material chosen from paper, nonwovens, polymeric films, and combinations thereof.

Embodiment 19. The diagnostic device of Embodiment 18, wherein the panels comprise paper.

Embodiment 20. The diagnostic device of any of Embodiments 1 to 19, wherein the wicking layer comprises a nonwoven material.

Embodiment 21. The diagnostic device of any of Embodiments 1 to 20, further comprising a mechanical fastener on the sensor stack, wherein the mechanical fastener is configured to provide enhanced contact between the panels of the sensor stack.

Embodiment 22. The diagnostic device of Embodiment 21, wherein the mechanical fastener is chosen from staples, clips, elastic bands, zip ties, and combinations thereof.

Embodiment 23. The diagnostic device of any of Embodiments 21 to 22, wherein the mechanical fastener comprises a clamp with a first arm contacting the first major surface of the sensor stack and a second arm contacting the second major surface of the sensor stack.

Embodiment 24. The diagnostic device of Embodiment 23, wherein the first arm of the clamp and the second arm of the clamp each contact opposed edges of the sensor stack.

Embodiment 25. The diagnostic device of Embodiment 24, wherein the edges comprise hydrophobic regions of the sensor stack.

Embodiment 26. The diagnostic device of any of Embodiments 1 to 25, wherein the hydrophilic regions in each panel of the sensor stack comprise less than about 50% of the total surface area of each panel.

Embodiment 27. The diagnostic device of Embodiment 26, wherein the hydrophilic regions have a substantially circular shape when viewed from above a panel.

Embodiment 28. The diagnostic device of any of Embodiments 1 to 27, wherein the wicking layer comprises at least one lateral flow restricting pattern.

Embodiment 29. The diagnostic device of Embodiment 28, wherein the lateral flow restricting pattern comprises a pattern of cut lines.

Embodiment 30. The diagnostic device of Embodiment 28, wherein the lateral flow restricting pattern comprises a pattern of wicking channels.

Embodiment 31. The diagnostic device of Embodiment 30, wherein the wicking channels direct fluid flow from a center toward at least one corner of the wicking layer.

Embodiment 32. The diagnostic device of any of Embodiments 28 to 31, wherein the lateral flow restricting pattern comprises a central region with wicking channels directed away from the central region toward at least one corner of the wicking layer.

Embodiment 33. The diagnostic device of any of Embodiments 1 to 32, wherein the wicking layer comprises a plurality of sublayers bonded together by an adhesive.

Embodiment 34. The diagnostic device of Embodiment 33, wherein at least one of the plurality of sub-layers comprises a lateral flow restricting pattern.

Embodiment 35. The diagnostic device of any of Embodiments 1 to 34, wherein the wicking layer comprises glass fibers.

Embodiment 36. The diagnostic device of Embodiment 35, wherein the wicking layer comprises about 25 wt % glass fibers.

Embodiment 37. The diagnostic device of any of Embodiments 1 to 36, further comprising a wicking control layer between the sensor stack and the first major surface of the wicking layer.

Embodiment 38. The diagnostic device of Embodiment 37, wherein the wicking control layer comprises a nonwoven material.

Embodiment 39. The diagnostic device of Embodiment 38, wherein the nonwoven material comprises about 25 wt % glass fibers.

Embodiment 40. The diagnostic device of any of Embodiments 1 to 39, further comprising an elastic element on the second major surface of the wicking layer.

Embodiment 41. The diagnostic device of Embodiment 40, wherein the elastic element comprises a polymeric foam.

Embodiment 42. The diagnostic device of Embodiment 41, wherein the foam comprises at least one aperture extending from a first major surface thereof to a second major surface thereof.

Embodiment 43. The diagnostic device of Embodiment 42, wherein at least one of the apertures in the foam layer underlies a hydrophilic region in the sensor stack of the panels of porous material.

Embodiment 44. The diagnostic device of Embodiments 42 or 43, wherein the apertures comprise at least about 10% of the total surface area of the foam layer.

Embodiment 45. The diagnostic device of any of Embodiments 40 to 44, further comprising an adhesive layer between the wicking layer and the elastic element.

Embodiment 46. The diagnostic device of any of Embodiments 40 to 45, wherein the elastic element has a first major surface adjacent the wicking layer and a second major surface, and wherein a backing layer is on the second major surface of the foam layer.

Embodiment 47. The diagnostic device of Embodiment 46, wherein the backing layer comprises cardboard.

Embodiment 48. The diagnostic device of any of Embodiments 46 to 47, further comprising an adhesive layer between the second major surface of the foam layer and the backing layer.

Embodiment 49. The diagnostic device of any of Embodiments 1 to 48, further comprising a cover layer on the first major surface of the sensor stack.

Embodiment 50. The diagnostic device of Embodiment 49, wherein the cover layer comprises an arrangement of apertures extending from a first major surface thereof to a second major surface thereof.

Embodiment 51. The diagnostic device of Embodiment 50, wherein at least one of the apertures substantially overlies the hydrophilic regions in the sensor stack.

Embodiment 52. The diagnostic device of any of Embodiments 49 to 51, wherein a packaging layer overlies the cover layer.

Embodiment 53. The diagnostic device of Embodiment 52, further comprising an adhesive layer on the sensor stack that adheres to the packaging layer.

Embodiment 54. The diagnostic device of Embodiment 53, wherein the adhesive layer comprises a tape tab on the second major surface of the stack.

Embodiment 55. The diagnostic device of any of Embodiments 1 to 54, wherein at least some of the panels of the porous material in the sensor stack comprise a biochemical reagent selected to determine at least one of the presence, absence or concentration of an analyte in the fluid sample.

Embodiment 56. A diagnostic device, comprising:

a cover layer with a first major surface and a second major surface;

a sensor stack comprising multiple panels of a porous material disposed in planes parallel to one another and in face-to-face contact with each other, wherein the sensor stack comprises a first major surface proximal the second major surface of the cover layer and a second major surface, wherein at least a portion of the panels of the porous material comprise hydrophobic regions and hydrophilic regions configured to provide a sample flow path for migration of a fluid sample through the sensor stack from one panel to another in the hydrophilic regions;

a wicking layer on the second major surface of the sensor stack, wherein the wicking layer comprises a first major surface proximal the sensor stack, and a second major surface;

an elastic element on the second major surface of the wicking layer, wherein the elastic element comprises a first major surface proximal the wicking layer, and a second major surface; and a backing proximal the second major surface of the elastic element.

Embodiment 57. The diagnostic device of Embodiment 56, further comprising a wicking control layer between the second major surface of the sensor stack and the wicking layer.

Embodiment 58. The diagnostic device of Embodiment 57, wherein at least one of the sublayers of the wicking layer comprises a lateral flow control feature.

Embodiment 59. The diagnostic device of Embodiment 58, wherein the lateral flow control feature comprises an arrangement of cut lines.

Embodiment 60. The diagnostic device of Embodiment 58, wherein the lateral flow control feature comprises an arrangement of wicking channels.

Embodiment 61. The diagnostic device of Embodiment 60, wherein the wicking channels direct a flow from a center of the wicking layer to a corner thereof.

Embodiment 62. The diagnostic device of any of Embodiments 56 to 61, wherein the wicking layer comprises an arrangement of apertures aligned with the hydrophilic regions of the sensor stack.

Embodiment 63. The diagnostic device of any of Embodiments 56 to 62, wherein the wicking layer comprises a nonwoven material.

Embodiment 64. The diagnostic device of any of Embodiments 56 to 62, wherein the cover layer comprises a plastic sheet.

Embodiment 65. The diagnostic device of any of Embodiments 56 to 64, wherein the second major surface of the sensor stack comprises a tape tab.

Embodiment 66. The diagnostic device of any of Embodiments 56 to 65, wherein the backing comprises paper.

Embodiment 67. The diagnostic device of any of Embodiments 56 to 66, wherein at least some of the panels of the porous material in the sensor stack comprise a biochemical reagent selected to determine at least one of the presence, absence or concentration of an analyte in the fluid sample.

Embodiment 68. The diagnostic device of any of Embodiments 56 to 67, wherein the elastic element comprises a foamed layer.

Embodiment 69. A package, comprising:

a diagnostic device, comprising:

a sensor stack comprising multiple panels of a porous material disposed in planes parallel to one another and in face-to-face contact with each other, wherein the sensor stack comprises a first major surface and a second major surface, wherein at least a portion of the panels of the porous material comprise hydrophobic regions and hydrophilic regions configured to provide a sample flow path for migration of a fluid sample through the sensor stack from one panel to another in the hydrophilic regions; and a wicking layer on the second major surface of the sensor stack, wherein the wicking layer comprises a first major surface proximal the sensor stack and a second major surface; and wherein the diagnostic device is enclosed within a packaging construction comprising:

a backing on the second surface of the wicking layer of the sensor stack; and a compressive layer overlying the first major surface of the sensor stack and attached to a major surface of the backing, wherein the compressive layer comprises at least one aperture overlying the hydrophilic regions in the sensor stack.

Embodiment 70. The package of Embodiment 69, wherein the compressive layer is substantially transparent to visible light.

Embodiment 71. The package of any of Embodiments 69 to 70, wherein the compressive layer comprises an elastic polymeric tape with an adhesive layer on a major surface of backing.

Embodiment 72. The package of claim Embodiment 71, wherein the elastic polymeric tape applies a compressive force to the sensor stack of about 0.2 psi to about 1 psi.

Embodiment 73. The package of claim Embodiment 72, wherein the elastic polymeric tape comprises a strippable portion overlying the sensor stack.

Embodiment 74. The package of Embodiment 73, wherein the strippable portion of the elastic polymeric tape comprises a pull tab.

Embodiment 75. The package of any of Embodiments 69 to 74, wherein the compressive layer comprises a polymeric shell attached to the major surface of the backing.

Embodiment 76. The package of any of Embodiments 69 to 75, wherein the backing is chosen from paper, polymeric films, panels, and combinations thereof.

Embodiment 77. The package of any of Embodiments 69 to 76, comprising an adhesive layer between the second major surface of the wicking layer and the major surface of the backing.

Embodiment 78. The package of any of Embodiments 69 to 77, comprising an ultrasonic weld between the second major surface of the wicking layer and the major surface of the backing.

Embodiment 79. The package of any of Embodiments 69 to 78, wherein the sensor stack further comprises an elastic element between the major surface of the backing and the second major surface of the wicking layer.

Embodiment 80. The package of Embodiment 79, wherein the compressive layer comprises an elastic polymeric tape with an adhesive layer attached to the major surface of backing.

Embodiment 81. The package of Embodiment 80, wherein the compressive layer comprises a rigid enclosure.

Embodiment 82. The package of Embodiment 81, wherein the rigid enclosure comprises a molded plastic.

Embodiment 83. The package of any of Embodiments 79 to 82, wherein the elastic element comprises a polymeric foam.

Embodiment 84. The package of Embodiment 83, further comprising an adhesive layer between the polymeric foam and the major surface of the backing.

Embodiment 85. The package of any of Embodiments 69 to 84, further comprising a cover layer on the first major surface of the sensor stack.

Embodiment 86. The package of any of Embodiments 69 to 85, wherein the wicking layer comprises a plurality of sublayers.

Embodiment 87. The package of Embodiment 86, wherein at least one of the sub-layers of the wicking pad comprises lateral flow control features.

Embodiment 88. The package of any of Embodiments 86 to 87, further comprising an adhesive layer between at least some of the sublayers of the wicking pad.

Embodiment 89. The package of any of Embodiments 69 to 88, wherein the hydrophilic regions of the sensor stack comprise a plurality of circular apertures, and wherein the compressive layer comprises circular apertures overlying the circular apertures of the sensor stack.

Embodiment 90. The package of any of Embodiments 69 to 89, wherein the major surface of the backing comprises an information panel.

Embodiment 91. The package of any of Embodiments 69 to 90, wherein an exposed surface of the compressive layer comprises an information panel.

Embodiment 92. The package of any of Embodiments 69 to 91, wherein at least some of the panels of the porous material in the sensor stack comprise a biochemical reagent selected to determine at least one of the presence, absence or concentration of an analyte in the fluid sample.

Embodiment 93. An assay method, the method comprising:

mixing a sample comprising an analyte with a reagent solution to form a sample solution;

applying the sample solution to an assay device, the assay device comprising:

a sensor stack, the sensor stack comprising:

multiple panels of a porous material disposed in planes parallel to one another and in face-to-face contact with each other, wherein the sensor stack comprises a first major surface and a second major surface, wherein at least a portion of the panels of the porous material comprise hydrophobic regions and hydrophilic regions configured to provide a sample flow path for migration of a fluid sample through the sensor stack from one panel to another in the hydrophilic regions; and a wicking layer on the second major surface of the sensor stack, wherein the wicking layer comprises a first major surface proximal the sensor stack and a second major surface, wherein the sample solution is applied to a hydrophilic region, wherein the sample solution is applied to a sample port in the hydrophilic region of the sample flow path;

applying a wash solution to the sample port;

separating the wicking layer from the sensor stack to expose the second major surface of the sensor stack;

applying a color solution to a color zone on the second major surface of the sensor stack; and observing the color zone to determine a color change and confirm the presence or absence of an analyte in the sample.

Embodiment 94. The assay method of Embodiment 93, wherein the assay device further comprises a hinge between the first major surface of the wicking layer and the sensor stack, and wherein separating the wicking layer from the sensor stack comprises rotating the wicking layer about the hinge to expose the second major surface of the sensor stack.

Embodiment 95. The assay method of Embodiment 94, wherein the sensor stack is contained in an outside packaging, and separating the wicking pad from the sensor stack comprises rotating the packaging about the hinge to expose the second major surface of the sensor stack.

Embodiment 96. A method of making a diagnostic device, the method comprising:

in an elongate web of a fibrous material comprising a first major surface and a second major surface, wherein the web has a thickness t extending from the first major surface to the second major surface, and a first edge and a second edge, the web comprising a plurality of adjacent web regions extending from the first edge to the second edge, wherein at least a portion of the web regions are separated from adjacent web regions by border regions;

applying a first portion of a hydrophobic polymeric ink composition to the first major surface of the web in at least one web region, wherein the first portion of the ink composition wicks a distance less than t from the first major surface of the web toward the second major surface of the web; and applying a second portion of the hydrophobic polymeric ink composition to the at least one web region on the second major surface of the web, wherein the second portion of the ink composition wicks from the second major surface of the web toward the first major surface of the web, wherein the first portion of the hydrophobic polymeric ink composition meets the second portion of the hydrophobic polymeric ink composition to form a hydrophobic area comprising the hydrophobic polymeric ink composition and a hydrophilic area substantially free of the hydrophobic polymeric ink composition; and at least partially hardening the hardenable polymeric ink composition in the hydrophobic areas of the at least one web region to provide a hydrophobic ink on fibers of the fibrous material and open areas between the fibers, the open areas between the fibers providing at least one uninterrupted open ink-free path between the first major surface of the web and the second major surface of the web.

Embodiment 97. The method of Embodiment 96, further comprising folding the web of porous material along the border regions to form a stack of overlying substantially planar panels, wherein each of the overlying planar panels in the stack occupies a different substantially parallel plane, and wherein each of the overlying planar panels comprises registered hydrophilic areas forming a sample flow path therebetween.

Embodiment 98. The method of Embodiments 96 or 97, further comprising cutting the web of porous material into a plurality of panels, and stacking the panels on each other to form a stack of overlying planar panels, the stack comprising registered hydrophilic regions forming a sample flow path between the panels.

Embodiment 99. The method of any of Embodiments 96 to 98, comprising at least partially hardening the first portion of the hydrophobic polymeric ink composition prior to applying the second portion of the hydrophobic polymeric ink composition.

Embodiment 100. The method of any of Embodiments 96 to 99, comprising hardening the first portion of the hydrophobic polymeric ink composition and the second portion of the hydrophobic polymeric ink composition at substantially the same time.

Embodiment 101. The method of any of Embodiments 96 to 100, wherein the first portion of the hydrophobic polymeric ink composition and the second portion of the hydrophobic polymeric ink composition are applied in registration with each other.

Embodiment 102. The method of any of Embodiments 96 to 101, wherein the first portion and the second portion of the hydrophobic polymeric ink composition are each applied to the web by a process, which may be the same or different, chosen from printing, coating, physical vapor deposition, and combinations thereof.

Embodiment 103. The method of Embodiment 102, wherein the hydrophobic polymeric ink composition is applied by a printing technique chosen from inkjet, flexographic, screen, gravure, offset, and combinations thereof.

Embodiment 104. The method of any of Embodiments 96 to 103, wherein at least a portion of the web regions comprise a connective area chosen from a pressure sensitive adhesive, a hot-melt adhesive, a cohesive adhesive, and mixtures and combinations thereof.

Embodiment 105. The method of Embodiment 104, wherein the adhesive in the connective area is applied by at least one of spraying, printing, a transfer adhesive, and combinations thereof.

Embodiment 106. The method of Embodiments 104 to 105, wherein the connective area comprises a cohesive adhesive applied to a periphery of at least some of the web regions, wherein the connective area at least partially surrounds the hydrophobic area and the hydrophilic area in the web regions.

Embodiment 107. The method of Embodiments 104 to 106, wherein the connective area comprises a cohesive adhesive in the hydrophobic area between overlying web regions.

Embodiment 108. The method of claim Embodiments 104 to 107, wherein the connective area comprises a patterned adhesive that at least partially overlies each web region, wherein the patterned adhesive comprises open regions overlying the hydrophilic region.

Embodiment 109. The method of Embodiment 108, wherein the patterned adhesive comprises a grid pattern.

Embodiment 110. The method of any of Embodiments 96 to 109, comprising curing at least one of the first portion and the second portion of the hydrophobic polymeric ink composition with UV.

Embodiment 111. The method of any of Embodiments 97 to 110, further comprising folding the web such that the connective areas in at least some adjacent panels at least partially overlie each other.

Embodiment 112. The method of any of Embodiments 96 to 111, further comprising disposing a reagent in at least one of the hydrophilic areas along the flow path, wherein the reagent is selected to provide an indication of at least one of a presence, an absence, and a concentration of an analyte in the sample.

Various embodiments of the invention have been described. These and other embodiments are within the scope of the following claims.

The invention claimed is:

1. A diagnostic device, comprising:

a sensor stack comprising panels disposed in face-to-face contact with each other, each panel including a hydrophobic region and a hydrophilic region, the hydrophilic regions co-operatively defining a sample flow path for migration of a fluid sample through the sensor stack, and the hydrophobic regions each including an arrangement of entangled fibers that are coated with a polymeric material to define interconnected interstitial passages between the fibers, thereby providing at least one path through the panels that allows gas flow therethrough and repels the intrusion of the fluid sample into the hydrophobic region; and a wicking layer on the sensor stack to draw the fluid sample through the sample flow path.

2. The diagnostic device of claim 1, wherein the wicking layer is separable from the sensor stack.

3. The diagnostic device of claim 2, further comprising a hinge rotatably coupling the wicking layer and the sensor stack.

4. The diagnostic device of claim 2, further comprising a packaging layer attached to the wicking layer and overlying the sensor stack.

5. The diagnostic device of claim 4, further comprising a hinge rotatably coupling the wicking layer and the packaging layer.

6. The diagnostic device of claim 1, wherein the wicking layer comprises at least one lateral flow restricting pattern.

7. The diagnostic device of claim 6, wherein the lateral flow restricting pattern comprises a pattern of wicking channels.

8. The diagnostic device of claim 1, further comprising a wicking control layer between the sensor stack and the wicking layer.

9. The diagnostic device of claim 1, further comprising an elastic element on the wicking layer.

10. The diagnostic device of claim 9, wherein the elastic element comprises a polymeric foam.

11. The diagnostic device of claim 1, further comprising a cover layer on the sensor stack.

12. The diagnostic device of claim 11, wherein a packaging layer overlies the cover layer.

13. The diagnostic device of claim 1, further comprising a connective region between at least some of the panels to maintain alignment of the sample flow path.

14. A method, comprising:

applying a sample solution to an assay device, the assay device comprising:

a sensor stack comprising panels disposed in face-to-face contact with each other, each panel including a hydrophobic region and a hydrophilic region, the hydrophilic regions co-operatively defining a sample flow path for migration of a fluid sample through the sensor stack, and the hydrophobic regions each including an arrangement of entangled fibers that are coated with a polymeric material to define interconnected interstitial passages between the fibers, thereby providing at least one path through the panels that allows gas flow therethrough and repels the intrusion of the fluid sample into the hydrophobic region; and a wicking layer on a surface of the sensor stack to draw the fluid sample through the sample flow path;

migrating the sample solution through the sample flow path;

separating the wicking layer from the sensor stack to expose the surface of the sensor stack; and applying a color solution to a color zone on the surface that chemically reacts with an analyte captured in the sensor stack and thereby produces a detectable chromogenic product indicating the presence or absence of an analyte in the sample.

15. The method of claim 14, wherein the assay device further comprises a hinge rotatably coupling the wicking layer and the sensor stack, and wherein separating the wicking layer from the sensor stack comprises rotating the wicking layer about the hinge to expose the surface of the sensor stack.

16. A method of making a diagnostic device using an elongate web of a fibrous material comprising a first major surface and a second major surface, wherein the web has a thickness extending from the first major surface to the second major surface, and a first edge and a second edge, the web comprising a plurality of adjacent web regions extending from the first edge to the second edge, wherein at least a portion of the web regions are separated from adjacent web regions by border regions, the method comprising:

applying a first portion of a hardenable hydrophobic polymeric ink composition to the first major surface of the web in at least one web region, wherein the first portion of the hardenable hydrophobic polymeric ink composition wicks a distance less than the thickness from the first major surface of the web toward the second major surface of the web;

applying a second portion of the hardenable hydrophobic polymeric ink composition to the at least one web region on the second major surface of the web, wherein the second portion of the hardenable hydrophobic polymeric ink composition wicks from the second major surface of the web toward the first major surface of the web, wherein the first portion of the hardenable hydrophobic polymeric ink composition meets the second portion of the hardenable hydrophobic polymeric ink composition to form a hydrophobic area comprising the hardenable hydrophobic polymeric ink composition and a hydrophilic area substantially free of the hardenable hydrophobic polymeric ink composition;

at least partially hardening the hardenable hydrophobic polymeric ink composition in the hydrophobic areas of the at least one web region to provide a hydrophobic ink on fibers of the fibrous material and interconnected interstitial passages between the fibers, the interconnected interstitial passages between the fibers providing at least one open ink-free path between the first major surface of the web and the second major surface of the web that allows gas flow therethrough and repels the intrusion of a fluid sample into the hydrophobic areas; and folding the web along the border regions to form a stack of panels, each of the panels including registered hydrophilic areas that define a sample flow path therebetween.

* * * * *